US012726929B2

(12) United States Patent
You et al.

(10) Patent No.: US 12,726,929 B2
(45) Date of Patent: Sep. 1, 2026

(54) ELECTRONIC DEVICE FOR PROVIDING CALL FUNCTION CONTINUITY AND OPERATING METHOD THEREOF

(71) Applicant: SAMSUNG ELECTRONICS CO., LTD., Suwon-si (KR)

(72) Inventors: Byoungki You, Suwon-si (KR); Changseok Lee, Suwon-si (KR); Sohmann Kim, Suwon-si (KR); Sukkyung Yoon, Suwon-si (KR); Dongsuk Jung, Suwon-si (KR); Seunghoon Nam, Suwon-si (KR); Jonghyun Park, Suwon-si (KR); Kiyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 548 days.

(21) Appl. No.: 17/362,647

(22) Filed: Jun. 29, 2021

(65) Prior Publication Data

US 2021/0410096 A1 Dec. 30, 2021

(30) Foreign Application Priority Data

Jun. 30, 2020 (KR) ........................ 10-2020-0080438
May 6, 2021 (KR) ........................ 10-2021-0058444
Jun. 18, 2021 (KR) ........................ 10-2021-0079216

(51) Int. Cl.
*H04W 60/06* (2009.01)
*H04W 28/02* (2009.01)
(Continued)

(52) U.S. Cl.
CPC ....... *H04W 60/04* (2013.01); *H04W 28/0236* (2013.01); *H04W 48/16* (2013.01); *H04W 60/06* (2013.01); *H04W 84/12* (2013.01)

(58) Field of Classification Search
None
See application file for complete search history.

(56) References Cited

U.S. PATENT DOCUMENTS 8,830,844 B2 9/2014 Mathias et al.
2010/0172301 A1 7/2010 Watfa et al.
(Continued)

FOREIGN PATENT DOCUMENTS

CN 109474987 3/2019
KR 10-1309983 9/2013
(Continued)

OTHER PUBLICATIONS

Korean Office Action dated Jan. 21, 2022 for KR Application No. 10-2021-0079216.
(Continued)

*Primary Examiner* — Jeffrey M Rutkowski
*Assistant Examiner* — Mehedi S Aley
(74) *Attorney, Agent, or Firm* — NIXON & VANDERHYE P.C.

(57) ABSTRACT

Provided is a method and apparatus for providing call function continuity in an electronic device. The electronic device may include: a first communication circuit configured to support new radio (NR) communication and/or long-term evolution (LTE) communication, a second communication circuit configured to support Wi-Fi communication, and at least one processor operatively connected to the first communication circuit and the second communication circuit, wherein the processor is configured to control the electronic device to: register with a network of the NR communication via the first communication circuit; connect a call to an external device using the Wi-Fi communication based on being in a state of being registered with the network of the NR communication; based on the call connection to the (Continued)

external device using the Wi-Fi communication, restrict use of the NR communication; and based on the restriction of the use of the NR communication, register with a network of the LTE communication via the first communication circuit.

18 Claims, 24 Drawing Sheets

(51) Int. Cl.
*H04W 48/16* (2009.01)
*H04W 60/04* (2009.01)
*H04W 84/12* (2009.01)

(56) References Cited

U.S. PATENT DOCUMENTS

| | | | | |
|---|---|---|---|---|
| 2015/0257062 | A1* | 9/2015 | Hara | H04W 36/0083 370/331 |
| 2016/0366619 | A1 | 12/2016 | Yang et al. | |
| 2018/0270781 | A1* | 9/2018 | Baek | H04W 60/06 |
| 2019/0059026 | A1 | 2/2019 | Huang-Fu et al. | |
| 2019/0075537 | A1* | 3/2019 | Wu | H04W 76/15 |
| 2019/0281506 | A1 | 9/2019 | Chiang et al. | |
| 2019/0373525 | A1 | 12/2019 | Singh et al. | |
| 2020/0120551 | A1 | 4/2020 | Mukherjee | |
| 2021/0067918 | A1 | 3/2021 | Baek et al. | |
| 2021/0068069 | A1* | 3/2021 | Li | H04W 60/00 |
| 2021/0105691 | A1* | 4/2021 | Zhu | H04L 65/1016 |
| 2021/0127314 | A1* | 4/2021 | Mukherjee | H04W 36/34 |
| 2021/0136645 | A1* | 5/2021 | Zhao | H04W 36/30 |
| 2021/0153290 | A1* | 5/2021 | Ahmad | H04W 76/16 |
| 2021/0250745 | A1* | 8/2021 | Thanneeru | H04W 36/0022 |
| 2022/0210670 | A1* | 6/2022 | Kawasaki | H04W 24/02 |

FOREIGN PATENT DOCUMENTS

| | | |
|---|---|---|
| KR | 10-2021-0025340 | 3/2021 |
| WO | 2018/232560 | 12/2018 |
| WO | 2020/076934 | 4/2020 |
| WO | 2020/112406 | 6/2020 |

OTHER PUBLICATIONS

3GPP TS23.502 Release 16 (May 27, 2020) 3$^{rd}$ Generation Partnership Project; Technical Specification Group Services and System Aspects; 600 pgs.

3GPP TS36.331 Release 16 (Apr. 6, 2020) 3$^{rd}$ Generation Partnership Project; Technical Specification Group Radio Access Network; 1027 pgs.

International Search Report and Written Opinion dated Sep. 17, 2021 in corresponding International Application No. PCT/KR2021/008136.

Ericsson et al., "Use of EPS/RAT fallback for VoWiFi session", 3GPP TSG-SA2 Meeting #136AH S2-2001577, Incheon, KR, Jan. 17, 2020.

Extended European Search Report dated Aug. 17, 2023 for EP Application No. 21831510.9.

T-Mobile USA et al: "Voice fallback triggered by POU session resource setup", 3GPP Oraft: RP-200825. 3RO Generation Partnership Project (3GPP), Jun. 19, 2020, XP052336722.

Office Action for IN Application No. 202217076196 dated Feb. 16, 2026, 8 pages.

Office Action for CN Application No. 202180046715.9 issued May 14, 2026 and English translation, 17 pages.

Apostolis K. Salkintzis et al., Voice Call Handover Mechanism for Next-Generation 3GPP Systems (Part I), Aug. 26, 2010, and English abstract, 6 pages.

* cited by examiner

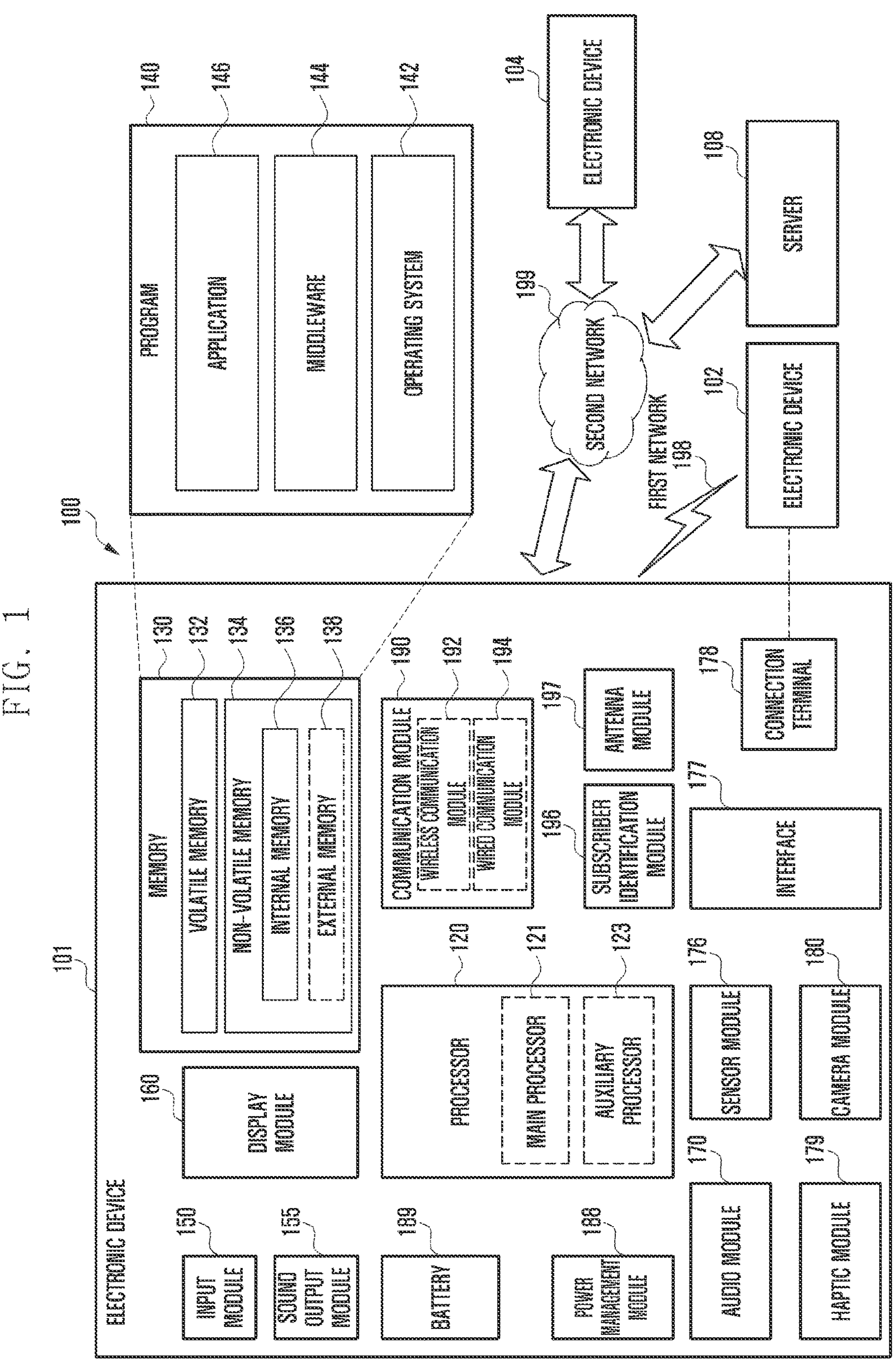
FIG. 1
100
101
ELECTRONIC DEVICE
INPUT MODULE
150
SOUND OUTPUT MODULE
155
BATTERY
189
POWER MANAGEMENT MODULE
188
AUDIO MODULE
170
HAPTIC MODULE
179
DISPLAY MODULE
160
PROCESSOR
120
MAIN PROCESSOR
121
AUXILIARY PROCESSOR
123
SENSOR MODULE
176
CAMERA MODULE
180
MEMORY
130
VOLATILE MEMORY
132
NON-VOLATILE MEMORY
134
INTERNAL MEMORY
136
EXTERNAL MEMORY
138
COMMUNICATION MODULE
190
WIRELESS COMMUNICATION MODULE
192
WIRED COMMUNICATION MODULE
194
SUBSCRIBER IDENTIFICATION MODULE
196
ANTENNA MODULE
197
INTERFACE
177
CONNECTION TERMINAL
178
PROGRAM
140
APPLICATION
146
MIDDLEWARE
144
OPERATING SYSTEM
142
SECOND NETWORK
199
FIRST NETWORK
198
ELECTRONIC DEVICE
104
SERVER
108
ELECTRONIC DEVICE
102

100
SERVER
108
INTERNET PROTOCOL
322
4G NETWORK
392
EPC
342
LEGACY NAS PROTOCOL
346
LTE BASE STATION
340
LTE COMMUNICATION PROTOCOL STACK
344
5G NETWORK
394
5GC
352
5G NAS PROTOCOL
356
NR BASE STATION
350
NR COMMUNICATION PROTOCOL STACK
354
ELECTRONIC DEVICE
101
INTERNET PROTOCOL
312
FIRST COMMUNICATION PROTOCOL STACK
314
SECOND COMMUNICATION PROTOCOL STACK
316

FIG. 4A
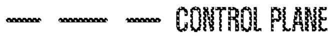
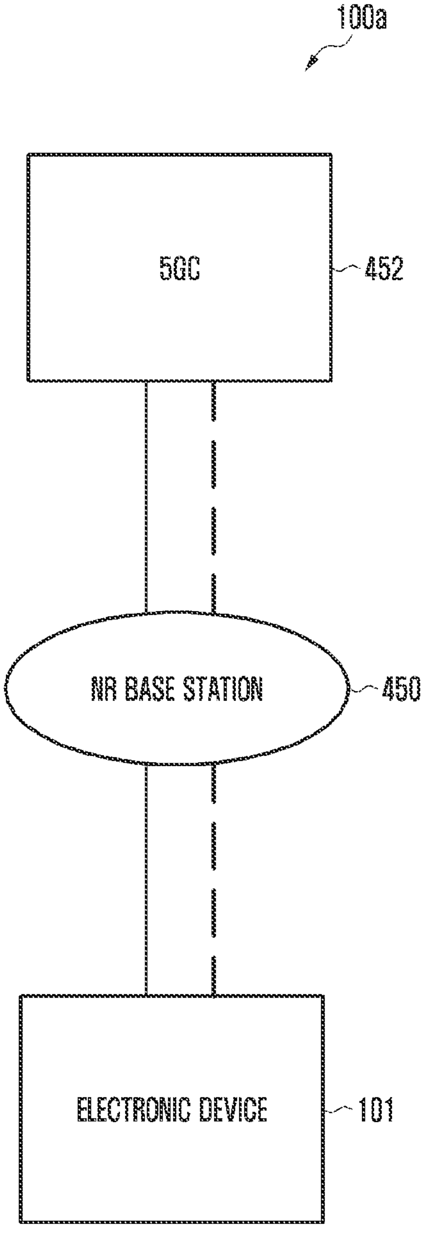

Figure 9:
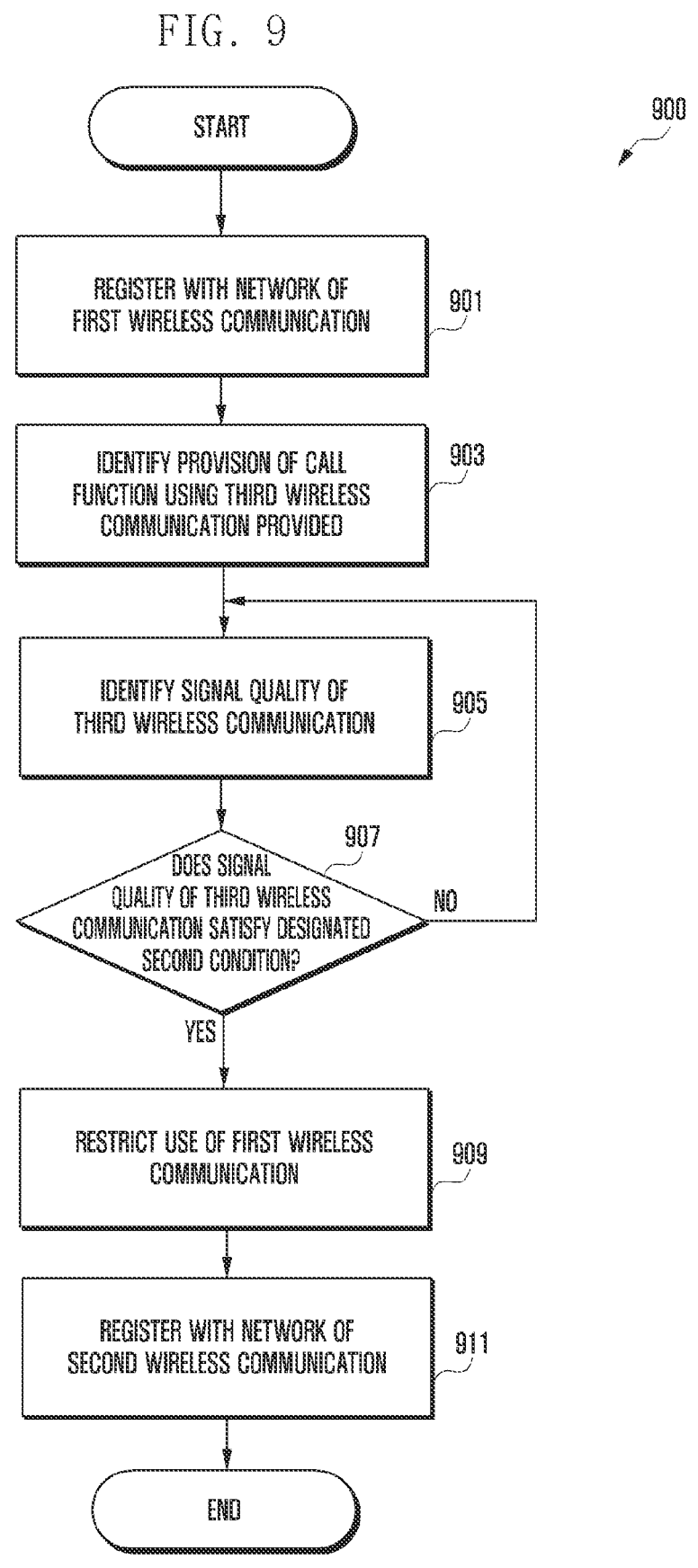

START

REGISTER WITH NETWORK OF FIRST WIRELESS COMMUNICATION (901)

IDENTIFY PROVISION OF CALL FUNCTION USING THIRD WIRELESS COMMUNICATION PROVIDED (903)

IDENTIFY SIGNAL QUALITY OF THIRD WIRELESS COMMUNICATION (905)

DOES SIGNAL QUALITY OF THIRD WIRELESS COMMUNICATION SATISFY DESIGNATED SECOND CONDITION? (907)

NO → 905

YES

RESTRICT USE OF FIRST WIRELESS COMMUNICATION (909)

REGISTER WITH NETWORK OF SECOND WIRELESS COMMUNICATION (911)

END

ELECTRONIC DEVICE FOR PROVIDING CALL FUNCTION CONTINUITY AND OPERATING METHOD THEREOF

CROSS-REFERENCE TO RELATED APPLICATIONS

This application is based on and claims priority under 35 U.S.C. § 119 to Korean Patent Application No. 10-2020-0080438, filed Jun. 30, 2020, in the Korean Intellectual Property Office, Korean Patent Application No. 10-2021-0058444, filed May 6, 2021, in the Korean Intellectual Property Office, and Korean Patent Application No. 10-2021-0079216, filed on Jun. 18, 2021, in the Korean Intellectual Property Office, the disclosures of which are incorporated by reference herein in their entireties.

BACKGROUND

Field

The disclosure relates to a method and apparatus for continuously providing a call function in an electronic device.

Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

If a call event occurs in the state in which an electronic device is registered with a network of a fifth generation (5G) communication scheme (e.g., new radio (NR) communication), the electronic device may register with a network of a fourth generation (4G) communication scheme (e.g., long-term evolution (LTE) communication) via evolved packet system (EPS) fallback, and may provide a call function (e.g., voice of LTE (VoLTE)).

The electronic device may provide the call function (e.g., voice of Wi-Fi (VoWi-Fi)) via wireless LAN communication (e.g., Wi-Fi) that interoperates with a core network of the 4G communication via an enhance packet data gateway (ePDG). A call function (e.g., VoLTE) using the 4G communication scheme and a call function (e.g., VoWi-Fi) using the wireless LAN communication may provide, based on a predetermined condition, a handover from the call function (e.g., VoLTE) using the 4G communication scheme to the call function (e.g., VoWi-Fi) using the wireless LAN communication, or a handover from the call function (e.g., VoWi-Fi) using the wireless LAN communication to the call function (e.g., VoLTE) using the 4G communication scheme. For example, the electronic device may register with a network of the 4G communication scheme or the 5G communication scheme, and may use a call function via the wireless LAN communication.

If the electronic device determines that the signal quality (e.g., a signal strength) of the wireless LAN communication is insufficient to maintain a call connection using the wireless LAN communication, the electronic device may request a handover to a network (e.g., a network of the 5G communication scheme) which the electronic device is currently registered with. If the network that the electronic device is currently registered with is the network of the 5G communication scheme that supports EPS fallback, the electronic device performs EPS fallback and registers with the network of the 4G communication scheme, in order to maintain the call connection, thereby providing a handover from the call function (e.g., VoWi-Fi) using the wireless LAN communication to the call function (e.g., VoLTE) using the 4G communication scheme. In this instance, a time delay may occur due to an EPS fallback procedure and a handover procedure when the electronic device performs a call connection with an external device.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and apparatus for continuously providing a call function in an electronic device.

According to various example embodiments, an electronic device may include: a first communication circuit configured to support new radio (NR) communication and/or long-term evolution (LTE) communication, a second communication circuit configured to support wireless LAN communication, and at least one processor operatively connected to the first communication circuit and the second communication circuit, wherein the processor is configured to control the electronic device to: register with a network of the NR communication via the first communication circuit; connect a call to an external device using the wireless LAN communication based on the electronic device being in a state of being registered with the network of the NR communication; based on the call connection to the external device using the wireless LAN communication, restrict use of the NR communication; and based on the restriction of the use of the NR communication, register with a network of the LTE communication via the first communication circuit.

According to various example embodiments, a method of operating an electronic device may include: registering with a network of new radio (NR) communication, connecting a call to an external device using wireless LAN communication based on the electronic device being in a state of being registered with the network of the NR communication, based on the call connection to the external device using the wireless LAN communication, restricting use of the NR communication, and based on the restriction of the use of the NR communication, registering with a network of long-term evolution (LTE) communication.

According to various example embodiments, an electronic device may include: a first communication circuit configured to support new radio (NR) communication and/or long-term evolution (LTE) communication, a second communication circuit configured to support wireless LAN communication, and at least one processor operatively connected to the first communication circuit and the second communication circuit, wherein the processor is configured to control the electronic device to: register with a network of the NR communication via the first communication circuit; based on being registered with the network of the NR communication, based on a request for connecting a call to an external device, register with a network of the LTE communication and connect a call to the external device via the LTE communication; based on a signal quality of the network of the LTE communication and/or a network of the wireless LAN communication satisfying a designated first condition, perform a handover to the network of the wireless LAN communication and maintain the call with the external device; and based on performing of the call with the external device using the wireless LAN communication, restrict the use of the NR communication.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

FIG. 4A is a diagram illustrating example wireless communication systems that provide a network of 4G communication and/or a network of 5G communication according to various embodiments;

FIG. 9 is a flowchart illustrating an example process of restricting the use of first wireless communication based on the signal quality of third wireless communication, by an electronic device according to various embodiments;

DETAILED DESCRIPTION

Figure 2:
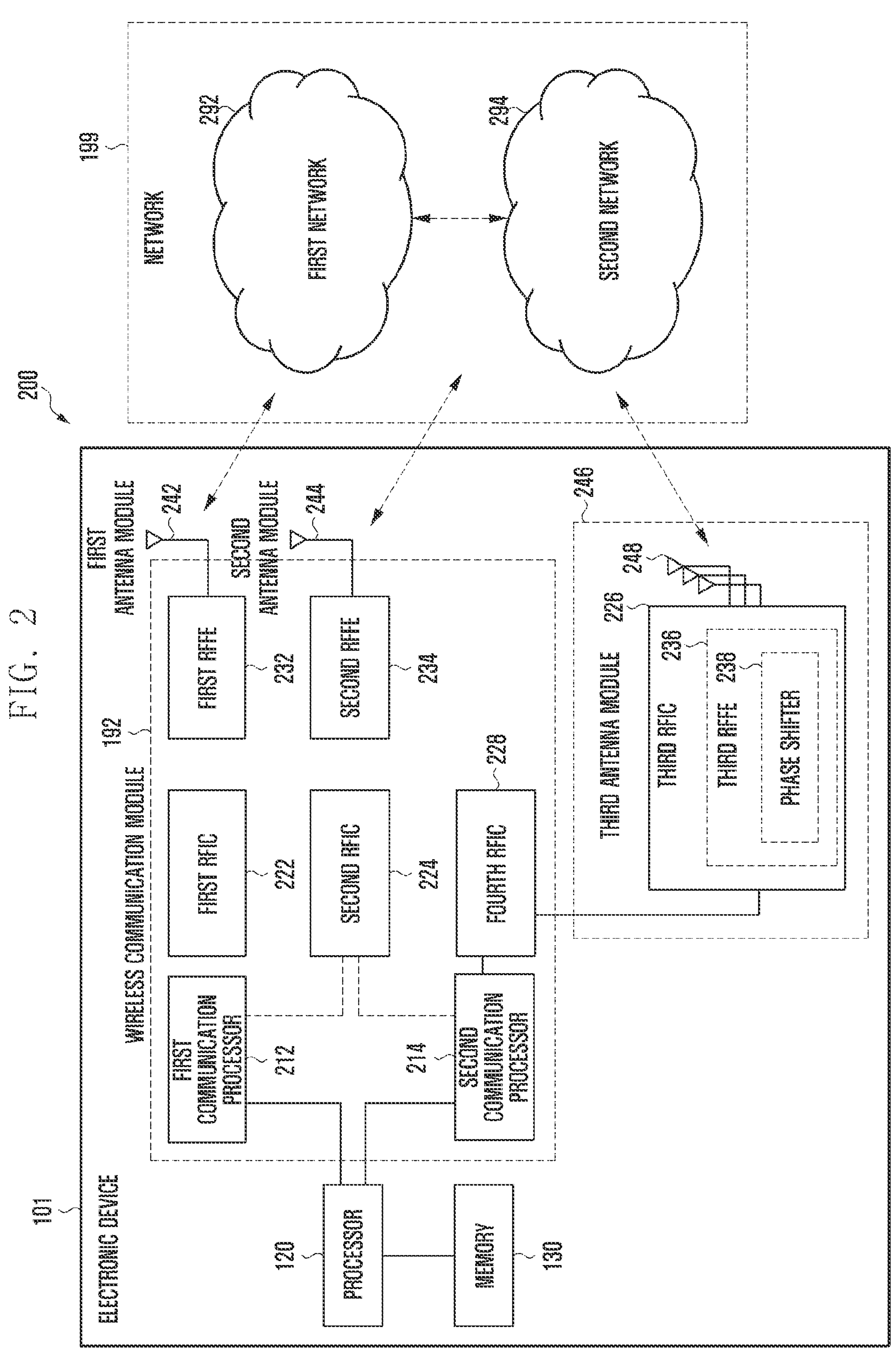
FIG. 2 is a block diagram illustrating an example electronic device for supporting legacy network communication and 5G network communication according to various embodiments.

Hereinafter, various example embodiments will be described in greater detail with reference to attached drawings.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 2 is a block diagram 200 illustrating an example of the electronic device 101 for supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC)

222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may include various processing circuitry and establish a communication channel of a band to be used for wireless communication with the first network 292, and may support legacy network communication via the established communication channel. According to an embodiment, the first network may, for example, and without limitation, be a legacy network including second generation (2G), third generation (3G), fourth generation (4G), long-term evolution (LTE) network, or the like. The second communication processor 214 may include various processing circuitry and establish a communication channel corresponding to a designated band (e.g., approximately 6 GHz to 60 GHz) among bands to be used for wireless communication with the second network 294, and may, for example, and without limitation, support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this example, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
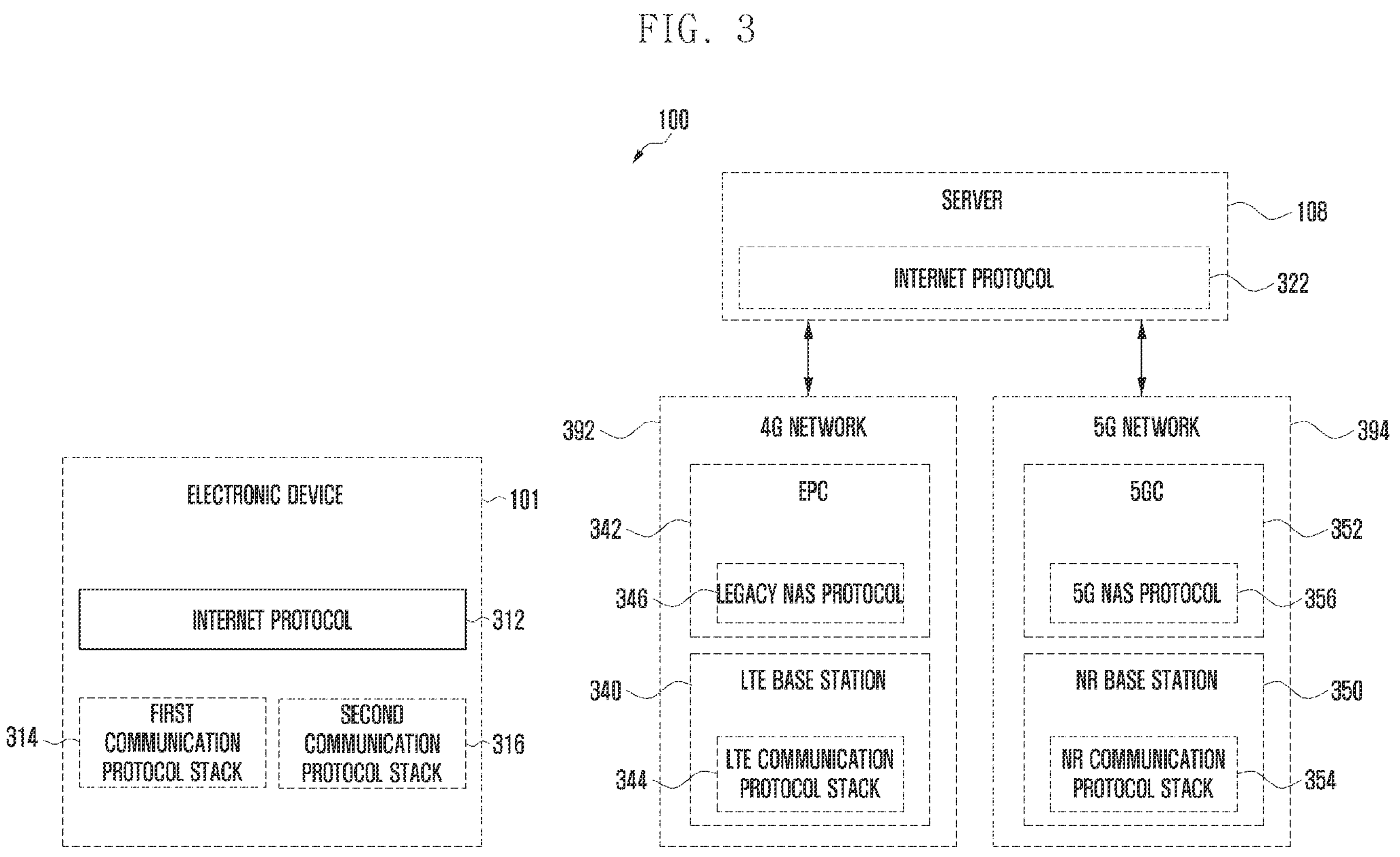
FIG. 3 is a diagram illustrating an example protocol stack structure of a network 100 of 4G communication and/or 5G communication according to various embodiments.

FIG. 3 is a block diagram illustrating an example protocol stack structure of a network 100 of 4G communication and/or 5G communication according to various embodiments.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to an embodiment, the electronic device 101 may perform wireless communication with the 4G network 392 using the first communication protocol stack 314. According to an embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to an embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a legacy non-access stratum (NAS) protocol 346. The 4G network 392 may perform LTE wireless communication with the electronic device 101 using the LTE communication protocol stack 344 and the legacy NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARD) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

Figure 4B:
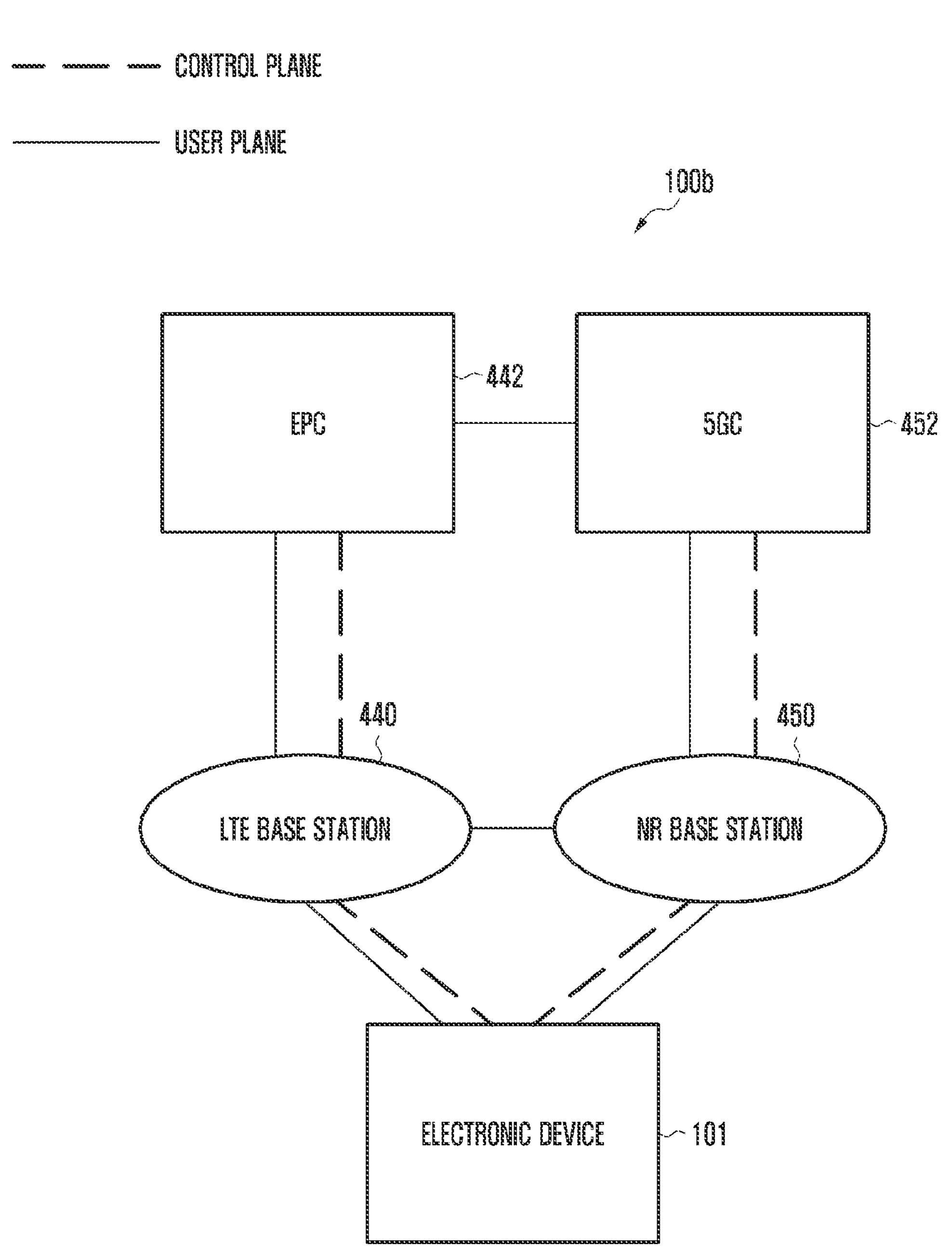
FIG. 4B is a diagram illustrating example wireless communication systems that provide a network of 4G communication and/or a network of 5G communication according to various embodiments.

FIG. 4A is a diagram illustrating example wireless communication systems that provide a network of 4G communication and/or a network of 5G communication according to various embodiments, and FIG. 4B is a diagram illustrating example wireless communication systems that provide a network of 4G communication and/or a network of 5G communication according to various embodiments.

Referring to FIGS. 4A and 4B, a network environment 100*a* and 100*b* may include at least one of a 4G network or a 5G network. The 4G network, for example, may include a 3GPP standard-based LTE base station 440 (e.g., an eNodeB (eNB)) that supports radio access to the electronic device 101, and an evolved packet core (EPC) 442 that manages 4G communication. The 5G network, for example, may include a new radio (NR) base station (e.g., a gNodeB (gNB)) 450 that supports radio access to the electronic device 101 and a $5^{th}$ generation core (5GC) 452 that manages 5G communication of the electronic device 101.

According to various embodiments, the electronic device 101 may transmit or receive a control message and user data via 4G communication and/or 5G communication. The control message, for example, may include a message related to at least one of security control, bearer setup, authentication, registration, or mobility management in association with the electronic device 101. The user data, for example, may be user data, excluding a control message transmitted or received between the electronic device 101 and a core network (e.g., the EPC 442 and/or 5GC 452).

Referring to FIG. 4A, according to various embodiments, the 5G network may independently perform transmission or reception of a control message and user data with the electronic device 101.

Referring to FIG. 4B, the 4G network and the 5G network according to various embodiments may independently provide data transmission or reception. For example, the electronic device 101 and the EPC 442 may perform transmission or reception of a control message and user data via the LTE base station 440. As another example, the electronic device 101 and the 5GC 452 may perform transmission or reception of a control message and user data via the NR base station 450.

According to various embodiments, the electronic device 101 may be registered with at least one of the EPC 442 or 5GC 452, and may transmit or receive a control message.

According to various embodiments, the EPC 442 or 5GC 452 may interwork, to manage communication of the electronic device 101. For example, the movement information of the electronic device 101 may be transmitted or received via an interface between the EPC 442 and the 5GC 452.

Figure 5A:
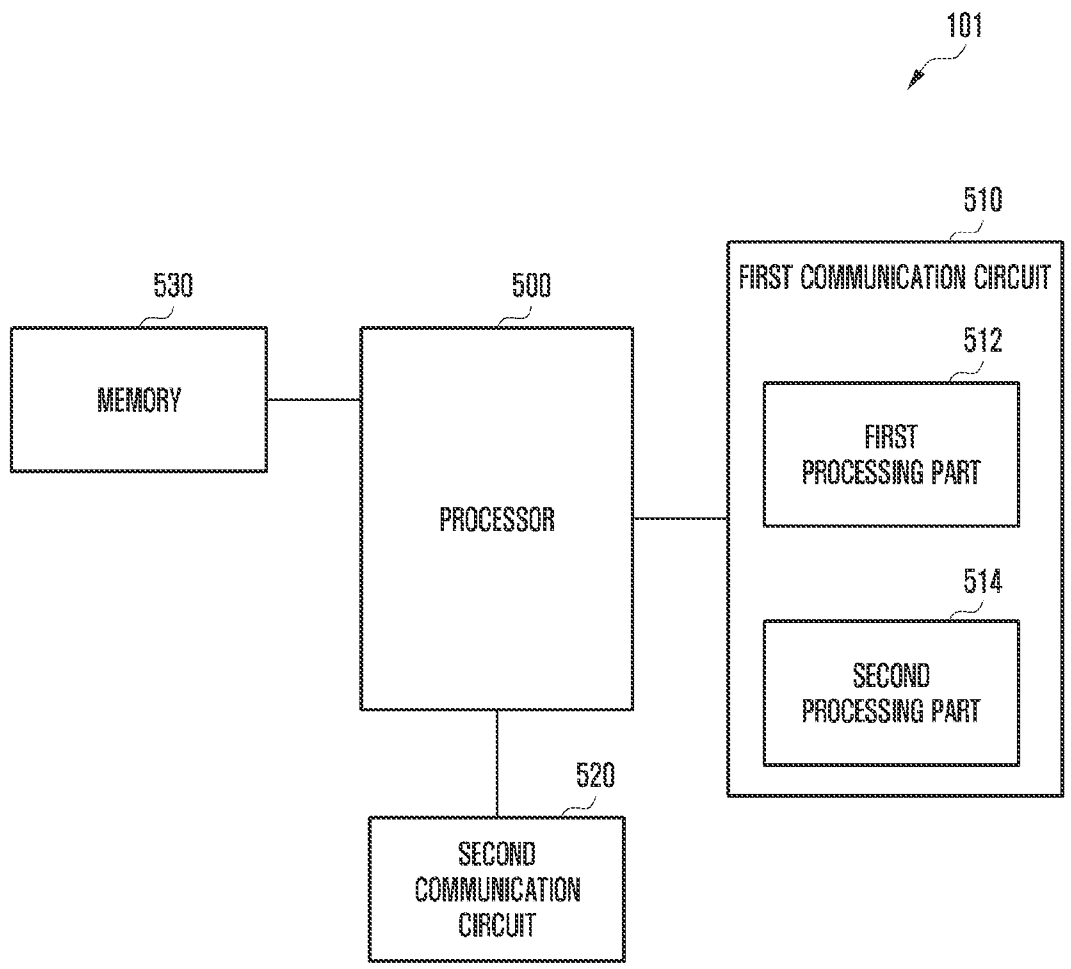
FIG. 5A is a block diagram illustrating an example electronic device for providing a call function according to various embodiments.
Figure 5B:
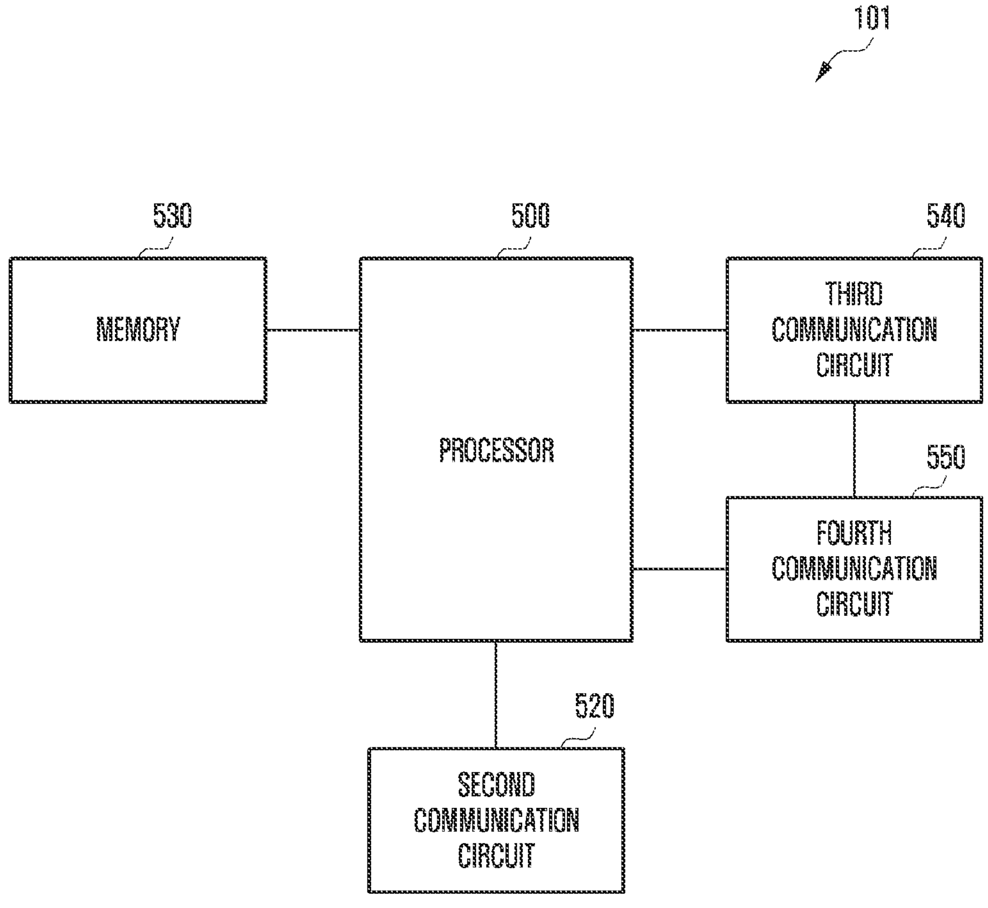
FIG. 5B is a block diagram illustrating an example electronic device for providing a call function according to various embodiments.

FIG. 5A is a block diagram illustrating an example electronic device for providing a call function according to various embodiments, and FIG. 5B is a block diagram illustrating an example electronic device for providing a call function according to various embodiments.

Referring to FIG. 5A, according to various embodiments, the electronic device 101 may include a processor (e.g., including processing circuitry) 500, a first communication circuit 510, a second communication circuit 520, and/or a memory 530. According to an embodiment, the processor 500 may be substantially the same as the processor 120 (e.g., an application processor) of FIG. 1, or may be included in the processor 120. The first communication circuit 510 and/or the second communication circuit 520 may be substantially the same as the wireless communication module 192 of FIG. 1, or may be included in the wireless communication module 192. The memory 530 may be substantially the same as the memory 130 of FIG. 1, or may be included in the memory 130. According to an embodiment, the processor 500, the first communication circuit 510, and/or the second communication circuit 520 may be implemented in a single chip or a single package.

According to various embodiments, the processor 500 may include various processing circuitry and be operatively connected to the first communication circuit 510 and/or the second communication circuit 520. According to an embodiment, the processor 500 may interact with the first communication circuit 510 via, for example, an application processor to communication processor (AP2CP) interface. For example, the AP2CP interface may include at least one of a shared memory scheme or a peripheral component interconnect-express (PCIe).

According to various embodiments, the first communication circuit 510 may include a first processing part (e.g., including processing circuitry and/or executable program elements) 512 and a second processing part (e.g., including processing circuitry and/or executable program elements) 514. According to an embodiment, the first processing part 512 may perform first wireless communication with a first node (e.g., the NR base station 450 of FIG. 4B). For example, the first processing part 512 may perform the first wireless communication, and may perform transmission and/or reception of a control message and data with the first node (e.g., the NR base station 450). For example, the first wireless communication may include a 5G communication scheme (e.g., new radio (NR)). According to an embodiment, the second processing part 514 may perform second wireless communication with a second node (e.g., the LTE base station 440 of FIG. 4B). According to an embodiment, the second processing part 514 may perform second wireless communication, and may perform transmission and/or reception of a control message and data with the second node (e.g., the LTE base station 440). For example, the second wireless communication may include at least one of long-term evolution (LTE), an LTE-advanced (LTE-A), or an LTE advanced pro (LTE-A pro), as the 4G communication scheme. For example, the first processing part 512 and the second processing part 514 may include software which processes different frequency-based signals and protocols. For example, the first processing part 512 and the second processing part 514 may include different circuits or different pieces of hardware. For example, the first processing part 512 and the second processing part 514 may be parts divided logically (e.g., divided based on software).

According to an embodiment, the first communication circuit 510 may include a communication processor (e.g., the second communication processor 214 of FIG. 2), an RFIC (e.g., the third RFIC 226 of FIG. 2), and/or an RFFE (e.g., the third RFFE 236 of FIG. 2) which is related to the first wireless communication, and a communication processor (e.g., the first communication processor 212 of FIG. 2), an RFIC (e.g., the first RFIC 222 of FIG. 2), and/or an RFFE (e.g., the first RFFE 232 of FIG. 2) which is related to the second wireless communication. According to various embodiments, the second communication circuit 520 may perform third wireless communication with a third node (e.g., an access point (AP)). For example, the second communication circuit 520 may perform the third wireless communication, and may perform transmission and/or reception of a control message and data with the third node (e.g., an AP). For example, the third wireless communication is a communication scheme which uses an unlicensed frequency band (unlicensed spectrum), and may include a wireless LAN communication scheme (e.g., Wi-Fi).

According to various embodiments, the processor 500 may control the first communication circuit 510 and/or second communication circuit 520 so that the electronic device 101 and an external device connects a call with each other. According to an embodiment, if the occurrence of an event related to a call function is detected, the processor 500 may set (or select) a network to be used for a call connection to the external device. For example, if the electronic device 101 is not registered with a network of the third wireless communication, the processor 500 is configured to perform a call connection via a network of the first wireless communication or a network of the second wireless communication. For example, if the electronic device 101 is registered with the network of the third wireless communication, the processor 500 may set a network to be used for a call connection based on a call connection mode, and the signal quality of a cellular network (e.g., the network of the first wireless communication or the network of the second wireless communication) and/or the signal quality of the network of the third wireless communication. For example, the signal quality of the cellular network and/or the network of the third wireless communication may include at least one of a reference signal received power (RSRP), a reference signal received quality (RSRQ), received strength indicator (RSSI), a signal to interference plus noise ratio (SINR), a transmission or reception error rate, a packet transmission or reception delay, or a quality of service (QoS). For example, the signal quality of the cellular network may include the signal quality of the cellular network (e.g., the network of the first wireless communication or the network of the second wireless communication) that the electronic device 101 is currently registered with. For example, the call connection mode may be set based on the call policy of the electronic device 101 and/or a user input. For example, the occurrence of an event related to a call function may include at least one of execution of a call application, inputting a call button, or receiving a call.

According to an embodiment, if the call connection mode is set to a first mode (e.g., a Wi-Fi preferred mode), the processor 500 may identify whether the signal quality of the network of the third wireless communication satisfies a designated first quality. For example, if the signal quality of the network of the third wireless communication satisfies the designated first quality, the processor 500 may determine to perform a call connection via the network of the third wireless communication. For example, the state of satisfying the designated first quality may include a state in which the RSRP of the network of the third wireless communication is greater than or equal to a first reference strength (e.g., approximately −70 dBm), irrespective of the signal quality (e.g., RSRP) of the cellular network (e.g., the network of the first wireless communication or the network of the second wireless communication).

For example, if the signal quality of the network of the third wireless communication does not satisfy the designated first quality, the processor 500 may determine to perform a call connection via the cellular network (e.g., the network of the first wireless communication or the network of the second wireless communication). For example, the state in which the designated first quality is not satisfied may include the state in which the RSRP of the network of the third wireless communication is less than the first reference strength (e.g., approximately −70 dBm), irrespective of the signal quality (e.g., RSRP) of the cellular network. As another example, when determining whether to perform a call connection via the cellular network, the processor 500 may additionally determine whether the RSRP of the cellular network is greater than or equal to a second reference strength (e.g., approximately −110 dBm).

According to an embodiment, if a second mode (e.g., a cellular-preferred mode) is set, the processor 500 may identify whether the signal quality of the cellular network (e.g., the network of the first wireless communication or the network of the second wireless communication) and/or the network of the third wireless communication satisfies a designated second quality or a designated third quality. For example, if the signal quality of the cellular network satisfies the designated second quality, the processor 500 may determine to perform a call connection via the cellular network (e.g., the network of the first wireless communication or the network of the second wireless communication). For example, the state in which the designated second quality is satisfied may include the state in which the RSRP of the cellular network is greater than or equal to a second reference strength (e.g., approximately −110 dBm), irrespective of the signal quality (e.g., RSRP) of the network of the third wireless communication.

For example, if the signal quality of the cellular network does not satisfy the designated second quality, the processor 500 may identify whether the signal quality of the cellular network (e.g., the network of the first wireless communication or the network of the second wireless communication) and/or the network of the third wireless communication satisfies a designated third quality. If the signal quality of the cellular network (e.g., the network of the first wireless communication or the network of the second wireless communication) and/or the signal quality of the network of the third wireless communication satisfies a designated third quality, the processor 500 may determine to perform a call connection via the network of the third wireless communication. For example, the state in which the designated third quality is satisfied may include the state in which the RSRP of the cellular network is less than the second reference strength (e.g., approximately −110 dBm) and the RSRP of the network of the third wireless communication is greater than or equal to the first reference strength (e.g., approximately −70 dBm). For example, the state in which the designated second quality is not satisfied may include the state in which the RSRP of the cellular network is less than the second reference strength (e.g., approximately −110 dBm), irrespective of the signal quality (e.g., RSRP) of the network of the third wireless communication.

According to an embodiment, if the processor 500 determines to perform a call connection via the cellular network (e.g., the network of the first wireless communication or the network of the second wireless communication), the processor 500 may transmit a call connection request signal to the first communication circuit 510.

According to an embodiment, if the processor 500 determines to perform a call connection via the network of the third wireless communication, the processor 500 may control the second communication circuit 520 to connect a call with an external device via the network of the third wireless communication using an enhance packet data gateway (ePDG) (or ePDG client) of the processor 500. For example, the ePDG (or ePDG client) of the processor 500 may transmit a call connection request message to the ePDG (or ePDG host) of a network via the second communication circuit 520. If a message related to a session connection is received from the ePDG (or ePDG host) of the network via the second communication circuit 520, the ePDG (or ePDG client) of the processor 500 may connect a call with the external device via the second communication circuit 520. For example, if the processor 500 (e.g., an ePDG client) determines to perform a call connection via the network of the third wireless communication, the processor 500 may transmit information related to a call connection using the network of the third wireless communication to the first communication circuit 510. For example, the information related to a call connection using the network of the third wireless communication may include call start information and/or the signal quality of the third wireless communication.

According to various embodiments, the first communication circuit 510 may perform a call connection with an external device. According to an embodiment, the first communication circuit 510 (e.g., the first processing part 512) may register with the network of the first wireless communication. If a call connection request signal is received from the processor 500 in the state in which the first communication circuit 510 (e.g., the first processing part and/or the second processor part 514) is registered with the network of the first wireless communication (e.g., NR communication), the first communication circuit 510 may be registered with the network of the second wireless communication (e.g., LTE communication) via an evolved packet system (EPS) fallback procedure. The first communication circuit 510 (e.g., the second processing part 514) may connect a call with the external device via the network of the second wireless communication. For example, the first communication circuit 510 (e.g., the first processing part 512 and/or the second processing part 514) may disconnect from the network of the first wireless communication via an EPS fallback procedure, and may establish a connection to the network of the second wireless communication. For example, the network of the first wireless communication which the electronic device 101 is registered with may include a network of the 5G communication scheme that supports EPS fallback.

According to an embodiment, if the first communication circuit 510 (e.g., the second processing part 514) is registered with the network of the second wireless communication, the first communication circuit 510 may identify the signal quality of the second wireless communication continuously or periodically.

According to various embodiments, the second communication circuit 520 may perform a call connection to an external device. According to an embodiment, in the state of being registered with the network of the third wireless communication (e.g., wireless LAN), the second communication circuit 520 may connect a call to the external device via the network of the third wireless communication according to control by the processor 500 (e.g., ePDG). According to an embodiment, if the second communication circuit 520 is registered with the network of the third wireless communication, the second communication circuit 520 may identify the signal quality of the third wireless communication continuously or periodically.

According to various embodiments, the processor 500 may control a call connection to an external device. According to an embodiment, in the state in which the call connection mode is set to the first mode (e.g., a Wi-Fi preferred mode), if a call is connected to the external device via the network of the second wireless communication (e.g., LTE), the processor 500 may identify whether the signal quality of the network of the third wireless communication (e.g., wireless LAN) satisfies the designated first quality. For example, if the signal quality of the network of the third wireless communication does not satisfy the designated first quality, the processor 500 may determine to maintain the call connection to the external device using the second wireless communication. For example, the state in which the designated first quality is not satisfied may include the state in which the RSRP of the network of the third wireless communication is less than the first reference strength (e.g., approximately −70 dBm), irrespective of the signal quality (e.g., RSRP) of the cellular network. As another example, when determining whether to maintain the call connection using the network of the second wireless communication, the processor 500 may additionally determine whether the RSRP of the network of the second wireless communication (e.g., cellular network) is greater than or equal to the second reference strength (e.g., approximately −110 dbm).

For example, if the signal quality of the network of the third wireless communication satisfies the designated first quality, the processor 500 may determine to perform a handover to the third wireless communication. For example, the state in which the designated first quality is satisfied may include the state in which the RSRP of the network of the third wireless communication is greater than or equal to the first reference strength (e.g., approximately −70 dBm), irrespective of the signal quality (e.g., RSRP) of the cellular network.

According to an embodiment, in the state in which the call connection mode is set to the first mode (e.g., a Wi-Fi preferred mode), if a call is connected to the external device via the network of the third wireless communication, the processor 500 may identify whether the signal quality of the network of the third wireless communication satisfies the designated first quality. For example, if the signal quality of the network of the third wireless communication satisfies the designated first quality, the processor 500 may determine to maintain the call connection to the external device using the third wireless communication. For example, the state in which the designated first quality is satisfied may include the state in which the RSRP of the network of the third wireless communication is greater than or equal to the first reference strength (e.g., approximately −70 dBm), irrespective of the signal quality (e.g., RSRP) of the cellular network.

For example, if the signal quality of the network of the third wireless communication does not satisfy the designated first quality, the processor 500 may determine to perform a handover to the cellular network (e.g., the network of the first wireless communication or the network of the second wireless communication). For example, the state in which the designated second quality is not satisfied may include the state in which the RSRP of the network of the third wireless communication is less than the first reference strength (e.g., approximately −70 dBm). For example, when determining whether to perform a handover to the cellular network (e.g., the network of the first wireless communication or the network of the second wireless communication), the processor 500 may additionally determine whether the RSRP of the cellular network is greater than or equal to the second reference strength (e.g., approximately −110 dBm).

According to an embodiment, in the state in which the call connection mode is set to the second mode (e.g., a cellular-preferred mode), if a call is connected to the external device via the network of the second wireless communication, the processor 500 may identify whether the signal quality of the network of the second wireless communication (e.g., the cellular network) and/or the signal quality of the network of the third wireless communication satisfies the designated second quality or the designated third quality. For example, if the signal quality of the network of the second wireless communication satisfies the designated second quality, the processor 500 may maintain the call connection to the external device using the second wireless communication. For example, the state in which the designated second quality is satisfied may include the state in which the RSRP of the network of the second wireless communication is greater than or equal to the second reference strength (e.g., approximately −110 dBm), irrespective of the signal quality (e.g., RSRP) of the network of the third wireless communication.

For example, if the signal quality of the network of the second wireless communication and/or the network of the third wireless communication satisfies the designated third quality, the processor 500 may determine to perform a handover to the third wireless communication. For example, if the signal quality of the network of the second wireless communication does not satisfy the designated second quality, the processor 500 may identify whether the signal quality of the network of the second wireless communication and the signal quality of the network of the third wireless communication satisfy the designated third quality. For example, the state in which the designated third quality is satisfied may include the state in which the RSRP of the network of the second wireless communication is less than the second reference strength (e.g., approximately −110 dBm) and the RSRP of the network of the third wireless communication is greater than or equal to the first reference strength (e.g., approximately −70 dBm). For example, the state in which the designated second quality is not satisfied may include the state in which the RSRP of the network of the second wireless communication is less than the second reference strength (e.g., approximately −110 dBm), irrespective of the signal quality (e.g., RSRP) of the network of the third wireless communication.

According to an embodiment, in the state in which the call connection mode is set to the second mode (e.g., a cellular-preferred mode), if a call is connected to the external device via the network of the third wireless communication, the processor 500 may identify whether the signal quality of the cellular network and/or the signal quality of the network of the third wireless communication satisfies the designated second quality or the designated third quality. For example, if the signal quality of the second wireless communication satisfies the designated second quality, the processor 500 may determine to perform a handover to the second wireless communication. For example, the state in which the designated second quality is satisfied may include the state in which the RSRP of the network of the second wireless communication is greater than or equal to the second reference strength (e.g., approximately −110 dBm).

For example, if the signal quality of the cellular network and/or the signal quality of the network of the third wireless communication satisfies the designated third quality, the processor 500 may maintain the call connection to the external device using the third wireless communication. For example, if the signal quality of the network of the second wireless communication does not satisfy the designated second quality, the processor 500 may identify whether the signal quality of the network of the second wireless communication and the signal quality of the network of the third wireless communication satisfy the designated third quality. For example, the state in which the designated third quality is satisfied may include the state in which the RSRP of the second wireless communication is less than the second reference strength (e.g., approximately −110 dBm) and the RSRP of the network of the third wireless communication is greater than or equal to the first reference strength (e.g., approximately −70 dBm). For example, the state in which the designated second quality is not satisfied may include the state in which the RSRP of the network of the second wireless communication is less than the second reference strength (e.g., approximately −110 dBm), irrespective of the signal quality (e.g., RSRP) of the network of the third wireless communication.

According to an embodiment, if the processor 500 determines to perform a handover to the network of the third wireless communication in the state in which a call is connected to the external device using the network of the second wireless communication, the processor 500 may perform a handover to the network of the third wireless communication using an enhance packet data gateway (ePDG) (or ePDG client) of the processor 500. For example, the ePDG (or ePDG client) of the processor 500 may transmit a call connection request message to the ePDG (or ePDG host) of the network via the second communication circuit 520. If a message related to a session connection is received from the ePDG of the network via the second communication circuit 520, the ePDG (or the second communication circuit 520) of the processor 500 may handover the call connection to the external device to the network of the third wireless communication. For example, if the handover to the third wireless communication is performed, the processor 500 (e.g., an ePDG) may transmit information related to the call connection using the network of the third wireless communication to the first communication circuit 510. For example, the information related to the call connection using the network of the third wireless communication may include call start information and/or the signal quality of the third wireless communication.

According to an embodiment, if the processor 500 determines to perform a handover to the second wireless communication in the state in which the call is connected to the external device via the network of the third wireless communication, the processor 500 may perform a handover to the network of the second wireless communication via the first communication circuit 510. For example, the processor 500 may transmit a call connection request signal to the first communication circuit 510. The first communication circuit 510 (e.g., the second processing part 514) may perform handover to the network of the second wireless communication for the call with the external device using the network of the second wireless communication.

According to various embodiments, the first communication circuit 510 may restrict the use of the first wireless communication based on the provision of a call function provided using the network of the third wireless communication. According to an embodiment, if information related to a call connection provided using the network of the third wireless communication is received from the processor 500 (or the second communication circuit 520), the first communication circuit 510 may restrict the use of the first wireless communication. For example, the restriction of the use of the first wireless communication may be a configuration in which the electronic device 101 does not support the first wireless communication using a non-access stratum (NAS) protocol of the first communication circuit 510. For example, the NAS protocol may restrict a search related to the first wireless communication. For example, based on the restriction of the use of the first wireless communication, the NAS protocol may transmit information related to a search for the network of the second wireless communication to an access stratum (AS) protocol. For example, the information which is related to a search for the network of the second wireless communication and is transmitted to the AS protocol, may include information related to wireless communication that the AS protocol is to search for. For example, if the use of the first wireless communication is restricted, the information related to a search for the network of the second wireless communication may be information related to wireless communication that the AS protocol is to search for, including an LWG (LTE, WCDMA, GSM) mode. For example, the AS protocol may perform a search for the network of the second wireless communication based on the information which is related to a search for the network of the second wireless communication and is received from the NAS protocol. For example, the electronic device 101 may perform a search related to the second wireless communication by receiving at least one of a primary synchronization signal (PSS), a secondary synchronization signal (SSS), a master information block (MIB), a system information block (SIB) via the first communication circuit 510 (e.g., the second processing part 514).

According to an embodiment, the first communication circuit 510 may restrict the use of the first wireless communication based on the signal quality of the third wireless communication if a call function using the third wireless communication network is provided. For example, if it is determined that the signal quality (e.g., a received signal strength) of the network of the third wireless communication received from the processor 500 (e.g., the second communication circuit 520) does not satisfy a designated fourth quality, the first communication circuit 510 may restrict the use of the first wireless communication. For example, the state in which the designated fourth quality is not satisfied may include the state in which the RSRP of the third wireless communication is less than or equal to a third reference strength. As another example, if it is determined that the signal quality of the network of the third wireless communication does not satisfy the designated fourth quality, the processor 500 (or the second communication circuit 520) may transmit, to the first communication circuit 510, a message (e.g., a signal quality event) related to the state in which the signal quality of the network of the third wireless communication does not satisfy the designated fourth quality. Based on the message (e.g., a signal quality event) related to the state in which the signal quality of the network of the third wireless communication does not satisfy the designated fourth quality, the first communication circuit 510 may restrict the use of the first wireless communication.

According to various embodiments, if the network of the first wireless communication does not support a call function, the first communication circuit 510 may restrict the use of the first wireless communication. According to an embodiment, if information related to a call connection using the network of the third wireless communication is received from the processor 500 (or the second communication circuit 520), the first communication circuit 510 may identify whether the network of the first wireless communication supports a call function. According to an embodiment, based on a network used when the electronic device 101 registers with an IP multimedia subsystem (IMS) server and a call connection history associated with the network of the first wireless communication, the first communication circuit 510 may identify whether the network of the first wireless communication supports a call function. For example, if the electronic device 101 is registered with the IMS server via the network of the second wireless communication (e.g., LTE) at the point in time at which the occurrence of an event related to a call function is detected, the first communication circuit 510 may determine that the network of the first wireless communication does not support a call function. For example, if the electronic device 101 does not have a call connection history (or a successful call history) associated with the network of the first wireless communication, the first communication circuit 510 may determine that the network of the first wireless communication does not support a call function. For example, if the electronic device 101 has a call connection history (or a successful call history) associated with the network of the first wireless communication, the first communication circuit 510 may determine that the network of the first wireless communication supports a call function. For example, the call connection history may include network information that the electronic device 101 uses to connect a call to an external device.

According to an embodiment, if it is identified that the network of the first wireless communication does not support a call function, the first communication circuit 510 may restrict the use of the first wireless communication.

According to an embodiment, if it is identified that the network of the first wireless communication supports a call function, the first communication circuit 510 may maintain the use of the first wireless communication.

According to various embodiments, if the use of the first wireless communication is restricted, the first communication circuit 510 may transmit information related to the restriction of the use of the first wireless communication to the network of the second wireless communication.

According to an embodiment, if the use of the first wireless communication is restricted in the state in which the first communication circuit 510 (e.g., the first processing part 512) is registered with the network of the first wireless communication, the first communication circuit 510 may transmit a deregistration request message to the network of the first wireless communication. Based on reception of a deregistration accept message from the network of the first wireless communication, the first communication circuit 510 (e.g., the first processing part 512) may deregister with the network of the first wireless communication. For example, based on the deregistration with the network of the first wireless communication, the first communication circuit 510 (e.g., the second processing part 514) may transmit a registration request (attach request) message that requests registration with the network of the second wireless communication including information indicating that the electronic device 101 does not support the first wireless communication. Based on reception of a registration accept (attach accept) message from the network of the second wireless communication, the first communication circuit 510 (e.g., the second processing part 514) may register with the network of the second wireless communication. For example, the network of the second wireless communication may be identified via a search by the first communication circuit 510 (e.g., the second processing part 514), in association with the second wireless communication.

According to an embodiment, if the use of the first wireless communication is restricted, the first communication circuit 510 (e.g., the second processing part 514) may transmit, to the network of the second wireless communication, a tracking area update (TAU) request message including information indicating that the electronic device 101 does not support the first wireless communication. Based on reception of a TAU accept message from the network of the second wireless communication, the first communication circuit 510 (e.g., the second processing part 514) may register with the network of the second wireless communication. For example, the network of the second wireless communication may be identified via a search by the first communication circuit 510 (e.g., the second processing part 514) in association with the second wireless communication.

According to various embodiments, the first communication circuit 510 may resume the use of the first wireless communication based on a termination of a call connection to an external device. According to an embodiment, if information related to the termination of a call function provided via the network of the second wireless communication or the network of the third wireless communication is received from the processor 500 (or the second communication circuit 520), the first communication circuit 510 may resume the use of the first wireless communication. For example, the resumption of the use of the first wireless communication may be a configuration in which the electronic device 101 supports the first wireless communication using the NAS protocol of the first communication circuit 510. For example, based on the resumption of the use of the first wireless communication, the NAS protocol may transmit information related to a search for the network of the first wireless communication to an AS protocol. For example, if the use of the first wireless communication is resumed, the information which is related to a search for the network of the first wireless communication and is transmitted to the AS protocol may be information related to wireless communication that the AS protocol is to search for, including an NRLWG mode (e.g., NR, LTE, WCDMA, GSM). For example, the AS protocol may search for the network of the first wireless communication based on the information which is related to a search for the network of the first wireless communication and is received from the NAS protocol. For example, the electronic device 101 may search for the network of the first wireless communication by receiving at least one of a synchronization signal block (SSB), a master information block (MIB), a system information block (SIB) via the first communication circuit 510 (e.g., the first processing part 512).

According to an embodiment, if the use of the first wireless communication is resumed, the first communication circuit 510 (e.g., the second processing part 514) may transmit a deregistration request (detach request) message to the network of the second wireless communication. Based on reception of a deregistration accept (detach accept) message from the network of the second wireless communication, the first communication circuit 510 (e.g., the second processing part 514) may deregister with the network of the second wireless communication. For example, based on the deregistration with the network of the second wireless communication, the first communication circuit 510 (e.g., the first processing part 512) may transmit a registration request message to the network of the first wireless communication. Based on reception of a registration accept message from the network of the first wireless communication, the first communication circuit 510 (e.g., the first processing part 512) may register with the network of the first wireless communication. For example, the network of the first wireless communication may be identified via a search by the first communication circuit 510 (e.g., the first processing part 512) in association with the first wireless communication.

According to an embodiment, if the use of the first wireless communication is resumed, the first communication circuit 510 (e.g., the second processing part 514) may transmit, to the network of the second wireless communication, a tracking area update (TAU) request message including information indicating that the electronic device 101 supports the first wireless communication. The first communication circuit 510 (e.g., the second processing part 514) may receive a TAU accept message from the network of the second wireless communication. For example, the first communication circuit 510 (e.g., the first processing part 512) may transmit a registration request message to the network of the first wireless communication identified via the search related to the first wireless communication. Based on reception of a registration accept message from the network of the first wireless communication, the first communication circuit 510 (e.g., the first processing part 512) may register with the network of the first wireless communication.

Referring to FIG. 5B, the first processing part 512 and the second processing part 514 included in the first communication circuit 510 of FIG. 5A may include a third communication circuit 540 and a fourth communication circuit 550 which may be different chips.

According to an embodiment, the third communication circuit 540 may perform a function which is substantially the same as, or similar to, that of the first processing part 512 of the first communication circuit 510. The fourth communication circuit 550 may perform a function which is substantially the same as, or similar to, that of the second processing part 514 of the first communication circuit 510. For example, the third communication circuit 540 may perform first wireless communication with a first node (e.g., the NR base station 450 of FIG. 4B). The fourth communication circuit 550 may perform second wireless communication with a second node (e.g., the LTE base station 440 of FIG. 4B). According to an embodiment, the processor 500, the second communication circuit 520, the third communication circuit 540, and/or the fourth communication circuit 550 may be implemented in a single chip or a single package. For example, the third communication circuit 540 of FIG. 5B may operate in the same manner as the first processing part 512 of FIG. 5A, and the fourth communication circuit 550 may operate in the same manner as the second processing part 514 of FIG. 5A. Accordingly, detailed descriptions of the third communication circuit 540 and the fourth communication circuit 550 will be omitted so as not to redundantly describe what has been described with reference to FIG. 5A.

According to an embodiment, the third communication circuit 540 and the fourth communication circuit 550 may interact with each other via, for example, a communication processor to communication processor (CP2CP) interface. For example, the CP2CP interface may include a universal asynchronous receiver/transmitter (UART). According to an embodiment, the third communication circuit 540 may include a communication processor related to the first wireless communication (e.g., the second communication processor 214 of FIG. 2), an RFIC (e.g., the third RFIC 226 of FIG. 2), and/or an RFFE (e.g., the third RFFE 236 of FIG. 2). According to an embodiment, the fourth communication circuit 550 may include a communication processor related to the second wireless communication (e.g., the first communication processor 212 of FIG. 2), an RFIC (e.g., the first RFIC 222 of FIG. 2), and/or an RFFE (e.g., the first RFFE 232 of FIG. 2).

According to an embodiment, if the use of the first wireless communication is restricted based on the provision of a call function using the network of the third wireless communication, the third communication circuit 540 may be deactivated. According to an embodiment, if the use of the first wireless communication is resumed based on the termination of a call function provided using the network of the third wireless communication, the third communication circuit 540 may be activated.

According to various embodiments, the first communication circuit 510 or the second communication circuit 520 may control a call connection to an external device using the network of the third wireless communication. According to an embodiment, if an ePDG (or an ePDG client) is included, the first communication circuit 510 may control a call connection to the external device using the network of the third wireless communication via an ePDG. According to an embodiment, if an ePDG (or an ePDG client) is included, the second communication circuit 520 may connect a call to the external device using the network of the third wireless communication via the ePDG.

According to various embodiments, the first communication circuit 510 and/or the second communication circuit 520 may control a handover in order to maintain a call connection to an external device. According to an embodiment, if the first communication circuit 510 connects a call to the external device using the network of the second wireless communication, the first communication circuit 510 may determine whether to perform a handover to the network of the third wireless communication based on the signal quality of the second wireless communication and/or third wireless communication. For example, the signal quality of the third wireless communication may be received from the processor 500 or the second communication circuit 520. According to an embodiment, if the second communication circuit 520 connects a call to the external device using the network of the third wireless communication, the second communication circuit 520 may determine whether to perform a handover to the network of the second wireless communication based on the signal quality of the second wireless communication and/or third wireless communication. For example, the signal quality of the second wireless communication may be received from the processor 500 or the first communication circuit 510.

According to various embodiments, the processor 500 may control the first communication circuit 510 so as to restrict the use of the first wireless communication. According to an embodiment, if a call is connected to an external device via the network of the third wireless communication using the second communication circuit 520, the processor 500 may control the first communication circuit 510 so as to restrict the use of the first wireless communication. According to an embodiment, if a call is connected to an external device via the network of the third wireless communication using the second communication circuit 520, the processor 500 may control the first communication circuit 510 so as to restrict the use of the first wireless communication based on whether the network of the first wireless communication supports a call function.

According to various example embodiments, an electronic device (e.g., the electronic device 101 of FIG. 1, FIG. 2, FIG. 5A, or FIG. 5B) may include: a first communication circuit (e.g., the wireless communication module 192 of FIG. 1, the first communication circuit 501 of FIG. 5A, or the third communication circuit 540 of FIG. 5B) configured to support new radio (NR) communication and/or long-term evolution (LTE) communication; a second communication circuit (e.g., the wireless communication module 192 of FIG. 1, or the second communication circuit 520 of FIG. 5A or FIG. 5B) configured to support wireless LAN communication; and at least one processor (e.g., the processor 120 of FIG. 1, or the processor 500 of FIG. 5A or FIG. 5B) operatively connected to the first communication circuit and the second communication circuit, and the processor is configured to control the electronic device to: register with a network of the NR communication via the first communication circuit; connect a call to an external device using the wireless LAN communication base on being in a state of being registered with the network of the NR communication; based on the call connection to the external device using the wireless LAN communication, restrict use of the NR communication; and based on the restriction of the use of the NR communication, register with a network of the LTE communication via the first communication circuit.

According to various example embodiments, the first communication circuit may be configured to: transmit a message related to a deregistration request to the network of the NR communication based on the restriction of the use of the NR communication, deregister with the network of the NR communication based on a response message to the message related to the deregistration request, identify a network of the LTE communication which the electronic device is capable of registering with, transmit, to the identified network of the LTE communication, a message related to a registration request including information related to the restriction of the use of the NR communication, and based on a response message to the message related to the registration request, register with the identified network of the LTE communication.

According to various example embodiments, the first communication circuit may be configured to: identify the network of the LTE communication which the electronic device is capable of registering with based on the restriction of the use of the NR communication; transmit, to the identified network of the LTE communication, a tracking area update request message including information related to the restriction of the use of the NR communication, and based on a response message to the request message, register with the identified network of the LTE communication.

According to various example embodiments, based on the restriction of the use of the NR communication, the first communication circuit may be configured to restrict a search for a network of the NR communication via the first communication circuit.

According to various example embodiments, the processor may be configured to control the electronic device to: identify a signal quality of the network of the wireless LAN communication based on being in a state in which the call with the external device is connected via the wireless LAN communication, and based on the signal quality of the network of the wireless LAN communication satisfying a designated condition, may restrict use of the NR communication, wherein the signal quality may include at least one of a reference signal received power (RSRP), a reference signal received quality (RSRQ), a received strength indicator (RSSI), a signal to interference plus noise ratio (SINR), a transmission/reception error rate, a packet transmission/reception delay, or a quality of service (QoS).

According to various example embodiments, based on the call with the external device being terminated, the first communication circuit may be configured to: resume use of the NR communication, identify the network of the NR communication which the electronic device is capable of registering with, and register with the identified network of the NR communication via the first communication circuit.

According to various example embodiments, the first communication circuit may be configured to: resume the use of the NR communication based on the call with the external device being terminated, transmit a message related to a deregistration request to the network of the LTE communication based on the resumption of the use of the NR communication, deregister with the network of the LTE communication based on a response message to the message related to the deregistration request, identify a network of the NR communication which the electronic device is capable of registering with, transmit the message related to a registration request to the identified network of the NR communication, and based on a response message to the message related to the registration request, register with the network of the NR communication.

According to various example embodiments, the first communication circuit may be configured to: resume the use of the NR communication based on the call with the external device being terminated, transmit, to the network of the LTE communication, a tracking area update request message including information related to the resumption of the use of the NR communication based on the resumption of the use of the NR communication, identify a network of the NR communication which the electronic device is capable of registering with based on a response message to the request message being received, transmit a message related to a registration request to the identified network of the NR communication, and register with the identified network of the NR communication based on a response message to the message related to the registration request.

According to various example embodiments, the processor may identify whether the network of the NR communication supports a call function based on a call connection history of the electronic device and/or information related to a network used for registering with an IP multimedia subsystem (IMS) server, and may restrict the use of the NR communication based on the call connection to the external device using the wireless LAN communication if it is identified that the network of the NR communication does not support the call function.

According to various example embodiments, if it is identified that the network of the NR communication supports the call function, the processor may maintain the use of the NR communication.

According to various example embodiments, an electronic device (e.g., the electronic device 101 of FIG. 1, FIG. 2, FIG. 5A, or FIG. 5B) may include: a first communication circuit (e.g., the wireless communication module 192 of FIG. 1, the first communication circuit 510 of FIG. 5A, or the third communication circuit 540 of FIG. 5B) configured to support new radio (NR) communication and/or long-term evolution (LTE) communication, a second communication circuit (e.g., the wireless communication module 192 of FIG. 1, the second communication circuit 520 of FIG. 5A or FIG. 5B) configured to support wireless LAN communication, and at least one processor (e.g., the processor 120 of FIG. 1, or the processor 500 of FIG. 5A or FIG. 5B) operatively connected to the first communication circuit and the second communication circuit, and the processor is configured to control the electronic device to: register with a network of the NR communication via the first communication circuit; register with a network of the LTE communication based on a call connection request requesting a connection to an external device based on being in the state of being registered with the network of the NR communication; and connect a call to the external device using the LTE communication, and based on the signal quality of the network of the LTE communication and/or the signal quality of the network of the wireless LAN communication satisfying a designated first condition, the processor is configured to: maintain the call with the external device by performing a handover to the network of the wireless LAN communication, and restrict the use of the NR communication based on performing of the call with the external device using the wireless LAN communication.

According to various example embodiments, based on a call connection request that requests a connection with the external device based on being in the state of being registered with the network of the NR communication, the first communication circuit may be configured to: deregister with the network of the NR communication via an evolved packet system (EPS) fallback, register with the network of the LTE communication, and connect a call to the external device via the LTE communication.

According to various example embodiments, the processor may be configured to control the electronic device to: identify the signal quality of the network of the wireless LAN communication based on being in the state in which a call with the external device is connected using the wireless LAN communication, and based on the signal quality of the network of the wireless LAN communication satisfying a designated second condition, the processor may be further configured to control the electronic device to restrict the use of the NR communication, wherein the signal quality may include at least one of a reference signal received power (RSRP), a reference signal received quality (RSRQ), a received strength indicator (RSSI), a signal to interference plus noise ratio (SINR), a transmission or reception error rate, a packet transmission or reception delay, or a quality of service (QoS).

According to various example embodiments, based on the use of the NR communication being restricted and the first communication circuit being registered with the network of the LTE communication, the first communication circuit may be configured to maintain the registration with the network of the LTE communication. If the use of the NR communication is restricted and the first communication circuit is registered with the network of the NR communication, the first communication circuit may be configured to: identify the network of the LTE communication which the electronic device is capable of registering with, and newly register with the identified network of the LTE communication.

Figure 6:
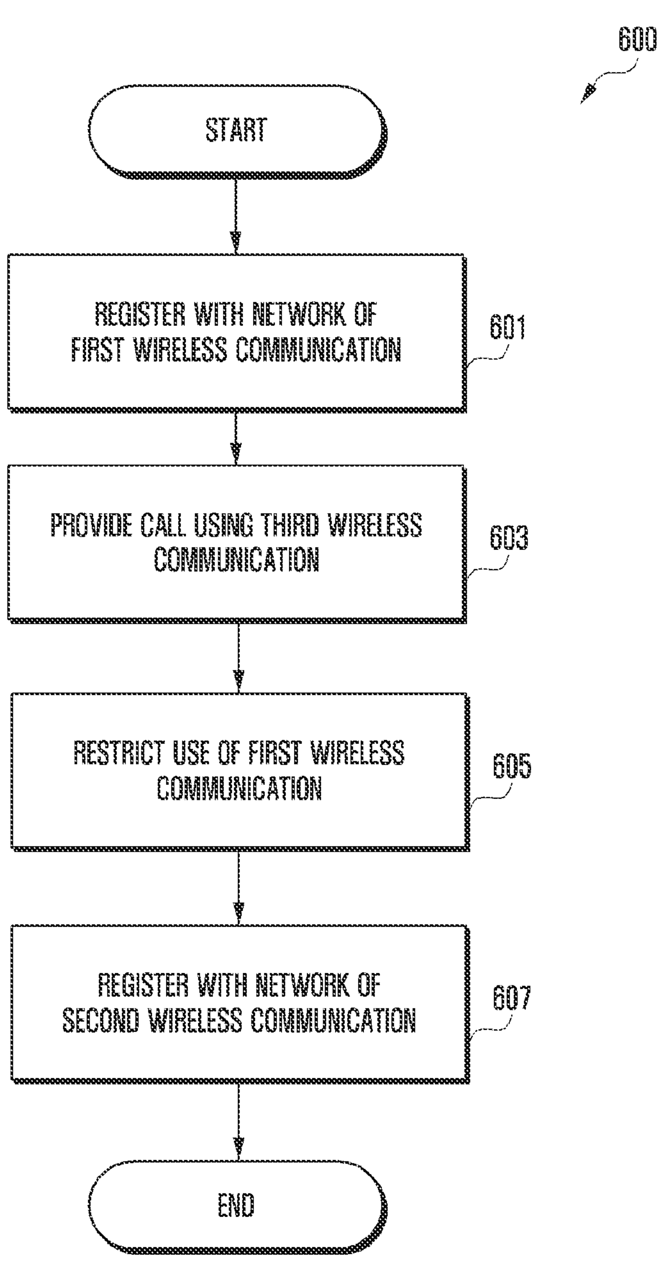
FIG. 6 is a flowchart illustrating an example process of restricting the use of first wireless communication based on a call function provided using third wireless communication, by an electronic device according to various embodiments.

FIG. 6 is a flowchart 600 illustrating an example process of restricting the use of first wireless communication based on a call function provided using third wireless communication, by an electronic device according to various embodiments. In the example embodiment provided hereinafter, operations may be performed sequentially, but not necessarily. For example, the order of operations may be changed, and at least two operations may be performed in parallel. For example, and without limitation, the electronic device may include the electronic device 101 of FIG. 1, FIG. 2, FIG. 5A, or FIG. 5B.

Referring to FIG. 6, according to various embodiments, an electronic device (e.g., the wireless communication module 192 of FIG. 1, the first communication circuit 510 of FIG. 5A, or the third communication circuit 540 of FIG. 5B) may register with (or attach to) a network of first wireless communication (e.g., NR) in operation 601. According to an embodiment, the first communication circuit 510 (e.g., the first processing part 512) may register with a first node (e.g., the NR base station 450) via the first wireless communication. According to an embodiment, if the network of the first wireless communication operates independently from a network of the second wireless communication (e.g., Standalone (SA)), the electronic device 101 may preferentially register with the network of the first wireless communication.

According to various embodiments, the electronic device (e.g., the processor 120, the wireless communication module 192, the processor 500, the first communication circuit 510, the second communication circuit 520, or the third communication circuit 540) may provide a call function using third wireless communication (e.g., wireless LAN communication) in operation 603. According to an embodiment, in the state in which the processor 500 is registered with the network of the first wireless communication via the first communication circuit 510, and is registered with the network of the third wireless communication via the second communication circuit 520, the processor 500 may detect the occurrence of an event related to the call function. The processor 500 may select a network of a communication scheme to be used for the call function based on a call connection mode, the signal quality of a cellular network (e.g., the network of the first wireless communication) and/or the signal quality of the network of the third wireless communication. For example, if the call connection mode is a first mode (e.g., a Wi-Fi preferred mode) and the signal quality of the network of the third wireless communication satisfies a designated first quality, the processor 500 may provide a call function via the network of the third wireless communication. For example, the state in which the designated first quality is satisfied may include the state in which the RSRP of the third wireless communication is greater than or equal to a first reference strength (e.g., approximately −70 dBm). For example, if the call connection mode is a second mode (e.g., a cellular preferred mode), and the signal quality of the cellular network and the signal quality of the network of the third wireless communication satisfy a designated third quality, the processor 500 may provide a call function via the network of the third wireless communication. For example, the state in which the designated third quality is satisfied may include the state in which the RSRP of the cellular network (e.g., the network of the first wireless communication) is less than a second reference strength (e.g., approximately −110 dBm) and the RSRP of the network of the third wireless communication is greater than or equal to the first reference strength (e.g., approximately −70 dBm). For example, the call connection mode may be set based on the call policy of the electronic device 101 and/or a user input. For example, the occurrence of an event related to a call function may include at least one of execution of a call application, inputting a call button, or receiving a call.

According to various embodiments, the electronic device (e.g., the processor 120, the wireless communication module 192, the processor 500, the first communication circuit 510, the second communication circuit 520, or the third communication circuit 540) may restrict the use of the first wireless communication based on the provision of the call using the network of the third wireless communication in operation 605. According to an embodiment, if information related to the provision of the call function using the network of the third wireless communication is received from the processor 500 (or the second communication circuit 520), the first communication circuit 510 may restrict the use of the first wireless communication. For example, if the information related to the provision of the call function using the network of the third wireless communication is received, the first communication circuit 510 may perform configuration so that the electronic device 101 does not support the first wireless communication via a non-access stratum (NAS) protocol. For example, the NAS protocol may restrict a search related to the first wireless communication. For example, based on the restriction of the use of the first wireless communication, the NAS protocol may perform control so that a search for a network of the second wireless communication is performed using an access stratum (AS) protocol. According to an embodiment, based on the restriction of the use of the first wireless communication, the first communication circuit 510 (e.g., the first processing part 512) may transmit a deregistration request message to the network of the first wireless communication. Based on reception of a deregistration accept message from the network of the first wireless communication, the first communication circuit 510 (e.g., the first processing part 512) may deregister with the network of the first wireless communication.

According to various embodiments, the electronic device (e.g., the wireless communication module 192, the first communication circuit 510, or the third communication circuit 540) may register with the network of the second wireless communication (e.g., LTE communication) based on the restriction of the use of the first wireless communication in operation 607. According to an embodiment, based on the deregistration with the network of the first wireless communication, the first communication circuit 510 (e.g., the second processing part 514) may identify the network of the second wireless communication which the electronic device 101 is capable of registering with via the search related to the second wireless communication. The first communication circuit 510 (e.g., the second processing part 514) may transmit, to the network of the second wireless communication, a registration request (attach request) message including information indicating that the electronic device 101 does not support the first wireless communication. Based on reception of a registration accept (attach accept) message from the network of the second wireless communication, the first communication circuit 510 (e.g., the second processing part 514) may register with the network of the second wireless communication.

According to an embodiment, if the use of the first wireless communication is restricted, the first communication circuit 510 (e.g., the second processing part 514) may identify the network of the second wireless communication which the electronic device 101 is capable of registering with via the search related to the second wireless communication. The first communication circuit 510 (e.g., the second processing part 514) may transmit, to the network of the second wireless communication, a tracking area update (TAU) request message including information indicating that the electronic device 101 does not support the first wireless communication. Based on reception of a TAU accept message from the network of the second wireless communication, the first communication circuit 510 (e.g., the second processing part 514) may register with the network of the second wireless communication.

According to various embodiments, the electronic device 101 may restrict the use of the first wireless communication based on the call connection to the external device using the network of the third wireless communication. Based on the restriction of the use of the first wireless communication, the electronic device 101 may register with the network of the second wireless communication while having the call connection to the external device using the network of the third wireless communication. Accordingly, if it is determined that the electronic device 101 is incapable of maintaining the call connection to the external device using the network of the third wireless communication, the electronic device 101 may perform a handover to the network of the second wireless communication and may maintain the call connection to the external device.

Figure 7:
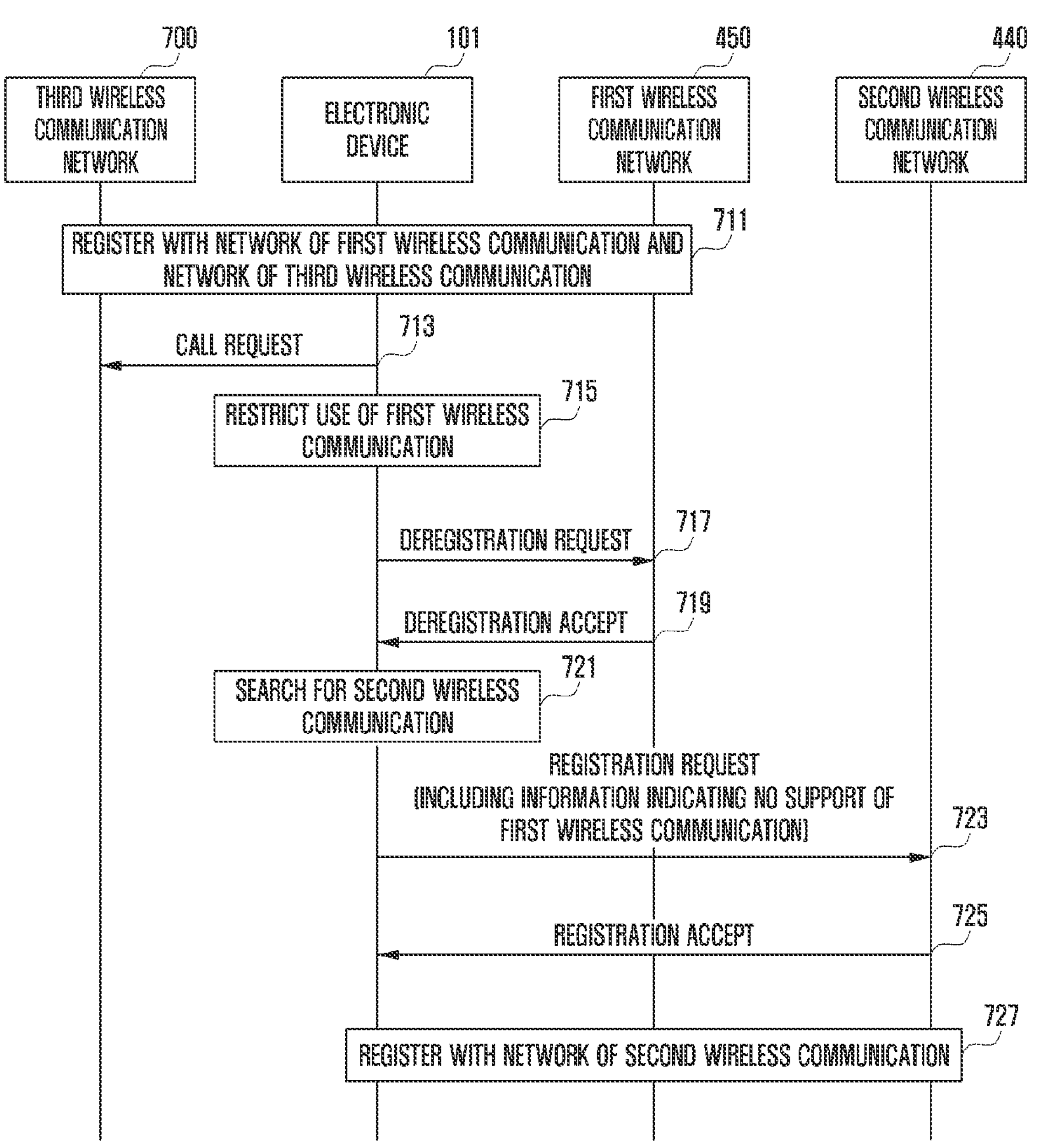
FIG. 7 is a signal flow diagram illustrating an example of restricting the use of first wireless communication based on a call function provided using third wireless communication, by an electronic device according to various embodiments.

FIG. 7 is a signal flow diagram illustrating an example of restricting the use of first wireless communication based on a call function provided using third wireless communication, by an electronic device according to various embodiments.

Referring to FIG. 7, according to various embodiments, the electronic device 101 may register with the network 450 (e.g., the NR base station 450 of FIG. 4A) of first wireless communication (e.g., NR communication) and with a network 700 of third wireless communication (e.g., wireless LAN communication) in operation 711.

According to various embodiments, if the electronic device 101 determines to provide a call function using the network 700 of the third wireless communication, the electronic device 101 may transmit a message related to a call request to the network 700 of the third wireless communication in operation 713. According to an embodiment, if the occurrence of an event related to a call function is detected, the electronic device 101 may determine to provide a call service using the third wireless communication based on a call connection mode, the signal quality of a cellular network (e.g., the network 450 of the first wireless communication), and/or the signal quality of the network 700 of the third wireless communication. For example, if the call connection mode is set to a first mode (e.g., a Wi-Fi preferred mode) and the signal quality of the network 700 of the third wireless communication satisfies a designated first quality, the electronic device 101 may determine to provide a call function using the third wireless communication.

According to various embodiments, the electronic device 101 may restrict the use of the first wireless communication based on a call connection to an external device using the network 700 of the third wireless communication in operation 715. According to an embodiment, the electronic device 101 may restrict the use of the first wireless communication based on transmission of a message related to a call request to the network 700 of the third wireless communication. According to an embodiment, based on the restriction of the use of the first wireless communication, the electronic device 101 may update capability of the electronic device 101 with capability that does not support the first wireless communication.

According to various embodiments, the electronic device 101 may transmit a deregistration request message to the network 450 of the first wireless communication based on the restriction of the use of the first wireless communication in operation 717.

According to various embodiments, the network 450 of the first wireless communication may transmit a deregistration accept message to the electronic device 101 in response to the deregistration request message received from the electronic device 101 in operation 719.

According to various embodiments, the electronic device 101 may deregister with the network 450 of the first wireless communication based on the deregistration accept message received from the network 450 of the first wireless communication. In operation 721, the electronic device 101 may identify the network 440 (e.g., the LTE base station 440 of FIG. 4A) of second wireless communication which the electronic device 101 is capable of registering with, via a search related to the second wireless communication (e.g., LTE communication) based on the deregistration with the network 450 of the first wireless communication.

According to various embodiments, the electronic device 101 may transmit a registration request (e.g., attach request) message including information indicating that the electronic device 101 does not support the first wireless communication, to the network 440 of the second wireless communication in operation 723. According to an embodiment, the registration request message may include the information indicating no support of the first wireless communication, which is represented by setting the N1 mode of a UE network capability information element to "0" in the second wireless communication (e.g., communication related to 3GPP TS 24.301 standard) as shown in Table 1 provided below.

TABLE 1

| N1 mode supported (N1 mod) (octet 9, bit 6) This bit indicates the capability for N1 mode. | |
|---|---|
| 0 | N1 mode not supported |
| 1 | N1 mode supported |

According to an embodiment, based on the registration request message, the network 440 of the second wireless communication may determine that the electronic device 101 does not support the first wireless communication.

According to various embodiments, the network 440 of the second wireless communication may transmit a registration accept (e.g., attach accept) message to the electronic device 101 in response to the registration request message received from the electronic device 101 in operation 725.

According to various embodiments, the electronic device 101 may register with the network 440 of the second wireless communication based on the registration accept message received from the network 440 of the second wireless communication in operation 727. According to an embodiment, the electronic device 101 may register with the network 440 of the second wireless communication while providing a call function using the network 700 of the third wireless communication.

Figure 8:
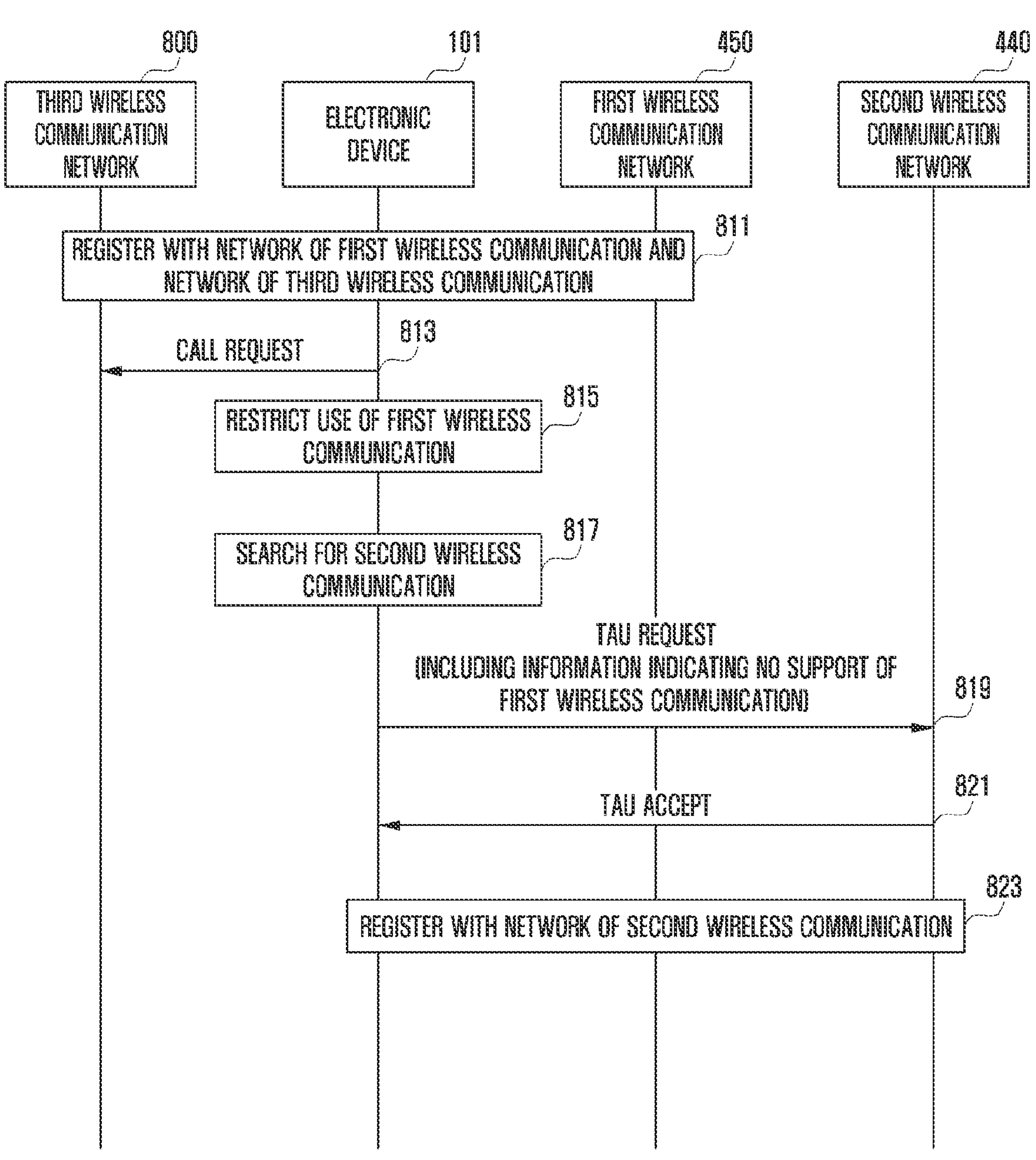
FIG. 8 is a signal flow diagram illustrating an example of restricting the use of first wireless communication based on a call function provided using third wireless communication, by an electronic device according to various embodiments.

FIG. 8 is a signal flow diagram illustrating an example of restricting the use of first wireless communication based on a call function provided using third wireless communication, by an electronic device according to various embodiments.

Referring to FIG. 8, according to various embodiments, the electronic device 101 may register with the network 450 (e.g., the NR base station 450 of FIG. 4A) of first wireless communication (e.g., NR communication) and a network 800 of third wireless communication (e.g., wireless LAN communication) in operation 811.

According to various embodiments, if the electronic device 101 determines to provide a call function using the network 800 of the third wireless communication, the electronic device 101 may transmit a signal related to a call request to the network 800 of the third wireless communication in operation 813. According to an embodiment, provision of a call service using the third wireless communication may be selected based on a call connection mode, the signal quality of a cellular network (e.g., the network 450 of the first wireless communication) and/or the signal quality of the network of the third wireless communication.

According to various embodiments, based on a call connection to an external device using the network 800 of the third wireless communication, the electronic device 101 may restrict the use of the first wireless communication in operation 815. According to an embodiment, the electronic device 101 may restrict the use of the first wireless communication based on the transmission of a message related to the call request to the network 800 of the third wireless communication.

According to various embodiments, based on the restriction of the use of the first wireless communication, the electronic device 101 may identify the network 440 (e.g., the LTE base station 440 of FIG. 4A) of second wireless communication which the electronic device 101 is capable of registering with, via a search related to the second wireless communication (e.g., LTE communication) in operation 817.

According to various embodiments, the electronic device 101 may transmit a tracking area update (TAU) request message including information indicating that the electronic device 101 does not support the first wireless communication, to the network 440 of the second wireless communication in operation 819. According to an embodiment, the TAU request message may include information indicating no support of the first wireless communication, which is represented by setting the N1 mode of the UE network capability information element to "0", as shown in Table 1. According to an embodiment, based on the TAU request message, the network 440 of the second wireless communication may determine that the electronic device 101 does not support the first wireless communication.

According to various embodiments, the network 440 of the second wireless communication may transmit a TAU accept message to the electronic device 101 in response to the TAU request message received from the electronic device 101 in operation 821.

According to various embodiments, the electronic device 101 may register with the network 440 of the second wireless communication based on the TAU accept message received from the network 440 of the second wireless communication in operation 823. According to an embodiment, the electronic device 101 may register with the network 440 of the second wireless communication while providing a call function using the network 800 of the third wireless communication.

FIG. 9 is a flowchart 900 illustrating an example process of restricting the use of first wireless communication based on the signal quality of third wireless communication, by an electronic device according to various embodiments. In the embodiment provided hereinafter, operations may be performed sequentially, but not necessarily. For example, the order of operations may be changed, and at least two operations may be performed in parallel. For example, and without limitation, the electronic device 101 may be the electronic device 101 of FIG. 1, FIG. 2, FIG. 5A, or FIG. 5B.

Referring to FIG. 9, according to various embodiments, an electronic device (e.g., the wireless communication module 192 of FIG. 1, the first communication circuit 510 of FIG. 5A, or the third communication circuit 540 of FIG. 5B) may register with (or attach to) a network of first wireless communication (e.g., NR) in operation 901. According to an embodiment, if the network of the first wireless communication operates independently from a network of second wireless communication (e.g., an SA mode), the electronic device 101 may preferentially register with the network of the first wireless communication.

According to various embodiments, in the state of being registered with the network of the first wireless communication, the electronic device (e.g., the processor 120, the wireless communication module 192, the processor 500, the first communication circuit 510, the second communication circuit 520, or the third communication circuit 540) may identify provision of a call function using third wireless communication (e.g., wireless LAN communication) in operation 903. According to an embodiment, if the electronic device 101 is registered with a network of the third wireless communication via the second communication circuit 520, the processor 500 may provide a call function using the third wireless communication based on a call connection mode, the signal quality of a cellular network (e.g., the network of the first wireless communication), and/or the signal quality of the network of the third wireless communication. For example, if the call connection mode is a first mode (e.g., a Wi-Fi preferred mode) and the signal quality of the third wireless communication satisfies a designated first quality, the processor 500 may provide a call function using the third wireless communication. For example, the state in which the designated first quality is satisfied may include the state in which the RSRP of the third wireless communication is greater than or equal to a first reference strength (e.g., approximately −70 dBm). For example, the call connection mode may be set based on the call policy of the electronic device 101 and/or a user input. For example, the occurrence of an event related to a call function may include at least one of execution of a call application, inputting a call button, or receiving a call.

According to various embodiments, the electronic device (e.g., the processor 120, the wireless communication module 192, the processor 500, or the second communication circuit 520) may identify the signal quality of the network of third wireless communication in operation 905. According to an embodiment, if it is determined to maintain the call with an external device, the second communication circuit 520 may identify the signal quality of the network of the third wireless communication continuously or periodically. For example, the signal quality of the network of the third wireless communication may include at least one of an RSRP, an RSRQ, an RSSI, an SINR, a transmission/reception error rate, a packet transmission/reception delay, or a QoS.

According to various embodiments, the electronic device (e.g., the processor 120, the wireless communication module 192, the processor 500, or the second communication circuit 520) may identify whether the signal quality of a network of third wireless communication satisfies a second designated condition in operation 907.

According to various embodiments, if the signal quality of the network of the third wireless communication does not satisfy the designated second condition (e.g., "No" in operation 907), the electronic device (e.g., the processor 120, the wireless communication module 192, the processor 500, or the second communication circuit 520) may maintain a call connection to the external device using the third wireless communication in operation 905. According to an embodiment, if the signal quality of the network of the third wireless communication does not satisfy the designated second condition, the processor 500 (or the second communication circuit 520) may determine that the probability of the occurrence of a handover to the cellular network (e.g., the network of the first wireless communication or the second wireless communication) is relatively low. For example, the state in which the designated second condition is not satisfied may include the state in which the RSRP of the third wireless communication is greater than a third reference strength. According to an embodiment, if it is determined that the probability of the occurrence of a handover to the cellular network (e.g., the network of the first wireless communication or the second wireless communication) is relatively low, the processor 500 (or the second communication circuit 520) may determine to maintain the use of the first wireless communication. For example, the first communication circuit 510 may maintain the registration with the network of the first wireless communication.

According to various embodiments, if the signal quality of the network of the third wireless communication satisfies the designated second condition (e.g., "Yes" in operation 907), the electronic device (e.g., the processor 120, the wireless communication module 192, the processor 500, the first communication circuit 510, the second communication circuit 520, or the third communication circuit 540) may restrict the use of the first wireless communication in the state of maintaining the call connection to the external device using the third wireless communication in operation 909. According to an embodiment, if the signal quality of the network of the third wireless communication satisfies the designated second condition, the processor 500 (or the second communication circuit 520) may determine that the probability of the occurrence of a handover to the cellular network (e.g., the network of the first wireless communication or the second wireless communication) is relatively high. For example, the state in which the designated second condition is satisfied may include the state in which the RSRP of the third wireless communication is less than or equal to the third reference strength. According to an embodiment, if it is determined that the probability of the occurrence of a handover to the cellular network (e.g., the network of the first wireless communication or the second wireless communication) is relatively high, the processor 500 (or the second communication circuit 520) may transmit information related to the signal quality of the network of the third wireless communication to the first communication circuit 510. If the information related to the signal quality of the network of the third wireless communication is received from the processor 500 (or the second communication circuit 520), the first communication circuit 510 may restrict the use of the first wireless communication. For example, if the information related to the signal quality of the network of the third wireless communication is received, the first communication circuit 510 may perform configuration so that the electronic device 101 does not support the first wireless communication using an NAS protocol. For example, the NAS protocol may restrict a search related to the first wireless communication. For example, based on the restriction of the use of the first wireless communication, the NAS protocol may perform control so that a search for a network of the second wireless communication is performed using an AS protocol. According to an embodiment, the first communication circuit 510 (e.g., the first processing part 512) may deregister with the network of the first wireless communication based on the restriction of the use of the first wireless communication.

According to various embodiments, the electronic device (e.g., the wireless communication module 192, the first communication circuit 510, or the third communication circuit 540) may register with the network of the second wireless communication (e.g., LTE communication) based on the restriction of the use of the first wireless communication in operation 911. According to an embodiment, the first communication circuit 510 (e.g., the second processing part 514) may register with the network of the second wireless communication based on a registration request message. According to an embodiment, the first communication circuit 510 (e.g., the second processing part 514) may register with the network of the second wireless communication based on a TAU request message.

Figure 10:
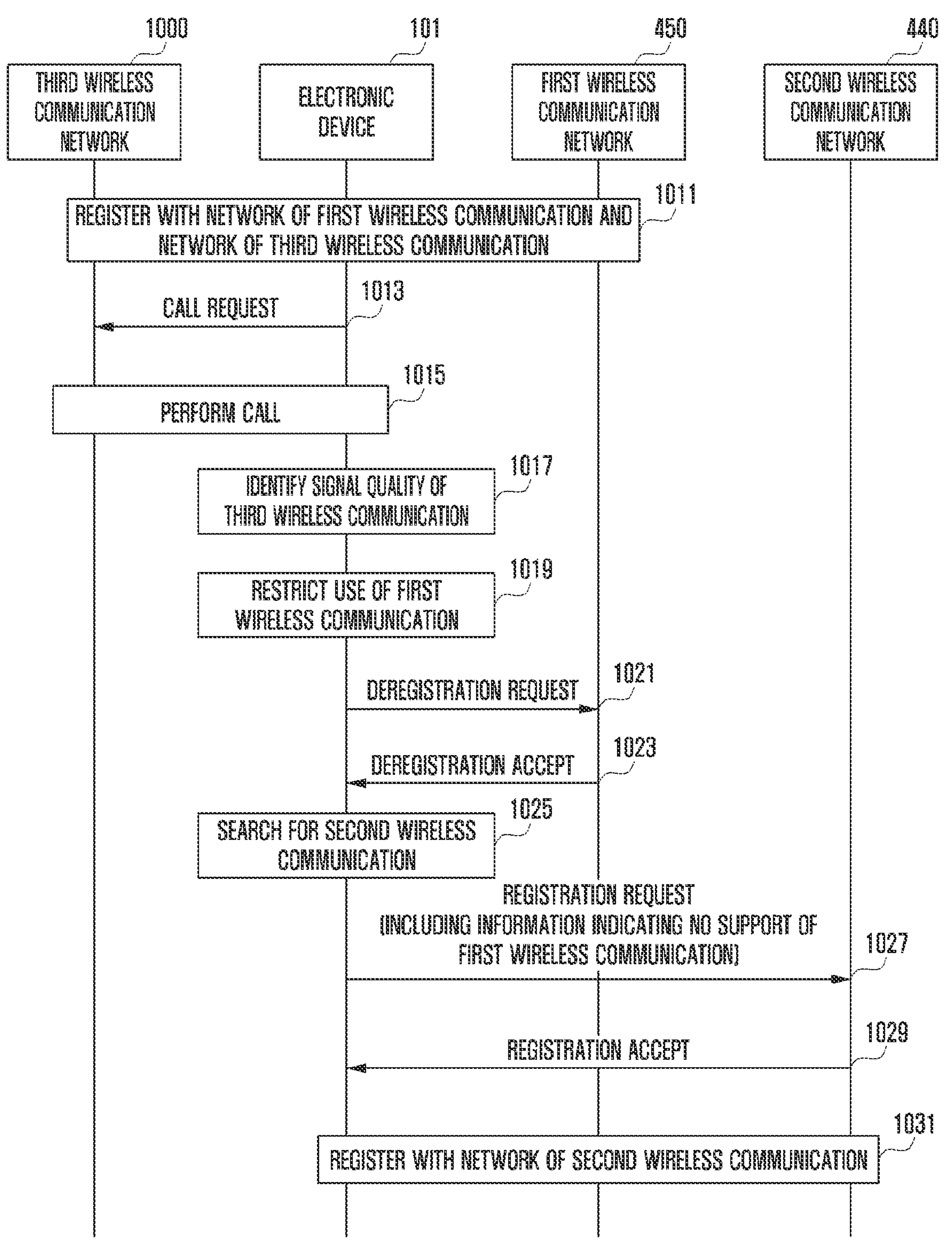
FIG. 10 is a signal flow diagram illustrating an example of restricting the use of first wireless communication based on the signal quality of third wireless communication, by an electronic device according to various embodiments.

FIG. 10 is a signal flow diagram illustrating an example of restricting the use of first wireless communication based on the signal quality of third wireless communication, by an electronic device according to various embodiments.

Referring to FIG. 10, according to various embodiments, the electronic device 101 may register with the network 450 (e.g., the NR base station 450 of FIG. 4A) of first wireless communication (e.g., NR communication) and a network 1000 of third wireless communication (e.g., wireless LAN communication) in operation 1011.

According to various embodiments, if the electronic device 101 determines to provide a call function using the network 1000 of the third wireless communication, the electronic device 101 may transmit a message related to a call request to the network 1000 of the third wireless communication in operation 1013. According to an embodiment, if the occurrence of an event related to a call function is detected, the electronic device 101 may determine to provide a call service using the third wireless communication based on a call connection mode, the signal quality of a cellular network, and/or the signal quality of the network 1000 of the third wireless communication. For example, the call connection mode may be set based on the call policy of the electronic device 101 and/or a user input.

According to various embodiments, based on transmission of a signal related to the call request to the network 1000 of the third wireless communication, the electronic device 101 may connect a call to an external device using the network 1000 of the third wireless communication in operation 1015.

According to various embodiments, the electronic device 101 may continuously or periodically identify the signal quality of the network 1000 of the third wireless communication while performing the call with the external device using the third wireless communication in operation 1017. For example, the signal quality of the network 1000 of the third wireless communication may include at least one of an RSRP, an RSRQ, an RSSI, an SINR, a transmission/reception error rate, a packet transmission/reception delay, or a QoS.

According to various embodiments, if the signal quality of the network 1000 of the third wireless communication satisfies a designated second condition, the electronic device 101 may restrict the use of the first wireless communication in operation 1019. According to an embodiment, the electronic device 101 may restrict the use of the first wireless communication in the state of maintaining the call connection to the external device using the network 1000 of the third wireless communication. According to an embodiment, the electronic device 101 may update capability of the electronic device 101 with capability that does not support the first wireless communication based on the restriction of the use of the first wireless communication. For example, the state in which the designated second condition is satisfied may include the state in which the RSRP of the third wireless communication is less than or equal to a third reference strength.

According to various embodiments, in operations 1021 to 1031, the electronic device 101 may deregister with the first wireless communication network 450 based on the restriction of the use of the first wireless communication of the electronic device 101, and may register with the second wireless communication network 440 based on a request for registering with the second wireless communication network 440. For example, operations 1021 to 1031 of FIG. 10 may operate in the same or similar manner as operations 717 to 727 of FIG. 7. Accordingly, a detailed description of operations 1021 to 1031 will not be repeated here.

Figure 11:
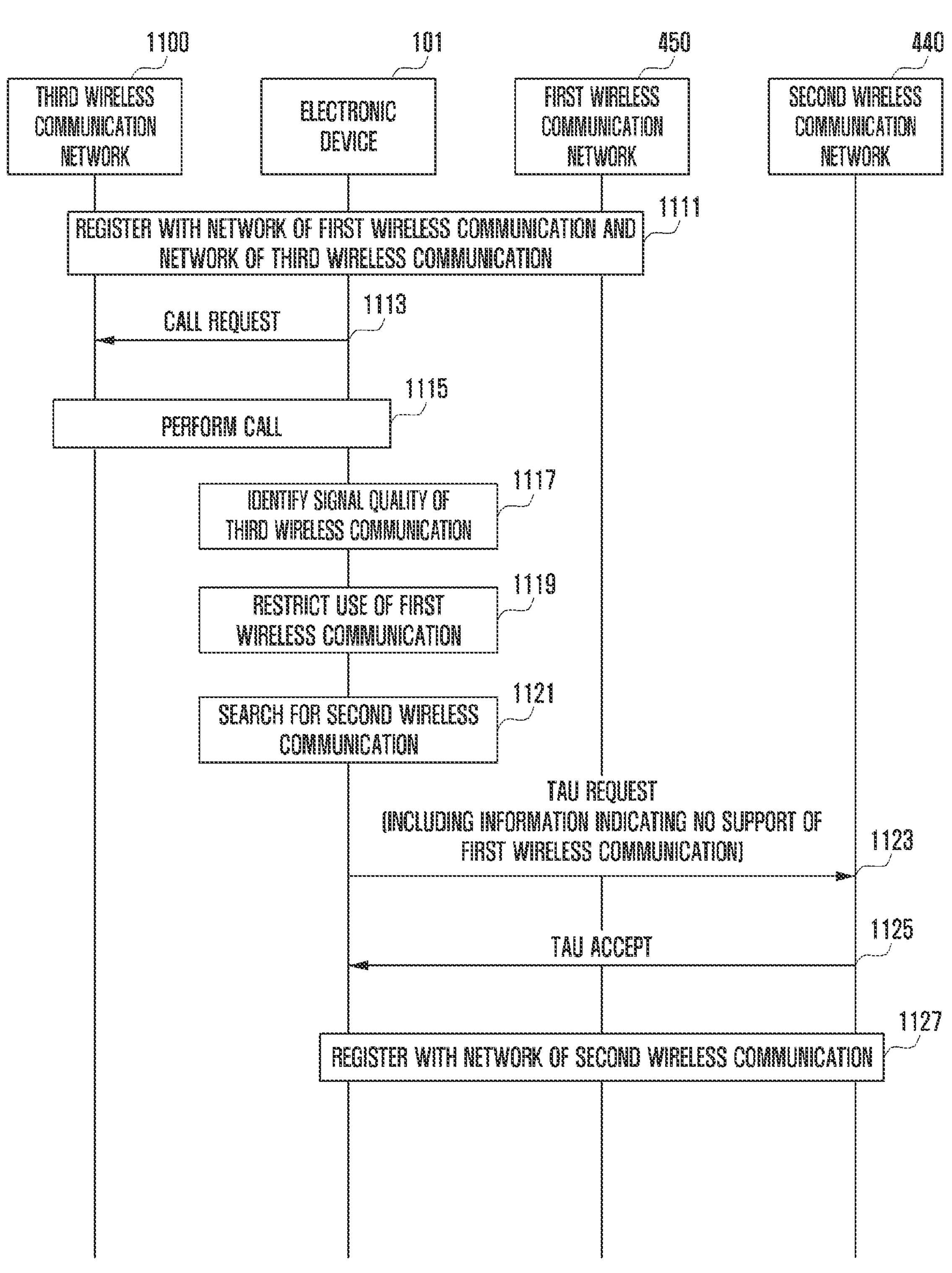
FIG. 11 is a signal flow diagram illustrating an example of restricting the use of first wireless communication based on the signal quality of third wireless communication, by an electronic device according to various embodiments.

FIG. 11 is a signal flow diagram illustrating an example of restricting the use of first wireless communication based on the signal quality of third wireless communication, by an electronic device according to various embodiments.

Referring to FIG. 11, according to various embodiments, the electronic device 101 may register with the network 450 (e.g., the NR base station 450 of FIG. 4A) of first wireless communication (e.g., NR communication) and a network 1100 of third wireless communication (e.g., wireless LAN communication) in operation 1111.

According to various embodiments, if the electronic device 101 determines to provide a call function using the network 1100 of the third wireless communication 1100, the electronic device 101 may transmit a signal related to a call request to the network 1100 of the third wireless communication in operation 1113. According to an embodiment, if the electronic device 101 is registered with the network 1100 of the third wireless communication when an event related to the call function occurs, the electronic device 101 may determine to provide a call service using the third wireless communication based on a call connection mode, the signal quality of a cellular network, and/or the signal quality of the network 1000 of the third wireless communication.

According to various embodiments, based on transmission of a message related to a call request to the network 1100 of the third wireless communication, the electronic device 101 may perform a call with an external device using the network 1100 of the third wireless communication in operation 1115.

According to various embodiments, the electronic device 101 may continuously or periodically identify the signal quality of the network of the third wireless communication while performing the call with the external device using the third wireless communication in operation 1117. For example, the signal quality of the network of the third wireless communication may include at least one of an RSRP, an RSRQ, an RSSI, an SINR, a transmission/reception error rate, a packet transmission/reception delay, or a QoS.

According to various embodiments, if the signal quality of the network of the third wireless communication satisfies a designated second condition, the electronic device 101 may restrict the use of the first wireless communication in operation 1119. According to an embodiment, the electronic device 101 may restrict the use of the first wireless communication in the state of maintaining the call connection to the external device using the network 1100 of the third wireless communication. According to an embodiment, based on the restriction of the use of the first wireless communication, the electronic device 101 may update capability of the electronic device 101 with capability that does not support the first wireless communication. For example, the state in which the designated second condition is satisfied may include the state in which the RSRP of the network of the third wireless communication is less than or equal to a third reference strength.

According to various embodiments, based on the restriction of the use of the first wireless communication of the electronic device 101, the electronic device 101 may register with the second wireless communication network 440 based on a TAU request message in operations 1121 to 1127. For example, operations 1121 to 1127 of FIG. 11 may operate in the same or similar manner as operations 817 to 823 of FIG. 8. Accordingly, a detailed description of operations 1121 to 1127 will not be repeated here.

Figure 12:
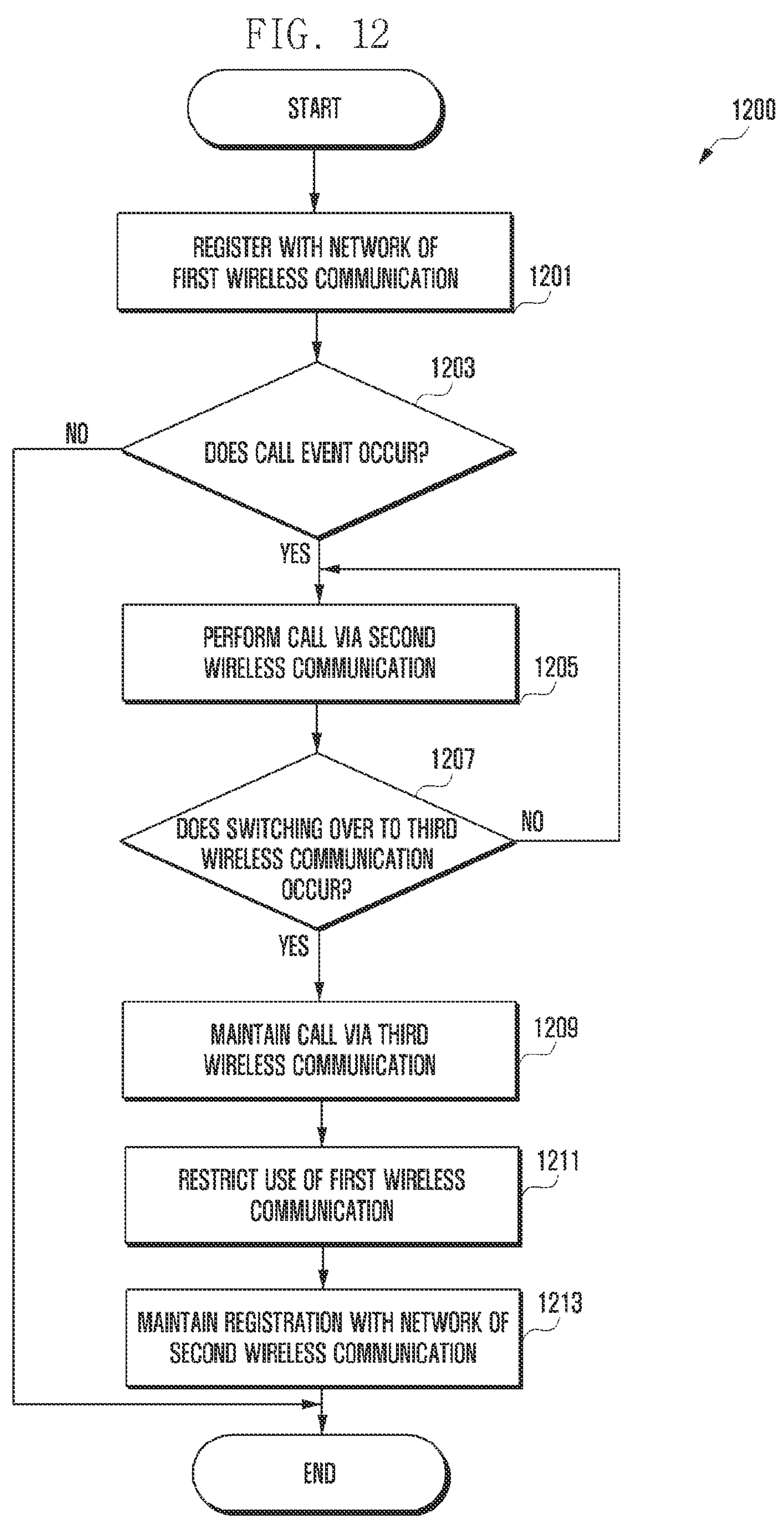
FIG. 12 is a flowchart illustrating an example process of restricting the use of first wireless communication based on switching over to third wireless communication for a call function, by an electronic device according to various embodiments.

FIG. 12 is a flowchart 1200 illustrating an example process of restricting the use of first wireless communication based on switching over to third wireless communication for a call function, by an electronic device according to various embodiments. In the embodiment provided hereinafter, operations may be performed sequentially, but not necessarily. For example, the order of operations may be changed, and at least two operations may be performed in parallel. For example, and without limitation, the electronic device may be the electronic device 101 of FIG. 1, FIG. 2, FIG. 5A, or FIG. 5B.

Referring to FIG. 12, according to various embodiments, an electronic device (e.g., the wireless communication module 192 of FIG. 1, the first communication circuit 510 of FIG. 5A, or the third communication circuit 540 of FIG. 5B) may register with (or attach to) a network of first wireless communication (e.g., NR) in operation 1201. According to an embodiment, if the network of the first wireless communication operates independently from a network of second wireless communication (e.g., LTE communication) (e.g., an SA mode), the electronic device 101 may preferentially register with the network of the first wireless communication.

According to various embodiments, the electronic device (e.g., the processor 120 or 500) may determine whether an event related to a call function occurs in the state of being registered with the network of the first wireless communication in operation 1203. For example, the occurrence of an event related to a call function may include at least one of execution of a call application, inputting a call button, or receiving a call.

According to various embodiments, if an event related to a call function does not occur ("No" in operation 1203), the electronic device (e.g., the processor 120, the wireless communication module 192, the processor 500, the first communication circuit 510, or the third communication circuit 540) may terminate an algorithm for restricting the use of the first wireless communication according to an embodiment.

According to various embodiments, if an event related to a call function occurs ("Yes" in operation 1203), the electronic device (e.g., the processor 120, the wireless communication module 192, the processor 500, the first communication circuit 510, or the third communication circuit 540) may connect to perform a call to an external device via second wireless communication in operation 1205. According to an embodiment, based on the occurrence of an event related to a call function, the processor 500 may set (or select) a network to be used for a call connection to the external device. For example, if the electronic device 101 is not registered with a network of the third wireless communication, the processor 500 determines to perform a call connection via a cellular network (e.g., a network of the first wireless communication or a network of the second wireless communication). For example, if the electronic device 101 is registered with the network of the third wireless communication, the processor 500 may set a network to be used for a call connection based on a call connection mode, the signal quality of the cellular network (e.g., the network of the first wireless communication or the network of the second wireless communication) and/or the signal quality of the network of the third wireless communication. For example, if the call connection mode is set to a first mode (e.g., a Wi-Fi preferred mode), and the signal quality of the network of the third wireless communication does not satisfy a designated first quality, the processor 500 may determine to perform a call connection via the cellular network (e.g., the network of the first wireless communication or the network of the second wireless communication). For example, if the call connection mode is set to a second mode (e.g., a cellular preferred mode), and the signal quality of the cellular network satisfies a designated second quality, the processor 500 may determine to perform a call connection via the cellular network (e.g., the network of the first wireless communication or the network of the second wireless communication). For example, the call connection mode may be set based on the call policy of the electronic device 101 and/or a user input. According to an embodiment, if the processor 500 determines to perform a call connection via the cellular network (e.g., the network of the first wireless communication or the network of the second wireless communication), the processor 500 may transmit a call connection request signal to the first communication circuit 510. If the call connection request signal is received from the processor 500 in the state in which the first communication circuit 510 is registered with the network of the first wireless communication (e.g., NR communication), the first communication circuit 510 may register with the network of the second wireless communication (e.g., LTE communication) via an evolved packet system (EPS) fallback procedure. The first communication circuit 510 (e.g., the second processing part 514) may connect a call to the external device via the network of the second wireless communication. For example, the first communication circuit 510 (e.g., the first processing part 512 and/or the second processing part 514) may deregister with the network of the first wireless communication via the EPS fallback procedure, and may establish a connection to the network of the second wireless communication.

According to various embodiments, the electronic device (e.g., the processor 120, the wireless communication module 192, the processor 500, the first communication circuit 510, or the third communication circuit 540) may identify whether a switching over to the third wireless communication occurs while providing the call function using the second wireless communication in operation 1207. According to an embodiment, the processor 500 may identify whether the signal quality of the cellular network (e.g., the network of the second wireless communication) and/or the signal quality of the network of the third wireless communication satisfies a designated first condition. According to an embodiment, if the call connection mode is set to a first mode (e.g., a Wi-Fi preferred mode), the processor 500 may identify whether the designated first condition is satisfied based on the signal quality of the network of the third wireless communication. For example, if the designated first condition is identified as being satisfied based on the signal quality of the network of the third wireless communication, the processor 500 may determine to perform a handover to the third wireless communication. For example, the state in which the designated first condition is satisfied may include the state in which the RSRP of the third wireless communication is greater than or equal to a first reference strength (e.g., approximately −70 dBm). For example, if the designated first condition is identified as not being satisfied based on the signal quality of the network of the third wireless communication, the processor 500 may determine to maintain the call connection to the external device using the second wireless communication. For example, the state in which the designated first condition is not satisfied may include the state in which the RSRP of the network of the third wireless communication is less than the first reference strength (e.g., approximately −70 dBm).

According to an embodiment, if the call connection mode is set to a second mode (e.g., a cellular preferred mode), the processor 500 may identify whether the designated first condition is satisfied based on the signal quality of the network of the second wireless communication and/or the third wireless communication. For example, if the designated first condition is identified as being satisfied based on the signal quality of the network of the second wireless communication and/or the network of the third wireless communication, the processor 500 may determine to perform a handover to the third wireless communication. For example, the state in which the designated first condition is satisfied may include the state in which the RSRP of the second wireless communication is less than a second reference strength (e.g., approximately −110 dBm) and the RSRP of the third wireless communication is greater than or equal to the first reference strength (e.g., approximately −70 dBm). For example, if the signal quality of the network of the second wireless communication and/or the signal quality of the network of the third wireless communication does not satisfy the designated first condition, the processor 500 may maintain the call connection to the external device using the second wireless communication. For example, the state in which the designated first condition is satisfied may include the state in which the RSRP of the second wireless communication is less than the second reference strength (e.g., approximately −110 dBm), irrespective of the signal quality of the third wireless communication.

According to various embodiments, if switching over to the third wireless communication does not occur ("No" in operation 1207), the electronic device (e.g., the processor 120, the wireless communication module 192, the processor 500, the first communication circuit 510, or the third communication circuit 540) may maintain the call connection to the external device using the second wireless communication in operation 1205. According to an embodiment, if the processor 500 determines to maintain the call connection to the external device using the second wireless communication, the first communication circuit 510 (e.g., the second processing part 514) may maintain the call connection to the external device using the second wireless communication.

According to various embodiments, if switching over to the third wireless communication occurs ("Yes" in operation 1207), the electronic device (e.g., the processor 120, the wireless communication module 192, the processor 500, the first communication circuit 510, the second communication circuit 520, or the third communication circuit 540) may maintain the call connection to the external device via a handover to the network of the third wireless communication in operation 1209.

According to various embodiments, the electronic device (e.g., the processor 120, the wireless communication module 192, the processor 500, the first communication circuit 510, the second communication circuit 520, or the third communication circuit 540) may restrict the use of the first wireless communication in operation 1211. According to an embodiment, the first communication circuit 510 may restrict the use of the first wireless communication based on the handover to the network of the third wireless communication. For example, based on the restriction of the use of the first wireless communication, the first communication circuit 510 may update capability of the electronic device 101 with capability that does not support the first wireless communication via a NAS protocol.

According to various embodiments, based on the restriction of the use of the first wireless communication, the electronic device (e.g., the wireless communication module 192, the first communication circuit 510, or the third communication circuit 540) may maintain the registration with the network of the second wireless communication (e.g., LTE communication) in operation 1213. According to an embodiment, if the registration with the network of the second wireless communication (e.g., LTE communication) is maintained, the electronic device 101 may maintain the call connection to the external device by performing a handover to the network of the second wireless communication at the point in time at which it is determined that the electronic device 101 is incapable of maintaining the call connection to the external device using the network of the third wireless communication.

According to various embodiments, in the state of maintaining the registration with the network of the second wireless communication (e.g., the LTE communication), the electronic device 101 may transmit information related to the restriction of the use of the first wireless communication to the network of the second wireless communication. According to an embodiment, the electronic device 101 may transmit a deregistration request (detach request) message to the network of the second wireless communication. Based on the reception of a deregistration accept (detach accept) message from the network of the second wireless communication, the electronic device 101 may deregister with the network of the second wireless communication. For example, the electronic device 101 may transmit a registration request message including information indicating that the electronic device 101 does not support the first wireless communication to the network of the second wireless communication with which the electronic device 101 has been deregistered. Based on the reception of a registration accept message from the network of the second wireless communication, the electronic device 101 may register with the network of the second wireless communication.

According to various embodiments, in the state in which the registration with the second wireless communication network 440 is maintained, the electronic device 101 may transmit a tracking area update (TAU) request message including information indicating that the electronic device 101 does not support the first wireless communication, to the network 440 of the second wireless communication. According to an embodiment, based on the TAU request message, the network 440 of the second wireless communication may determine that the electronic device 101 does not support the first wireless communication.

Figure 13:
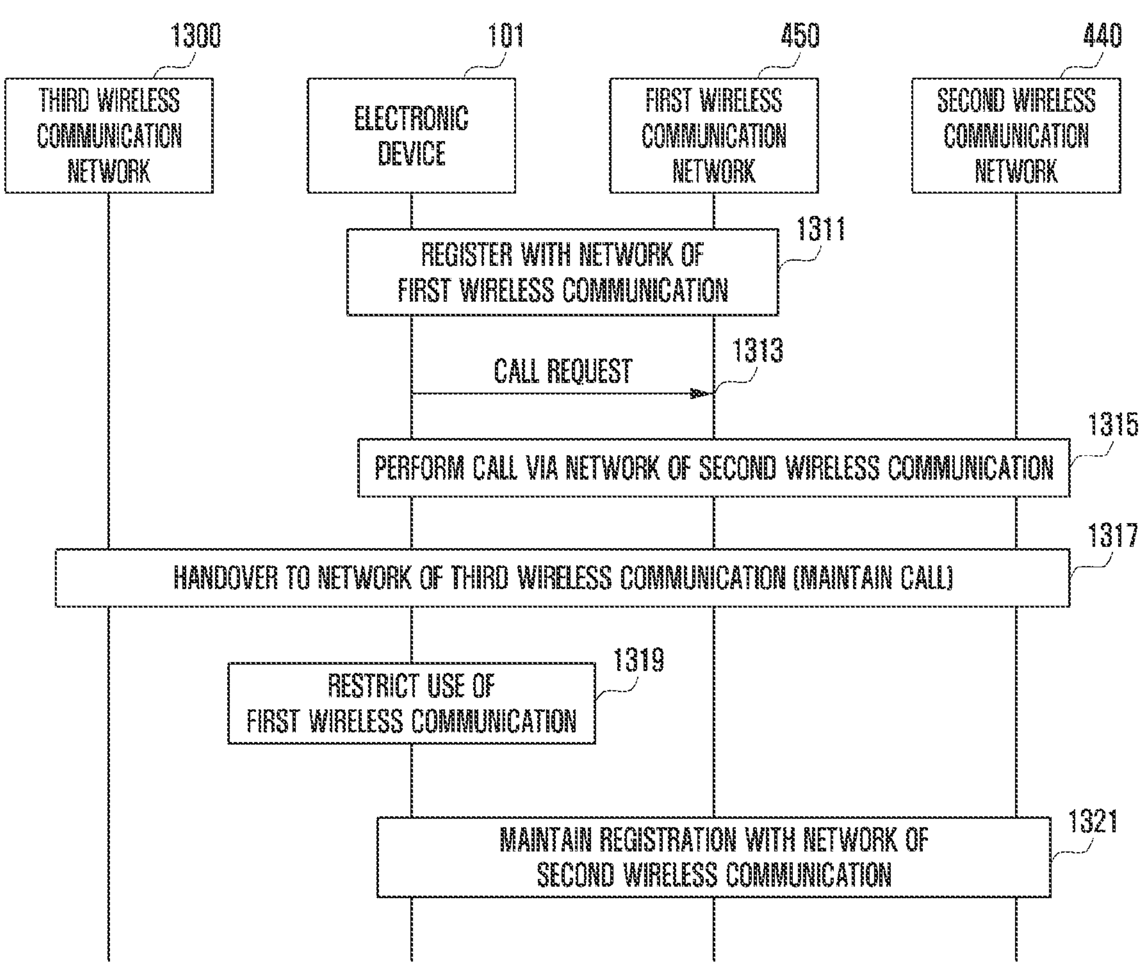
FIG. 13 is a signal flow diagram illustrating an example process of restricting the use of first wireless communication based on switching over to third wireless communication, by an electronic device according to various embodiments.

FIG. 13 is a signal flow diagram illustrating an example of restricting the use of first wireless communication based on switching over to third wireless communication, by an electronic device according to various embodiments.

Referring to FIG. 13, according to various embodiments, the electronic device 101 may register with the network 450 (e.g., the NR base station 450 of FIG. 4A) of first wireless communication (e.g., NR communication) in operation 1311.

According to various embodiments, if the occurrence of an event related to a call function is detected, the electronic device 101 may transmit a message related to a call request to the network 450 of the first wireless communication in operation 1313. According to an embodiment, if the electronic device 101 is not registered with a network 1300 of third wireless communication, the electronic device 101 may determine to provide a call function via the first wireless communication (or second wireless communication).

According to various embodiments, based on the transmission of the message related to the call request to the network 450 of the first wireless communication, the electronic device 101 may perform a call with an external device using the network 440 of the second wireless communication in operation 1315. According to an embodiment, if the network 450 of the first wireless communication does not support the call function, the electronic device 101 may register with the network 440 of the second wireless communication (e.g., LTE communication) via an evolved packet system (EPS) fallback procedure. The electronic device 101 may connect a call to the external device via the network 440 of the second wireless communication with which the electronic device 101 is registered with via an EPS fallback. For example, via the EPS fallback procedure, the electronic device 101 may deregister with the network 450 of the first wireless communication, and may establish a connection to the network 440 of the second wireless communication.

According to various embodiments, in operation 1317, the electronic device 101 may perform a handover to the network 1300 of the third wireless communication with which the electronic device 101 is registered, while providing the call function using the second wireless communication. According to an embodiment, the electronic device 101 may continuously or periodically identify the signal quality of the network of the second wireless communication and/or the network of the third wireless communication with which the electronic device 101 is registered, while providing the call function using the second wireless communication. For example, in the state in which a call connection mode is set to a first mode (e.g., a Wi-Fi preferred mode), if a designated first condition is identified as being satisfied based on the signal quality of the network of the third wireless communication, the electronic device 101 may determine to perform a handover to the third wireless communication. For example, the state in which the designated first condition is satisfied may include the state in which the RSRP of the third wireless communication is greater than or equal to a first reference strength (e.g., approximately −70 dBm). For example, in the state in which the call connection mode is set to a second mode (e.g., a cellular preferred mode), if the signal quality of the network of the second wireless communication and/or the network of the third wireless communication satisfies the designated first condition, the electronic device 101 may determine to perform a handover to the third wireless communication. For example, the state in which the designated first condition is satisfied may include the state in which the RSRP of the second wireless communication is less than a second reference strength (e.g., approximately −110 dBm) and the RSRP of the network of the third wireless communication is greater than or equal to the first reference strength (e.g., approximately −70 dBm). For example, the handover to the network 1300 of the third wireless communication may include a series of operations for switching over to the network 1300 of the third wireless communication as a network to be used for the call connection in the state in which the call is connected with the external electronic device via the second wireless communication. For example, handover to the network 1300 of the third wireless communication may include a series of operations, such as disconnecting from the network of the second wireless communication, and connecting (or performing) communication with the network 1300 of the third wireless communication. For example, handover to the network 1300 of the third wireless communication may include a series of operations, such as connecting (or performing) communication with the network 1300 of the third wireless communication, and disconnecting from the network of the second wireless communication. For example, the signal quality of the network of the second wireless communication and/or the third wireless communication may include at least one of an RSRP, an RSRQ, an RSSI, an SINR, a transmission/reception error rate, a packet transmission/reception delay, or a QoS.

According to various embodiments, the electronic device 101 may restrict the use of the first wireless communication based on the handover to the network 1300 of the third wireless communication in operation 1319. According to an embodiment, if the call with the external device is connected via the network 1300 of the third wireless communication based on the handover to the third wireless communication network 1300, the electronic device 101 may restrict the use of the first wireless communication. According to an embodiment, based on the restriction of the use of the first wireless communication, the electronic device 101 may update capability of the electronic device 101 to capability that does not support the first wireless communication.

According to various embodiments, the electronic device 101 may maintain the registration with the second wireless communication network 440 in operation 1321. According to an embodiment, in the state in which the registration with the second wireless communication network 440 is maintained, the electronic device 101 may transmit a tracking area update (TAU) request message including information indicating that the electronic device 101 does not support the first wireless communication, to the network 440 of the second wireless communication. In this instance, based on the TAU request message, the network 440 of the second wireless communication may determine that the electronic device 101 does not support the first wireless communication. According to an embodiment, after the electronic device 101 deregisters with the network 440 of the second wireless communication, the electronic device 101 may transmit a registration request message including information indicating that the electronic device 101 does not support the first wireless communication to the network 440 of the second wireless communication, to maintain the registration with the network 440 of the second wireless communication. In this instance, based on the registration request message, the network 440 of the second wireless communication may determine that the electronic device 101 does not support the first wireless communication.

According to an embodiment, if the handover to the network 1300 of the third wireless communication is performed, the electronic device 101 may switch the network for the call connection with the external device to the network 1300 of the third wireless communication in the state in which the connection to the network 440 of the second wireless connection is maintained. Accordingly, when the use of the first wireless communication is restricted based on the handover to the network 1300 of the third wireless communication, the electronic device 101 may maintain the connection to the network 440 of the second wireless communication with which the electronic device 101 is registered.

Figure 14:
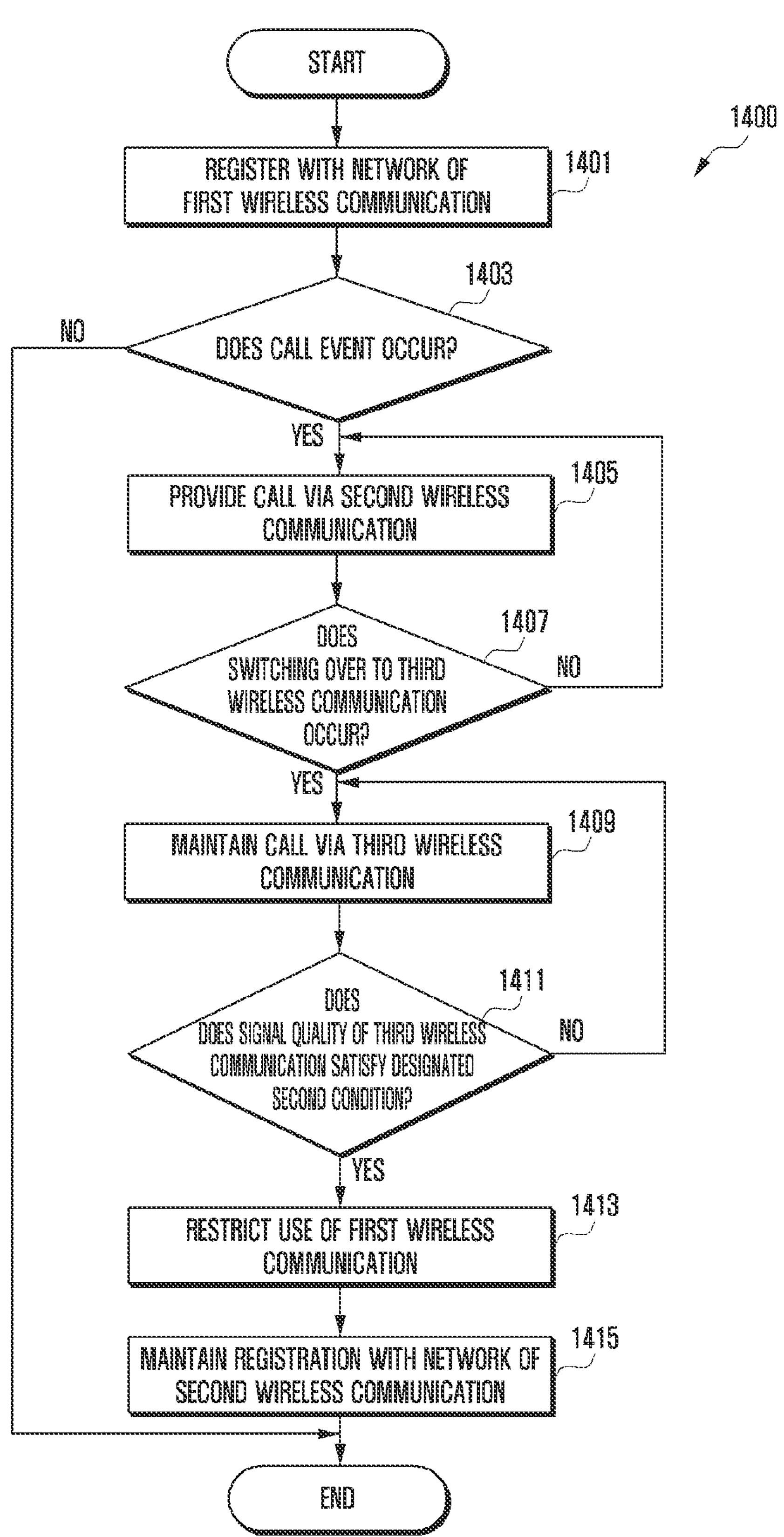
FIG. 14 is a flowchart illustrating an example process of restricting the use of first wireless communication based on switching over to third wireless communication and the signal quality thereof, by an electronic device according to various embodiments.

FIG. 14 is a flowchart 1400 illustrating an example process of restricting the use of first wireless communication based on switching over to third wireless communication and the signal quality thereof, by an electronic device according to various embodiments. In the embodiment provided hereinafter, operations may be performed sequentially, but not necessarily. For example, the order of operations may be changed, and at least two operations may be performed in parallel. For example, and without limitation, the electronic device may be the electronic device 101 of FIG. 1, FIG. 2, FIG. 5A, or FIG. 5B.

Referring to FIG. 14, according to various embodiments, an electronic device (e.g., the wireless communication module 192 of FIG. 1, the first communication circuit 510 of FIG. 5A, or the third communication circuit 540 of FIG. 5B) may register with (or attach to) a network of first wireless communication (e.g., NR) in operation 1401. According to an embodiment, if the network of the first wireless communication operates independently from a network of second wireless communication (e.g., LTE communication) (e.g., an SA mode), the first communication circuit 510 may preferentially register with the network of the first wireless communication.

According to various embodiments, the electronic device (e.g., the processor 120 or 500) may determine whether an event related to a call function occurs in the state of being registered with the network of the first wireless communication in operation 1403. For example, the occurrence of an event related to a call function may include at least one of execution of a call application, inputting a call button, or receiving a call.

According to various embodiments, if an event related to a call function does not occur ("No" in operation 1403), the electronic device (e.g., the processor 120, the wireless communication module 192, the processor 500, the first communication circuit 510, or the third communication circuit 540) may terminate an algorithm for restricting the use of the first wireless communication according to an embodiment in operation 1401.

According to various embodiments, if an event related to a call function occurs ("Yes" in operation 1403), the electronic device (e.g., the processor 120, the wireless communication module 192, the processor 500, the first communication circuit 510, or the third communication circuit 540) may connect to perform a call to an external device via the second wireless communication with which the electronic device is registered with via EPS fallback in operation 1405. According to an embodiment, based on the occurrence of an event related to a call function, the processor 500 may determine a network to be used for the call connection to the external device. For example, if the electronic device 101 is not registered with the network of the third wireless communication, the processor 500 may determine to perform a call connection via a cellular network (e.g., the network of the first wireless communication or the network of the second wireless communication). For example, if the electronic device 101 is registered with the network of the third wireless communication, the processor 500 may set a network to be used for a call connection based on a call connection mode, the signal quality of the cellular network (e.g., a network of the first wireless communication or a network of the second wireless communication) and/or the signal quality of a network of the third wireless communication. For example, if the call connection mode is set to a first mode (e.g., a Wi-Fi preferred mode) and the signal quality of the network of the third wireless communication does not satisfy a designated first quality, the processor 500 may determine to perform a call connection via the cellular network (e.g., the network of the first wireless communication or the network of the second wireless communication). For example, if the call connection mode is set to a second mode (e.g., a cellular preferred mode) and the signal quality of the cellular network satisfies a designated second quality, the processor 500 may determine to perform a call connection via the cellular network (e.g., the network of the first wireless communication or the network of the second wireless communication). For example, the call connection mode may be set based on the call policy of the electronic device 101 and/or a user input. According to an embodiment, if it is determined that the processor 500 performs the call connection via the cellular network (e.g., the network of the first wireless communication or the network of the second wireless communication), the first communication circuit 510 (e.g., the first processing part 512 and/or the second processing part 514) may deregister with the network of the first wireless communication via the EPS fallback procedure and may establish a connection with the network of the second wireless communication. The first communication circuit 510 (e.g., the second processing part 514) may connect a call to the external device via the network of the second wireless communication.

According to various embodiments, the electronic device (e.g., the processor 120, the wireless communication module 192, the processor 500, the first communication circuit 510, or the third communication circuit 540) may identify whether a switching over to the third wireless communication occurs while providing the call function using the second wireless communication in operation 1407. According to an embodiment, the processor 500 may identify whether the signal quality of the cellular network (e.g., the network of the second wireless communication) and/or the signal quality of the network of the third wireless communication satisfies a designated first condition. According to an embodiment, if the call connection mode is set to the first mode (e.g., a Wi-Fi preferred mode), the processor 500 may identify whether the designated first condition is satisfied based on the signal quality of the network of the third wireless communication. For example, if the designated first condition is identified as being satisfied based on the signal quality of the network of the third wireless communication, the processor 500 may determine to perform a handover to the third wireless communication. For example, the state in which the designated first quality is satisfied may include the state in which the RSRP of the third wireless communication is greater than or equal to a first reference strength (e.g., approximately −70 dBm). For example, if the designated first condition is identified as not being satisfied based on the signal quality of the network of the third wireless communication, the processor 500 may determine to maintain the call connection to the external device using the second wireless communication. For example, the state in which the designated first condition is not satisfied may include the state in which the RSRP of the network of the third wireless communication is less than the first reference strength (e.g., approximately −70 dBm).

According to an embodiment, if the call connection mode is set to the second mode (e.g., a cellular preferred mode), the processor 500 may identify whether the designated first condition is satisfied based on the signal quality of the network of the second wireless communication and/or the third wireless communication. For example, if the designated first condition is identified as being satisfied based on the signal quality of the network of the second wireless communication and/or the network of the third wireless communication, the processor 500 may determine to perform a handover to the third wireless communication. For example, the state in which the designated first condition is satisfied may include the state in which the RSRP of the second wireless communication is less than a second reference strength (e.g., approximately −110 dBm) and the RSRP of the network of the third wireless communication is greater than or equal to the first reference strength (e.g., approximately −70 dBm). For example, if the signal quality of the network of the second wireless communication and/or the signal quality of the network of the third wireless communication does not satisfy the designated first condition, the processor 500 may maintain the call connection to the external device using the second wireless communication. For example, the state in which the designated first condition is satisfied may include the state in which the RSRP of the second wireless communication is less than the second reference strength (e.g., approximately −110 dBm), irrespective of the signal quality of the third wireless communication. For example, the signal quality of the network of the second wireless communication and/or the network of the third wireless communication may include at least one of an RSRP, an RSRQ, an RSSI, an SINR, a transmission/reception error rate, a packet transmission/reception delay, or a QoS.

According to various embodiments, if switching over to the third wireless communication does not occur ("No" in operation 1407), the electronic device (e.g., the processor 120, the wireless communication module 192, the processor 500, the first communication circuit 510, or the third communication circuit 540) may maintain the call connection to the external device using the second wireless communication in operation 1405.

According to various embodiments, if switching over to the third wireless communication occurs ("Yes" in operation 1407), the electronic device (e.g., the processor 120, the wireless communication module 192, the processor 500, the first communication circuit 510, the second communication circuit 520, or the third communication circuit 540) may maintain the call connection to the external device via a handover to the third wireless communication in operation 1409. For example, the handover to the network of the third wireless communication may include a series of operations for switching over to the network of the third wireless communication as a network for a call connection in the state in which the call is connected to the external electronic device via the second wireless communication.

According to various embodiments, the electronic device (e.g., the processor 120, the wireless communication module 192, the processor 500, or the second communication circuit 520) may identify whether the signal quality of the network of third wireless communication satisfies a designated second condition in operation 1411. According to an embodiment, if the second communication circuit 520 maintains the call with the external device, the second communication circuit 520 may identify the signal quality of the third wireless communication continuously or periodically.

According to various embodiments, if the signal quality of the network of the third wireless communication does not satisfy the designated second condition (e.g., "No" in operation 1411), the electronic device (e.g., the processor 120, the wireless communication module 192, the processor 500, or the second communication circuit 520) may maintain the call connection to the external device using the third wireless communication in operation 1409. According to an embodiment, if the signal quality of the network of the third wireless communication does not satisfy the designated second condition, the processor 500 (or the second communication circuit 520) may determine that the probability of the occurrence of a handover to the cellular network (e.g., the network of the first wireless communication or the second wireless communication) is relatively low. In this instance, the processor 500 (or the second communication circuit 520) may determine to maintain the use of the first wireless communication. For example, the first communication circuit 510 may maintain the registration with the network of the first wireless communication. For example, the state in which the designated second condition is not satisfied may include the state in which the RSRP of the third wireless communication is greater than a third reference strength.

According to various embodiments, if the signal quality of the network of the third wireless communication satisfies the designated second condition (e.g., "Yes" in operation 1411), the electronic device (e.g., the processor 120, the wireless communication module 192, the processor 500, the first communication circuit 510, the second communication circuit 520, or the third communication circuit 540) may restrict the use of the first wireless communication in the state of maintaining the call connection to the external device using the third wireless communication in operation 1413. According to an embodiment, if the signal quality of the network of the third wireless communication satisfies the designated second condition, the processor 500 (or the second communication circuit 520) may determine that the probability of the occurrence of a handover to the cellular network (e.g., the network of the first wireless communication or the network of the second wireless communication) is relatively high. For example, if the processor 500 determines that the probability of the occurrence of a handover to the cellular network (e.g., the network of the first wireless communication or the network of the second wireless communication) is relatively high, the first communication circuit 510 may restrict the use of the first wireless communication. For example, based on the restriction of the use of the first wireless communication, the first communication circuit 510 may update capability of the electronic device 101 with capability that does not support the first wireless communication using a NAS protocol. For example, the NAS protocol may restrict a search related to the first wireless communication. For example, the state in which the designated second condition is satisfied may include the state in which the RSRP of the third wireless communication is less than a third reference strength.

According to various embodiments, based on the restriction of the use of the first wireless communication, the electronic device (e.g., the wireless communication module 192, the first communication circuit 510, or the third communication circuit 540) may maintain the registration with the network of the second wireless communication (e.g., LTE communication) in operation 1415. According to an embodiment, if the use of the first wireless communication is restricted in the state of being registered with the network of the second wireless communication, the first communication circuit 510 may newly establish a connection with the network of the second wireless communication. For example, the first communication circuit 510 (e.g., the second processing part 514) may deregister with the network of the second wireless communication, and may register with the network of the second wireless communication again based on a registration request message including information indicating that the first wireless communication is not used.

According to an embodiment, if the use of the first wireless communication is restricted in the state of being registered with the network of the second wireless communication, the first communication circuit 510 may transmit information indicating that the first wireless communication is not used to the network of the second wireless communication. For example, in the state in which the registration with the network of the second wireless communication is maintained, the first communication circuit 510 (e.g., the second processing part 514) may transmit a TAU request message including the information indicating that the first wireless communication is not used, to the network of the second wireless communication.

According to various embodiments, in the state in which the electronic device 101 is registered with the network of the first wireless communication, if the use of the first wireless communication is restricted, the electronic device 101 may newly establish a connection with the network of the second wireless communication. According to an embodiment, if a handover to the third wireless communication is performed, the first communication circuit 510 may deregister with the network of the second wireless communication, and may register with the network of the first wireless communication. According to an embodiment, if the use of the first wireless communication is restricted in the state of being registered with the network of the first wireless communication, the first communication circuit 510 may newly establish a connection with the network of the second wireless communication. For example, the first communication circuit 510 (e.g., the first processing part 512 and/or the second processing part 514) may deregister with the network of the first wireless communication, and may register with the network of the second wireless communication based on a registration request message including information indicating that the first wireless communication is not used. For example, the network of the second wireless communication may be identified via a search related to the second wireless communication. For example, the first communication circuit 510 (e.g., the second processing part 514) may register with the network of the second wireless communication based on a TAU request message including information indicating that the first wireless communication is not used. For example, the network of the second wireless communication may be identified via a search related to the second wireless communication.

Figure 15:
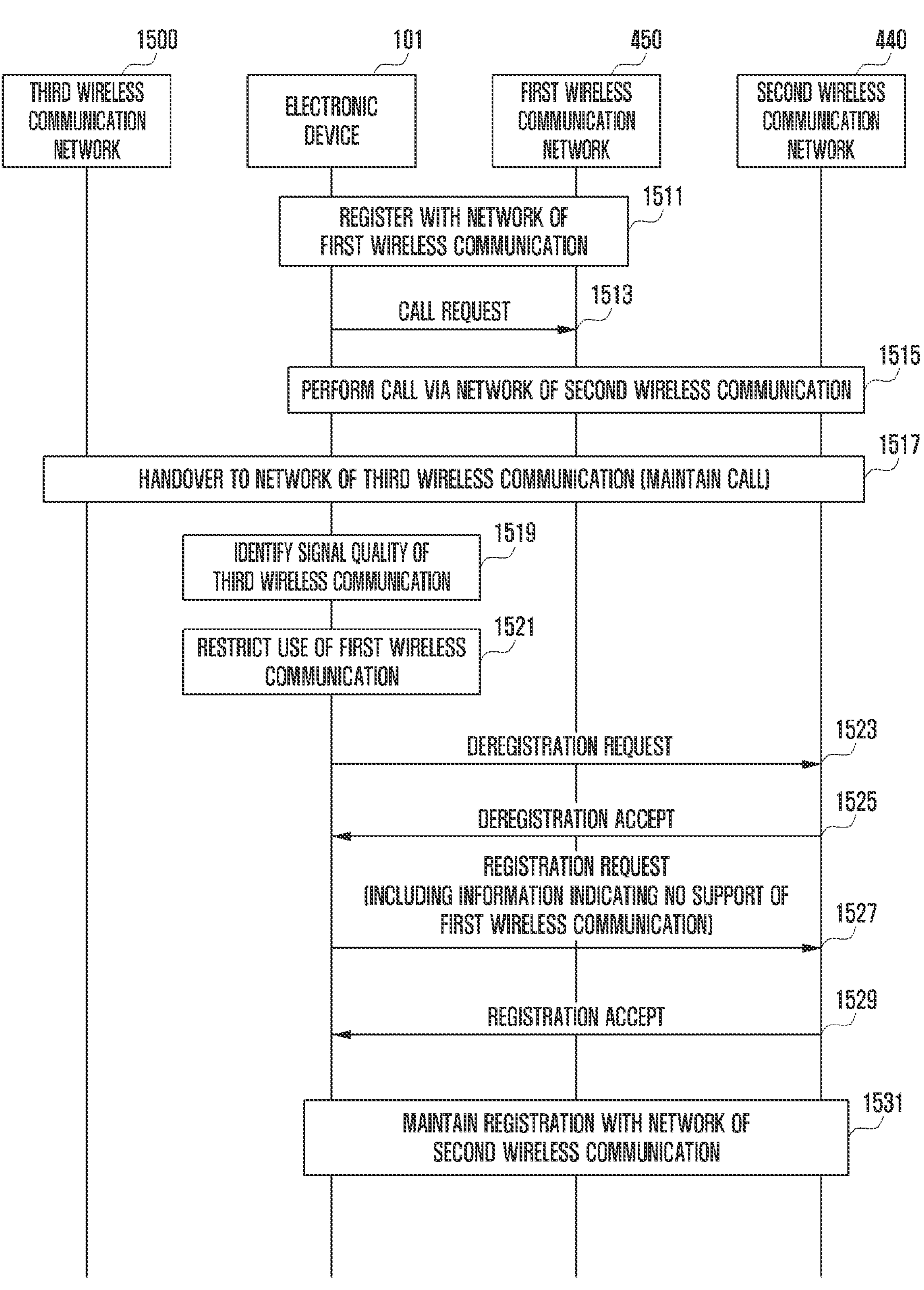
FIG. 15 is a signal flow diagram illustrating an example of restricting the use of first wireless communication based on switching over to third wireless communication and the signal quality thereof, by an electronic device according to various embodiments.

FIG. 15 is a signal flow diagram illustrating an example of restricting the use of first wireless communication based on switching over to third wireless communication and the signal quality thereof, by an electronic device according to various embodiments.

Referring to FIG. 15, according to various embodiments, the electronic device 101 may register with the network 450 (e.g., the NR base station 450 of FIG. 4A) of the first wireless communication (e.g., NR communication) in operation 1511.

According to various embodiments, based on the occurrence of an event related to a call function, the electronic device 101 may transmit a signal related to a call request to the network 450 of the first wireless communication in operation 1513. According to an embodiment, if the electronic device 101 is not registered with a network 1500 of the third wireless communication, the electronic device 101 may determine to provide a call function via the first wireless communication (or second wireless communication).

According to various embodiments, in operation 1515, the electronic device 101 may register with the network 440 of the second wireless communication via an EPS fallback procedure, and may perform a call with an external device. According to an embodiment, if the first wireless communication network 450 is incapable of providing a call function, the electronic device 101 may deregister with the network 450 of the first wireless communication via an evolved packet system (EPS) fallback, and may establish a connection to the network 440 of the second wireless communication. The electronic device 101 may connect a call to the external device via the network 440 of the second wireless communication with which the electronic device 101 is newly registered via the EPS fallback.

According to various embodiments, in operation 1517, the electronic device 101 may perform a handover to the network 1500 of the third wireless communication, while providing the call function using the second wireless communication. According to an embodiment, the electronic device 101 may identify whether a designated first condition is satisfied based on the signal quality of the network of the second wireless communication and/or the network of the third wireless communication with which the electronic device 101 is registered, while providing the call function using the second wireless communication. For example, in the state in which a call connection mode is set to a first mode (e.g., a Wi-Fi preferred mode), if the designated first condition is identified as being satisfied based on the signal quality of the network of the third wireless communication, the electronic device 101 may determine to perform a handover to the third wireless communication. For example, the state in which the designated first condition is satisfied may include the state in which the RSRP of the third wireless communication is greater than or equal to a first reference strength (e.g., approximately −70 dBm). For example, in the state in which the call connection mode is set to a second mode (e.g., a cellular preferred mode), if the designated first condition is identified as being satisfied based on the signal quality of the network of the second wireless communication and/or the network of the third wireless communication, the electronic device 101 may determine to perform a handover to the third wireless communication. For example, the state in which the designated first condition is satisfied may include the state in which the RSRP of the second wireless communication is less than a second reference strength (e.g., approximately −110 dBm) and the RSRP of the third wireless communication is greater than or equal to the first reference strength (e.g., approximately −70 dBm). For example, the handover to the network 1500 of the third wireless communication may include a series of operations for switching over to the network 1500 of the third wireless communication as a network to be used for a call connection, in the state in which the call is connected to the external electronic device via the second wireless communication. For example, the signal quality of the network of the second wireless communication and/or the third wireless communication may include at least one of an RSRP, an RSRQ, an RSSI, an SINR, a transmission/reception error rate, a packet transmission/reception delay, or QoS.

According to various embodiments, the electronic device 101 may continuously or periodically identify the signal quality of the network of the third wireless communication while performing a call with the external device using the third wireless communication in operation 1519.

According to various embodiments, if the signal quality of the third wireless communication satisfies a designated second condition, the electronic device 101 may restrict the use of the first wireless communication in operation 1521. According to an embodiment, the electronic device 101 may restrict the use of the first wireless communication in the state of maintaining the call connection to the external device using the network 1100 of the third wireless communication. According to an embodiment, based on the restriction of the use of the first wireless communication, the electronic device 101 may update capability of the electronic device 101 with capability that does not support the first wireless communication. For example, the state in which the designated second condition is satisfied may include the state in which the RSRP of the third wireless communication is less than a third reference strength.

According to various embodiments, based on the restriction of the use of the first wireless communication, the electronic device 101 may transmit a deregistration request message to the network 440 of the second wireless communication in operation 1523.

According to various embodiments, in operation 1525, the network 440 of the second wireless communication may transmit a deregistration accept message to the electronic device 101 in response to the deregistration request message received from the electronic device 101.

According to various embodiments, the electronic device 101 may deregister with the network 440 of the second wireless communication based on the deregistration accept message received from the network 440 of the second wireless communication. The electronic device 101 may transmit a registration request (e.g., attach request) message including information indicating that the electronic device 101 does not support the first wireless communication, to the network 440 of the second wireless communication in operation 1527. According to an embodiment, based on the registration request message, the network 440 of the second wireless communication may determine that the electronic device 101 does not support the first wireless communication.

According to various embodiments, in operation 1529, the network 440 of the second wireless communication may transmit a registration accept (e.g., attach accept) message to the electronic device 101 in response to the registration request message received from the electronic device 101.

According to various embodiments, in operation 1531, the electronic device 101 may maintain the registration with the network 440 of the second wireless communication based on the registration accept message received from the network 440 of the second wireless communication. According to an embodiment, the electronic device 101 may perform a deregistration and registration procedure with the network 440 of the second wireless communication in order to provide information related to the undated capability of the electronic device 101 to the network 440 of the second wireless communication. According to an embodiment, the electronic device 101 may maintain the registration with the network 440 of the second wireless communication while providing the call function using the network 700 of the third wireless communication.

Figure 16:
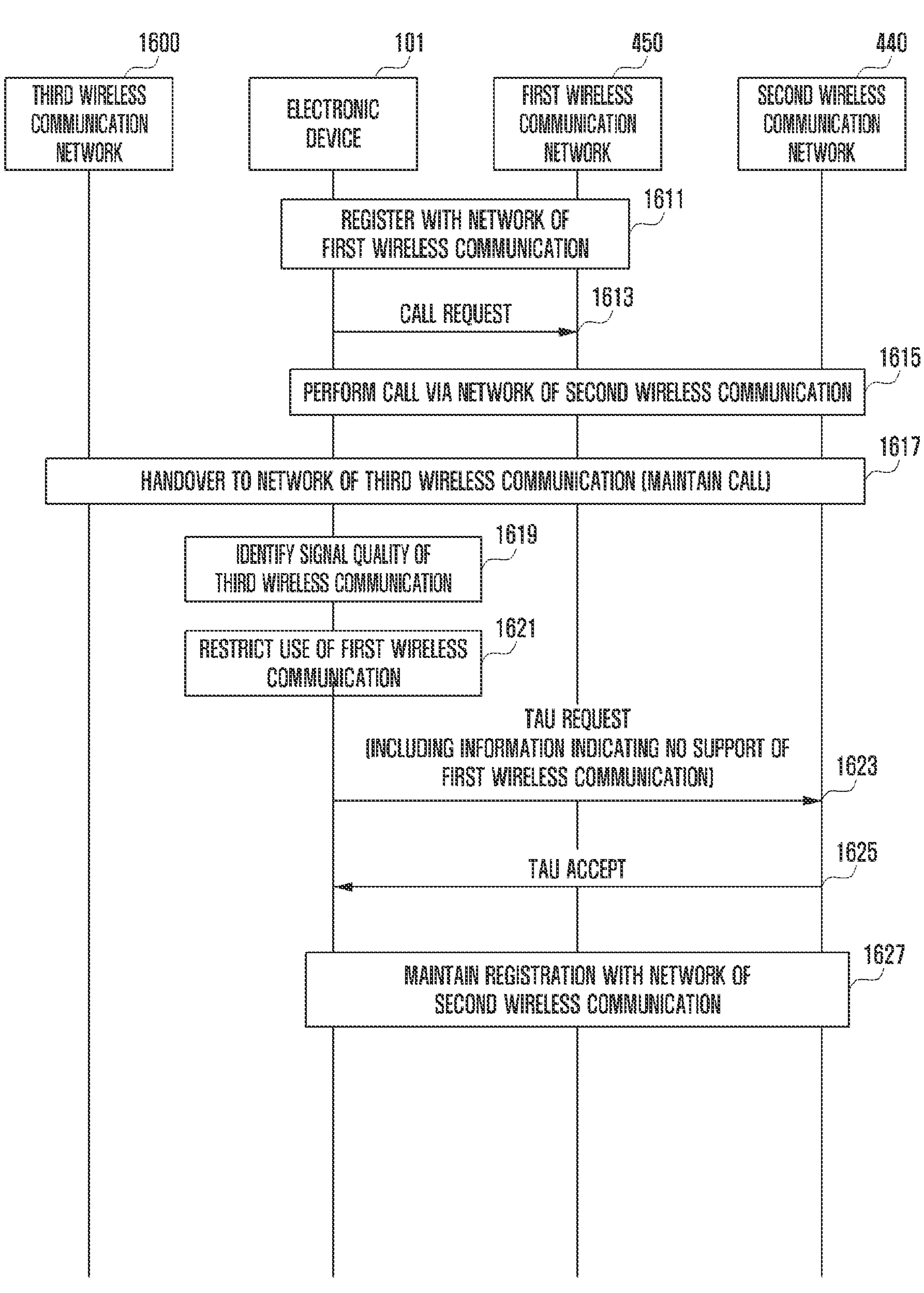
FIG. 16 is a signal flow diagram illustrating an example of restricting the use of first wireless communication based on switching over to third wireless communication and the signal quality thereof, by an electronic device according to various embodiments.

FIG. 16 is a signal flow diagram illustrating an example of restricting the use of first wireless communication based on switching over to third wireless communication and the signal quality thereof, by an electronic device according to various embodiments.

Referring to FIG. 16, according to various embodiments, the electronic device 101 may register with the network 450 (e.g., the NR base station 450 of FIG. 4A) of the first wireless communication (e.g., NR communication) in operation 1611. According to an embodiment, if the network 450 of the first wireless communication operates independently from the network 440 of the second wireless communication (e.g., Standalone (SA)), the electronic device 101 may preferentially register with the network 450 of the first wireless communication.

According to various embodiments, based on the occurrence of an event related to a call function, the electronic device 101 may transmit a signal related to a call request to the network 450 of the first wireless communication in operation 1613. According to an embodiment, if the electronic device 101 is not registered with a network 1600 of the third wireless communication, the electronic device 101 may determine to provide a call function via the first wireless communication (or second wireless communication).

According to various embodiments, the electronic device 101 may register with the network 440 of the second wireless communication via an EPS fallback procedure, and may perform a call with an external device in operation 1615. According to an embodiment, if the network 450 of the first wireless communication does not support a call function, the electronic device 101 may deregister with the network 450 of the first wireless communication via the EPS fallback procedure and may establish a connection to the network 440 of the second wireless communication. The electronic device 101 may connect a call to the external device via the network 440 of the second wireless communication with which the electronic device is connected via the EPS fallback.

According to various embodiments, in operation 1617, the electronic device 101 may perform a handover to the network 1600 of the third wireless communication, while providing the call function using the second wireless communication. According to an embodiment, the electronic device 101 may identify whether a designated first condition is satisfied based on the signal quality of the network of the second wireless communication and/or the network of the third wireless communication with which the electronic device 101 is registered, while providing the call function using the second wireless communication. For example, in the state in which a call connection mode is set to a first mode (e.g., a Wi-Fi preferred mode), if the signal quality of the network of the third wireless communication satisfies a designated first condition, the electronic device 101 may determine to perform a handover to the third wireless communication. For example, the state in which the designated first condition is satisfied may include the state in which the RSRP of the network of the third wireless communication is greater than or equal to a first reference strength (e.g., approximately −70 dBm). According to an embodiment, while the electronic device 101 provides the call function using the second wireless communication, if the signal quality of the network of the second wireless communication and/or the network of the third wireless communication satisfies a designated first condition in the state in which the call connection mode is set to a second mode (e.g., a cellular preferred mode), the electronic device 101 may determine to perform a handover to the third wireless communication. For example, the state in which the designated first condition is satisfied may include the state in which the RSRP of the network of the second wireless communication is less than a second reference strength (e.g., approximately −110 dBm) and the RSRP of the network of the third wireless communication is greater than or equal to the first reference strength (e.g., approximately −70 dBm). For example, the handover to the network 1600 of the third wireless communication may include a series of operations for switching over to the network 1600 of the third wireless communication as a network to be used for a call connection, in the state in which the call is connected to the external electronic device via the second wireless communication. For example, the signal quality of the network of the second wireless communication and/or the third wireless communication may include at least one of an RSRP, an RSRQ, an RSSI, an SINR, a transmission/reception error rate, a packet transmission/reception delay, or a QoS.

According to various embodiments, in operation 1619, the electronic device 101 may identify the signal quality of the network of the third wireless communication while performing the call (e.g., VoWiFi) with the external device using the third wireless communication.

According to various embodiments, if the signal quality of the third wireless communication satisfies a designated second condition, the electronic device 101 may restrict the use of the first wireless communication in the state of maintaining the call connection to the external device using the network 1600 of the third wireless communication, in operation 1621. According to an embodiment, the electronic device 101 may update capability of the electronic device 101 with capability that does not support the first wireless communication based on the restriction of the use of the first wireless communication. For example, the electronic device 101 may restrict a search related to the first wireless communication using a NAS protocol. For example, the state in which the designated second condition is satisfied may include the state in which the RSRP of the network of the third wireless communication is less than a third reference strength.

According to various embodiments, the electronic device 101 may transmit a tracking area update (TAU) request message including information indicating that the electronic device 101 does not support the first wireless communication, to the network 440 of the second wireless communication in operation 1623. According to an embodiment, based on the TAU request message, the network 440 of the second wireless communication may determine that the electronic device 101 does not support the first wireless communication.

According to various embodiments, in operation 1625, the network 440 of the second wireless communication may transmit a TAU accept message to the electronic device 101 in response to the TAU request message received from the electronic device 101.

According to various embodiments, in the state of maintaining the registration with the network 440 of the second wireless communication, the electronic device 101 may provide information related to the updated capability of the electronic device 101 to the network 440 of the second wireless communication in operation 1627. According to an embodiment, the electronic device 101 may maintain the registration with the network 440 of the second wireless communication, while providing the call function using the network 1600 of the third wireless communication.

According to various embodiments, if a handover to the network 1600 of the third wireless communication is performed, the electronic device 101 may deregister with the network 440 of the second wireless communication and may register with the network 450 of the first wireless communication, while providing the call function (e.g., VoWiFi) via the network 1600 of the third wireless communication. According to an embodiment, in the state of being registered with the network 450 of the first wireless communication, if the use of the first wireless communication is restricted, the electronic device 101 may deregister with the network 450 of the first wireless communication and may register with the network 440 of the second wireless communication based on a TAU request to the network 440 of the second wireless communication. For example, the operation of deregistering with the network 450 of the first wireless communication and registering with the network 440 of the second wireless communication may operate in the same or similar manner as operations 817 to 823 of FIG. 8.

Figure 17:
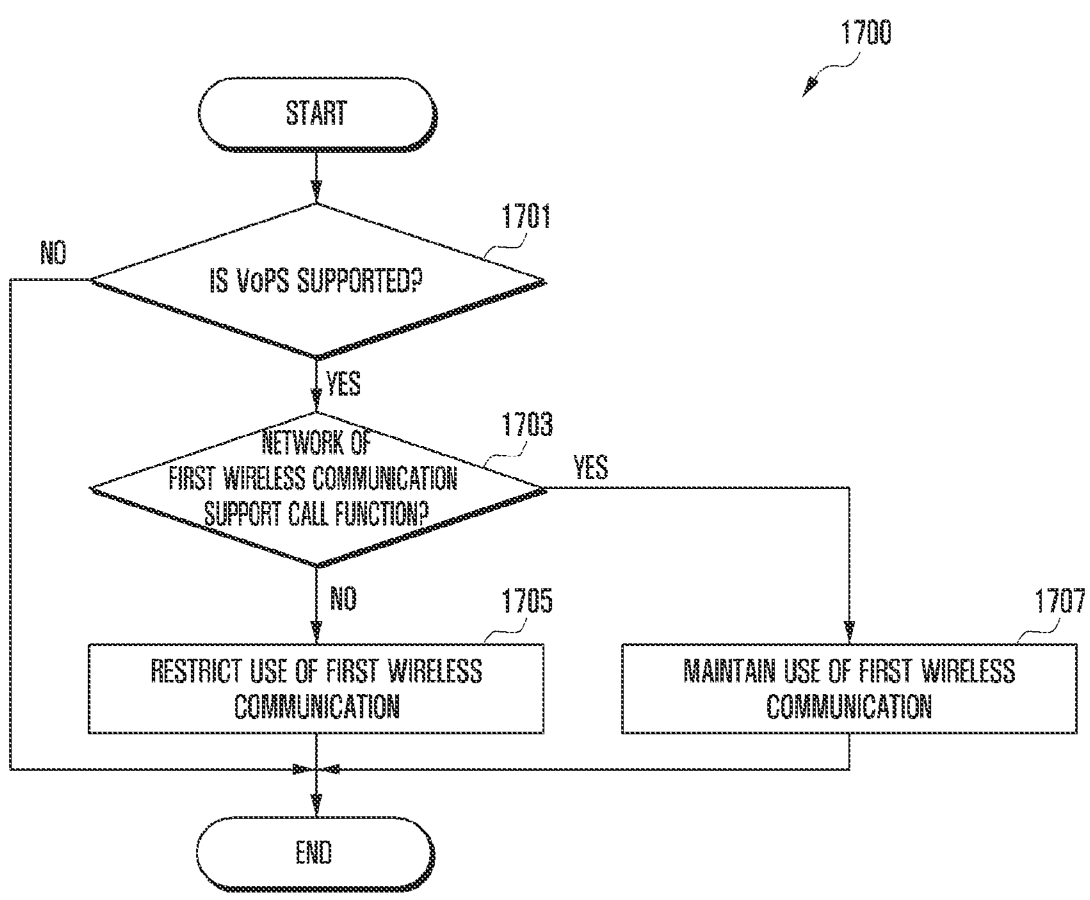
FIG. 17 is a flowchart illustrating a process of determining whether to use first wireless communication by an electronic device according to various embodiments.

FIG. 17 is a flowchart 1700 illustrating an example process of determining whether to use first wireless communication by an electronic device according to various embodiments. According to an embodiment, the operations in FIG. 17 may be detailed operations of operation 605 of FIG. 6, operation 909 of FIG. 9, and/or operation 1211 of FIG. 12. In the embodiment provided hereinafter, operations may be performed sequentially, but it is not necessarily. For example, the order of operations may be changed, and at least two operations may be performed in parallel. For example, and without limitation, the electronic device may be the electronic device 101 of FIG. 1, FIG. 2, FIG. 5A, or FIG. 5B.

Referring to FIG. 17, according to various embodiments, if a call function is provided via third wireless communication (e.g., wireless LAN communication) (e.g., operation 603 of FIG. 6, operation 903 of FIG. 9, or operation 1209 of FIG. 12), an electronic device (e.g., the wireless communication module 192 of FIG. 1, the first communication circuit 510 of FIG. 5A, or third communication circuit 540 of FIG. 5B) may identify whether the electronic device 101 supports a call function (e.g., voice of packet switched (VoPS)) using a packet switched network in operation 1701. According to an embodiment, the processor 500 (or the first communication circuit 510) may determine whether the electronic device 101 supports a call function using a packet switched network based on the capability of the electronic device 101.

According to various embodiments, if the electronic device 101 does not support the call function using packet switching (e.g., No in operation 1701), the electronic device (e.g., the processor 120 or 500, the wireless communication module 192, the first communication circuit 510, the second communication circuit 520, or the third communication circuit 540) may terminate an embodiment for determining whether to use the first wireless communication (e.g., NR). According to an embodiment, if it is identified that the electronic device 101 does not support the call function using packet switching, the processor 500 (or the first communication circuit 510) may determine that a call function (e.g., voice of NR (VoNR) using first wireless communication and a call function (e.g., VoLTE) using second wireless communication (e.g., LTE communication) are not supported. For example, if it is identified that the electronic device 101 does not support the call function using packet switching, the processor 500 (or the first communication circuit 510) may output information related to restriction of the use of the call function using the first wireless communication and/or second wireless communication. For example, if it is identified that the electronic device 101 does not support the call function using packet switching, the processor 500 (or the first communication circuit 510) may provide a call function using a circuit switched (CS) network.

According to various embodiments, if the electronic device 101 supports the call function using packet switching (e.g., Yes in operation 1701), the electronic device (e.g., the processor 120 or 500, the wireless communication module 192, the first communication circuit 510, the second communication circuit 520, or the third communication circuit 540) may identify whether the network of the first wireless communication supports a call function in operation 1703. According to an embodiment, based on a network used when the electronic device 101 registers with an IP multimedia subsystem (IMS) server and a call connection history associated with the network of the first wireless communication, the processor 500 (or the first communication circuit 510) may identify whether the network of the first wireless communication supports a call function.

According to an embodiment, if the electronic device 101 is registered with the IMS server via the network of the second wireless communication (e.g., LTE) at the point in time at which the occurrence of an event related to a call function is detected, the processor 500 (or the first communication circuit 510) may determine that the network of the first wireless communication does not support a call function. For example, the network that the electronic device 101 uses for registering with the IMS server may be identified from network information (e.g., P-Access-Network-Info Header of the 3GPP TS 24.229 standard) of a register message of a session initiation protocol (SIP) used by the IMS.

TABLE 2

```
daylight-saving-time = "daylight-saving-time" EQUAL quoted-string
  UE-local-IP-address = "UE-local-IP-address" EQUAL DQUOTE
```

TABLE 2-continued

```
  ( IPv4address / IPv6reference ) DQUOTE
UDP-source-port = "UDP-source-port" EQUAL port
TCP-source-port = "TCP-source-port" EQUAL port
ePDG-IP-address = "ePDG-IP-address" EQUAL DQUOTE
  ( IPv4address / IPv6reference ) DQUOTE
access-class =/ "untrusted-non-3GPP-VIRTUAL-EPC" / "VIRTUAL-no-
  PS" / "WLAN-no-PS" /
    "3GPP-NR" / "3GPP-NR-U"
access-type =/ "3GPP-E-UTRAN-ProSe-UNR" / "xDSL" / "3GPP-NR-
    FDD" / "3GPP-NR-TDD" /
      "IEEE-802.11ac" / "3GPP-NR-U-FDD" / "3GPP-NR-
    U-TDD"
```

For example, if the access type of a network information field (e.g., P-Access-Network-Info Header) is "3 GPP-E-UTRAN-ProSe-UNR" (or "3GPP-E-UTRAN-FDD", "3GPP-E-UTRAN-TDD"), the processor 500 (or the first communication circuit 510) may determine that the network that the electronic device 101 uses for registering with the IMS server is the network of the second wireless communication (e.g., LTE). For example, if the access type of the network information field (e.g., P-Access-Network-Info Header) is "3GPP-NR-FDD" or "3GPP-NR-TDD", the processor 500 (or the first communication circuit 510) may determine that the network that the electronic device 101 uses for registering with the IMS server is the network of the first wireless communication (e.g., NR). For example, if the access type of the network information field (e.g., P-Access-Network-Info Header) is "IEEE-802.11ac", the processor 500 (or the first communication circuit 510) may determine that the network that the electronic device 101 uses for registering with the IMS server is the network of the third wireless communication (e.g., wireless LAN communication).

According to an embodiment, if the electronic device 101 does not have a call connection history (or a successful call history) associated with the network of the first wireless communication, the processor 500 (or the first communication circuit 510) may determine that the network of the first wireless communication does not support a call function. For example, if the electronic device 101 does not have a call connection history associated with the network of the first wireless communication although the electronic device 101 is registered with the IMS server via the network of the first wireless communication at the point in time at which the occurrence of an event related to a call function is detected, the processor 500 (or the first communication circuit 510) may determine that the network of the first wireless communication does not support a call function. For example, if the electronic device 101 does not have a call connection history associated with the network of the first wireless communication although the electronic device 101 is registered with the IMS server via the network of the third wireless communication at the point in time at which the occurrence of an event related to a call function is detected, the processor 500 (or the first communication circuit 510) may determine that the network of the first wireless communication does not support a call function. For example, the call connection history associated with the network of the first wireless communication may be identified from the memory 530 and/or the external server (e.g., the server 108 of FIG. 1).

According to an embodiment, if the electronic device 101 has a call connection history (or a successful call history) associated with the network of the first wireless communication, the processor 500 or (the first communication circuit 510) may determine that the network of the first wireless communication supports a call function. For example, if the electronic device 101 is registered with the IMS server via the network of the first wireless communication at the point in time at which the occurrence of an event related to a call function is detected, and the electronic device 101 has a call connection history associated with the network of the first wireless communication, the processor 500 (or the first communication circuit 510) may determine that the network of the first wireless communication supports a call function. For example, if the electronic device 101 is registered with the IMS server via the network of the third wireless communication at the point in time at which the occurrence of an event related to a call function is detected, and the electronic device 101 has a call connection history associated with the network of the first wireless communication, the processor 500 (or the first communication circuit 510) may determine that the network of the first wireless communication supports a call function.

According to various embodiments, if it is identified that the network of the first wireless communication does not support a call function (e.g., No in operation 1703), the electronic device (e.g., the processor 120 or 500, the wireless communication module 192, the first communication circuit 510, the second communication circuit 520, or the third communication circuit 540) may restrict the use of the first wireless communication in operation 1705. According to an embodiment, if information related to the provision of a call function using the network of the third wireless communication is received from the processor 500 (or the second communication circuit 520), the first communication circuit 510 (or the processor 500) may identify whether the network of the first wireless communication does not support a call function. If it is identified that the network of the first wireless communication does not support a call function, the first communication circuit 510 (or the processor 500) may restrict the use of the first wireless communication. For example, if it is identified that the network of the first wireless communication does not support a call function, the first communication circuit 510 (or the processor 500) may restrict the use of the first wireless communication, irrespective of the quality of signal of the network of the first wireless communication. For example, if it is identified that the network of the first wireless communication does not support a call function, the first communication circuit 510 (or the processor 500) may perform configuration so that the electronic device 101 does not support the first wireless communication via a non-access stratum (NAS) protocol. For example, the NAS protocol may restrict a search related to the first wireless communication. For example, based on the restriction of the use of the first wireless communication, the NAS protocol may perform control so that a search for the network of the second wireless communication is performed using an access stratum (AS) protocol. According to an embodiment, the first communication circuit 510 (e.g., the first processing part 512) may deregister with the network of the first wireless communication based on the restriction of the use of the first wireless communication.

According to various embodiments, if it is identified that the network of the first wireless communication supports a call function (e.g., Yes in operation 1703), the electronic device (e.g., the processor 120 or 500, the wireless communication module 192, the first communication circuit 510, the second communication circuit 520, or the third communication circuit 540) may maintain the use of the first wireless communication in operation 1707. According to an embodiment, the first communication circuit 510 (e.g., the first processing part 512) may maintain the state of being registered with the network of the first wireless communication based on maintaining of the use of the first wireless communication.

According to various embodiments, if it is identified that the network of the first wireless communication does not support a call function, the electronic device 101 may restrict the use of the first wireless communication. Based on the restriction of the use of the first wireless communication, the electronic device 101 may register with the network of the second wireless communication while having the call connection to the external device using the network of the third wireless communication. Accordingly, if it is determined that the electronic device 101 is incapable of maintaining the call connection to the external device using the network of the third wireless communication, the electronic device 101 may perform a handover to the network of the second wireless communication and may maintain the call connection to the external device. For example, the handover may include a series of operations, such as disconnecting from a first network (e.g., the network of the third wireless communication) and performing communication with a second network (e.g., the network of the second wireless communication)

According to various embodiments, if it is identified that the network of the first wireless communication supports a call function, the electronic device 101 may maintain the use of the first wireless communication. Accordingly, if it is identified that the electronic device 101 is incapable of maintaining the call connection to the external device using the network of the third wireless communication, the electronic device 101 may perform a handover to the network of the first wireless communication and may maintain the call connection to the external device. For example, the handover may include a series of operations, such as disconnecting from a first network (e.g., the network of the third wireless communication) and performing communication with a second network (e.g., the network of the second wireless communication)

Figure 18:
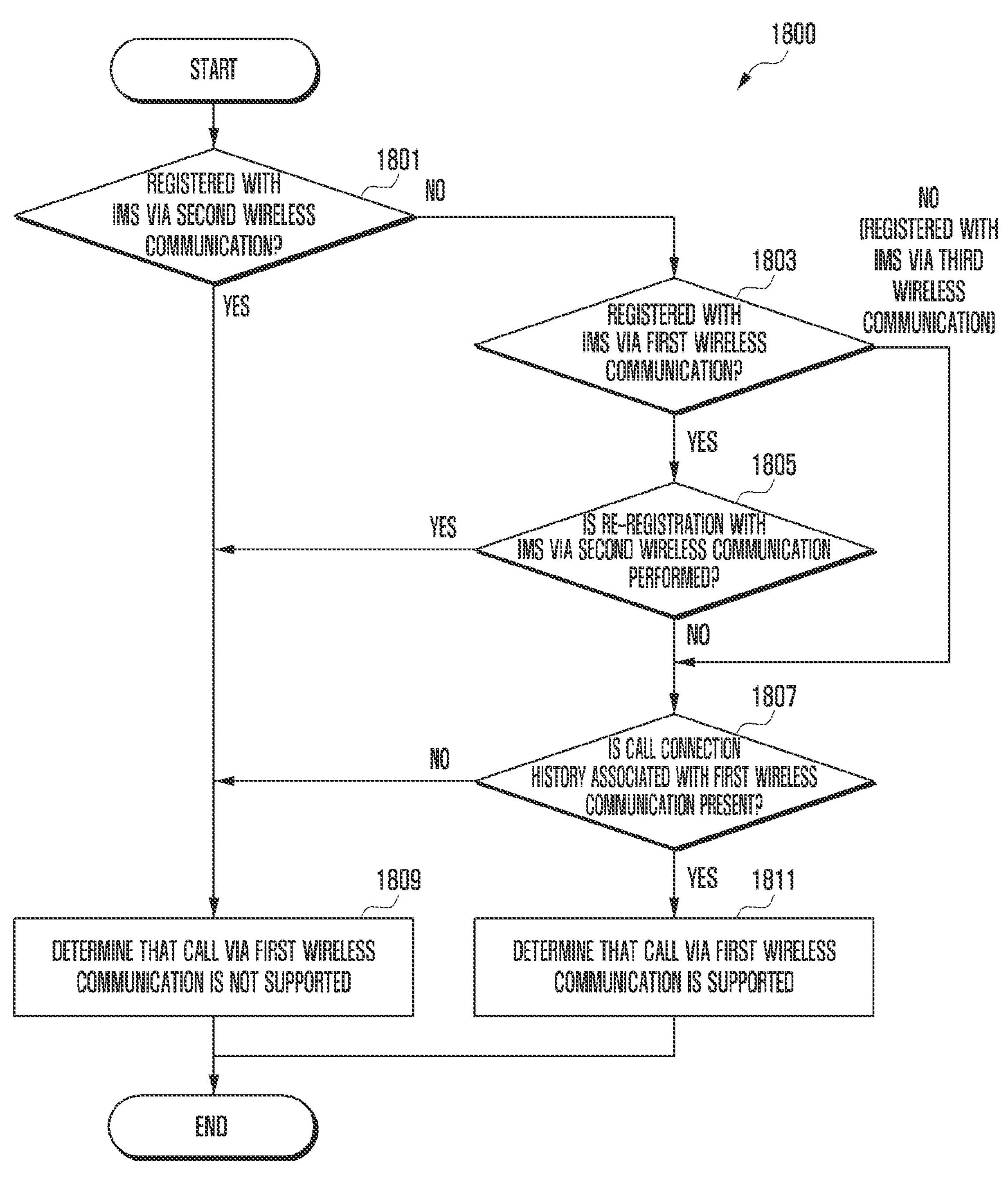
FIG. 18 is a flowchart illustrating a process of determining whether to use first wireless communication based on IMS registration information, by an electronic device according to various embodiments.

FIG. 18 is a flowchart 1800 illustrating an example process of determining whether to use first wireless communication based on IMS registration information, by an electronic device according to various embodiments. According to an embodiment, the operations in FIG. 18 may be detailed operations of operation 1703 of FIG. 17. In the embodiment provided hereinafter, operations may be performed sequentially, but it is not necessarily. For example, the order of operations may be changed, and at least two operations may be performed in parallel. For example, and without limitation, the electronic device may be the electronic device 101 of FIG. 1, FIG. 2, FIG. 5A, or FIG. 5B.

Referring to FIG. 18, according to various embodiments, an electronic device (e.g., the wireless communication module 192 of FIG. 1, the first communication circuit 510 of FIG. 5A, or the third communication circuit 540 of FIG. 5B) may identify whether the electronic device 101 is registered with an IMS server via the network of second wireless communication (e.g., LTE) in operation 1801. For example, the network that the electronic device 101 uses for registering with the IMS may be identified from network information (e.g., P-Access-Network-Info Header of the 3GPP TS 24.229 standard) of a register message of a session initiation protocol (SIP) used by the IMS.

According to various embodiments, if the electronic device 101 is not registered with the IMS server via the network of the second wireless communication (e.g., LTE) (e.g., No in operation 1801), the electronic device (e.g., the processor 120 or 500, the wireless communication module 192, the first communication circuit 510, the second communication circuit 520, or the third communication circuit 540) may identify whether the electronic device 101 is registered with the IMS server via the network of the first wireless communication (e.g., NR) in operation 1803.

According to various embodiments, if the electronic device 101 is registered with the IMS server via the network of the first wireless communication (e.g., NR) (e.g., Yes in operation 1803), the electronic device (e.g., the processor 120 or 500, the wireless communication module 192, the first communication circuit 510, the second communication circuit 520, or the third communication circuit 540) may identify whether re-registration with the IMS server is performed via the network of the second wireless communication in the state in which a call connection with an external device is maintained, in operation 1805. According to an embodiment, if the network of the first wireless communication which operates independently (e.g., standalone (SA)) from the network of the second wireless communication supports EPS fallback, a public data network (PDN) is reallocated to the network of the second wireless communication in the state in which the call connection with the external device is maintained, and the electronic device 101 may perform re-registration with the IMS server via the second wireless communication. Accordingly, if re-registration with the IMS server is performed in the state in which the call connection with the external device is maintained, the first communication circuit 510 (or the processor 500) may identify whether network information of a register message (or re-register message) includes information related to the network of the second wireless communication (e.g., "3GPP-E-UTRAN-ProSe-UNR", "3GPP-E-UTRAN-FDD", or "3GPP-E-UTRAN-TDD"). For example, if the network information of the register message (or re-register message) includes information related to the network of the second wireless communication, the first communication circuit 510 (or the processor 500) may determine that re-registration with the IMS server is performed via the network of the second wireless communication in the state in which the call connection with the external device is maintained. For example, if the network information of the register message (or re-register message) does not include information related to the network of the second wireless communication, the first communication circuit 510 (or the processor 500) may determine that re-registration with the IMS server is not performed via the network of the second wireless communication in the state in which the call connection with the external device is maintained.

According to various embodiments, if the electronic device 101 is registered with the IMS server via the network of the third wireless communication (e.g., wireless LAN communication) (e.g., No in operation 1803), or re-registration with the IMS server via the network of the second wireless communication is not performed (e.g., No in operation 1805), the electronic device (e.g., the processor 120 or 500, the wireless communication module 192, the first communication circuit 510, the second communication circuit 520, or the third communication circuit 540) may identify whether the electronic device 101 has a call connection history (or successful call history) associated with the network of the first wireless communication in operation 1807. For example, the call connection history associated with the network of the first wireless communication may be identified from the memory 530 and/or the external server (e.g., the server 108 of FIG. 1).

According to various embodiments, if the electronic device 101 is registered with the IMS server via the network of the second wireless communication (e.g., LTE) (e.g., Yes in operation 1801), or re-registration with the IMS server via the network of the second wireless communication is performed (e.g., Yes in operation 1805), or the electronic device 101 does not have a call connection history (or successful call history) associated with the network of the first wireless communication (e.g., No in operation 1807), the electronic device (e.g., the processor 120 or 500, the wireless communication module 192, the first communication circuit 510, the second communication circuit 520, or the third communication circuit 540) may determine that the network of the first wireless communication does not support a call function in operation 1809. According to an embodiment, if the electronic device 101 is registered with the IMS server via the network of the second wireless communication (e.g., LTE) at the point in time at which the occurrence of an event related to a call function is detected, the first communication circuit 510 (or the processor 500) may determine that the network of the first wireless communication does not support a call function. According to an embodiment, if the electronic device 101 does not have a call connection history associated with the network of the first wireless communication although the electronic device 101 is registered with the IMS server via the network of the first wireless communication at the point in time at which the occurrence of an event related to a call function is detected, the first communication circuit 510 (or the processor 500) may determine that the network of the first wireless communication does not support a call function. According to an embodiment, if the electronic device 101 does not have a call connection history associated with the network of the first wireless communication although the electronic device 101 is registered with the IMS server via the network of the third wireless communication at the point in time at which the occurrence of an event related to a call function is detected, the first communication circuit 510 (or the processor 500) may determine that the network of the first wireless communication does not support a call function.

According to an embodiment, if it is identified that the network of the first wireless communication does not support a call function, the first communication circuit 510 (or the processor 500) may restrict the use of the first wireless communication in order to prevent unnecessary handover to the first wireless communication.

According to various embodiments, if the electronic device 101 has a call connection history (or successful call history) associated with the network of the first wireless communication (e.g., Yes in operation 1807), the electronic device (e.g., the processor 120 or 500, the wireless communication module 192, the first communication circuit 510, the second communication circuit 520, or the third communication circuit 540) may determine that the network of the first wireless communication support a call function in operation 1811. According to an embodiment, if the electronic device 101 has a call connection history (or a successful call history) associated with the network of the first wireless communication, the first communication circuit 510 (or the processor 500) may determine that the network of the first wireless communication supports a call function. For example, if the electronic device 101 is registered with the IMS server via the network of the first wireless communication at the point in time at which the occurrence of an event related to a call function is detected, and the electronic device 101 has a call connection history associated with the network of the first wireless communication, the first communication circuit 510 (or the processor 500) may determine that the network of the first wireless communication supports a call function. For example, if the electronic device 101 is registered with the IMS server via the network of the third wireless communication at the point in time at which the occurrence of an event related to a call function is detected, and the electronic device 101 has a call connection history associated with the network of the first wireless communication, the first communication circuit 510 (or the processor 500) may determine that the network of the first wireless communication supports a call function.

According to an embodiment, if it is identified that the network of the first wireless communication supports a call function, the first communication circuit 510 (or the processor 500) may maintain the use of the first wireless communication in order to handover to the first wireless communication.

Figure 19:
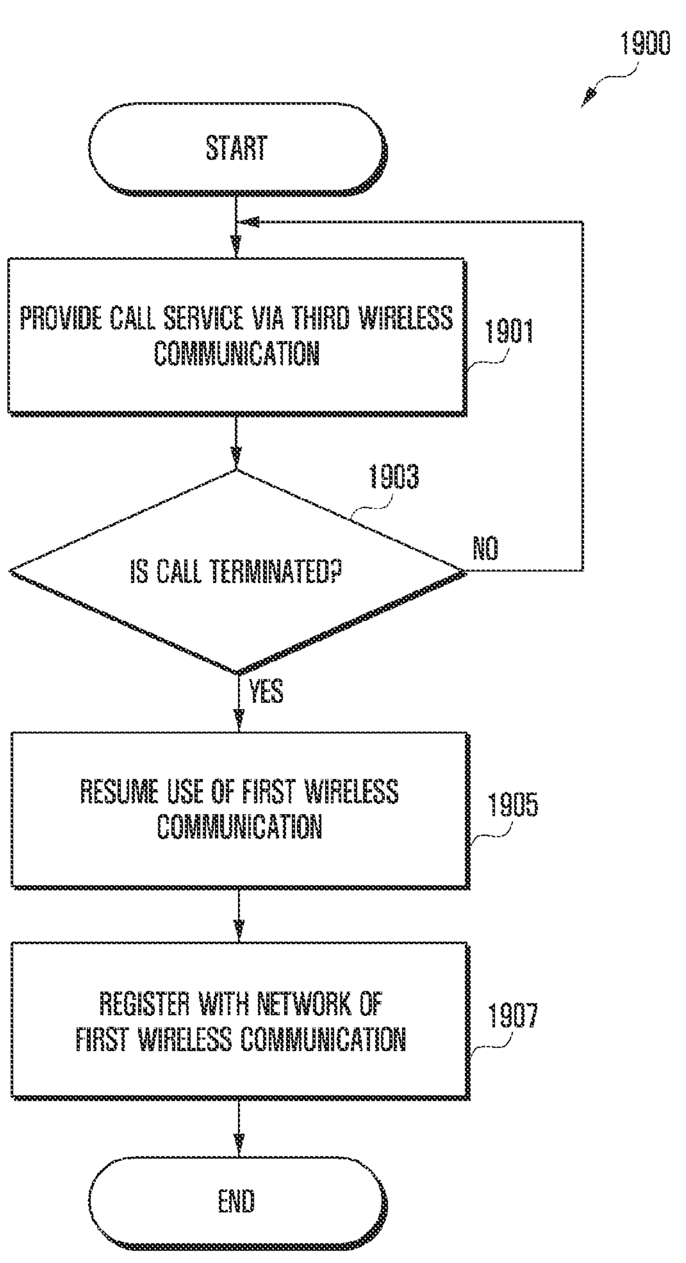
FIG. 19 is a flowchart illustrating an example process of resuming the use of first wireless communication by an electronic device according to various embodiments.

FIG. 19 is a flowchart 1900 illustrating an example process of resuming the use of first wireless communication by an electronic device according to various embodiments. In the embodiment provided hereinafter, operations may be performed sequentially, but not necessarily. For example, the order of operations may be changed, and at least two operations may be performed in parallel. For example, and without limitation, the electronic device may be the electronic device 101 of FIG. 1, FIG. 2, FIG. 5A, or FIG. 5B.

According to various embodiments, the electronic device (e.g., the processor 120, the wireless communication module 192, the processor 500, the first communication circuit 510, the second communication circuit 520, or the third communication circuit 540) may provide a call function with an external device using third wireless communication in operation 1901. According to an embodiment, in the state in which the electronic device 101 is registered with the network of the first wireless communication, the second communication circuit 520 may provide a call function with the external device via the network of third wireless communication based on the occurrence of an event related to a call function. According to an embodiment, if a handover to the network of the third wireless communication is performed while providing the call function with the external device via the second wireless communication, the second communication circuit 520 may maintain a call connection to the external device via the network of the third wireless communication.

According to various embodiments, the electronic device (e.g., the processor 120, the wireless communication module 192, the processor 500, or the second communication circuit 520) may identify whether the call connection to the external device is terminated in operation 1903.

According to various embodiments, if the call connection to the external device is not terminated ("No" in operation 1903), the electronic device (e.g., the processor 120, the wireless communication module 192, the processor 500, the first communication circuit 510, or the third communication circuit 540) may maintain the call connection to the external device using the third wireless communication in operation 1901.

According to various embodiments, if the call connection to the external device is terminated ("Yes" in operation 1903), the electronic device (e.g., the processor 120, the wireless communication module 192, the processor 500, the first communication circuit 510, or the third communication circuit 540) may resume the use of the first wireless communication in operation 1905. According to an embodiment, if information related to the termination of the call function provided using the network of the third wireless communication is received from the processor 500 (or the second communication circuit 520), the first communication circuit 510 may resume the use of the first wireless communication. For example, based on the resumption of the use of the first wireless communication, the first communication circuit 510 may update capability of the electronic device 101 with capability that supports the first wireless communication using a NAS protocol. For example, based on the resumption of the use of the first wireless communication, the NAS protocol may perform a search for the network of the first wireless communication via an AS protocol.

According to an embodiment, if the use of the first wireless communication is resumed, the first communication circuit 510 (e.g., the second processing part 514) may transmit a deregistration request (e.g., detach request) message to the network of the second wireless communication. Based on reception of a deregistration accept (e.g., detach accept) message from the network of the second wireless communication, the first communication circuit 510 (e.g., the second processing part 514) may deregister with the network of the second wireless communication.

According to an embodiment, if the use of the first wireless communication is resumed, the first communication circuit 510 (e.g., the second processing part 514) may transmit, to the network of the second wireless communication, a tracking area update (TAU) request message including information indicating that the electronic device 101 supports the first wireless communication. The first communication circuit 510 (e.g., the second processing part 514) may receive a TAU accept message from the network of the second wireless communication.

According to various embodiments, the electronic device (e.g., the processor 120, the wireless communication module 192, the processor 500, the first communication circuit 510, or the third communication circuit 540) may register with the network of the first wireless communication in operation 1907. According to an embodiment, based on the deregistration with the network of the second wireless communication, the first communication circuit 510 (e.g., the first processing part 512) may transmit a registration request message to the network of the first wireless communication. Based on reception of a registration accept (e.g., attach accept) message from the network of the first wireless communication, the first communication circuit 510 (e.g., the first processing part 512) may register with the network of the first wireless communication. For example, the network of the first wireless communication may be identified via a search by the first communication circuit 512 (e.g., the first processing part 512) in association with the first wireless communication. According to an embodiment, if a TAU accept message is received, the first communication circuit 510 (e.g., the first processing part 512) may transmit a registration request message to the network of the first wireless communication identified via the search related to the first wireless communication. Based on reception of a registration accept message from the network of the first wireless communication, the first communication circuit 510 (e.g., the first processing part 512) may register with the network of the first wireless communication.

Figure 20:
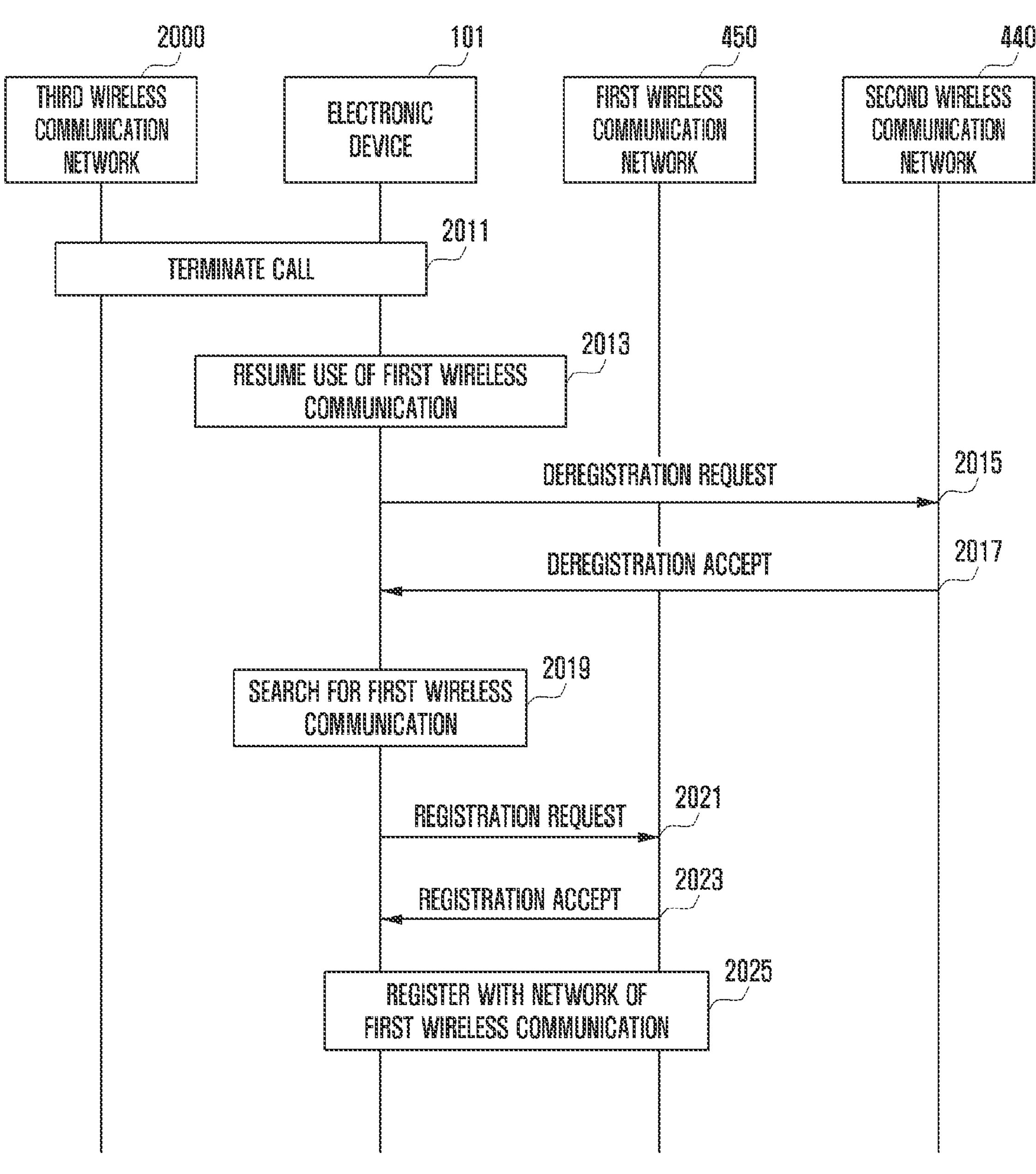
FIG. 20 is a signal flow diagram illustrating an example of resuming the use of first wireless communication by an electronic device according to various embodiments.

FIG. 20 is a signal flow diagram illustrating an example of resuming the use of first wireless communication by an electronic device according to various embodiments.

Referring to FIG. 20, according to various embodiments, the electronic device 101 may terminate a call function provided using a network 2000 of third wireless communication (e.g., wireless LAN communication) in operation 2011. According to an embodiment, based on restriction of the use of the first wireless communication, the electronic device 101 may provide a call function with an external device via the network 2000 of the third wireless communication (e.g., wireless LAN communication) in the state of being registered with the network 440 of second wireless communication. The electronic device 101 may terminate a call connection to the external device based on a call termination event. For example, the call termination event may include at least one of inputting a call termination button or disconnecting a call.

According to various embodiments, the electronic device 101 may resume the use of the first wireless communication based on the termination of the call function provided using the network 2000 of the third wireless communication in operation 2013. According to an embodiment, based on the resumption of the use of the first wireless communication, the electronic device 101 may update capability of the electronic device 101 with capability that supports the first wireless communication.

According to various embodiments, the electronic device 101 may transmit a deregistration request (e.g., detach request) message to the network 440 of the second wireless communication based on the resumption of the use of the first wireless communication in operation 2015.

According to various embodiments, the network 440 of the second wireless communication may transmit a deregistration accept (e.g., detach accept) message to the electronic device 101 in response to the deregistration request message received from the electronic device 101 in operation 2017.

According to various embodiments, the electronic device 101 may deregister with the network 440 of the second wireless communication based on the deregistration accept message received from the network 440 of the second wireless communication. In operation 2019, based on the deregistration with the network 440 of the second wireless communication, the electronic device 101 may identify (e.g., search for) the network 450 of the first wireless communication with which the electronic device 101 is capable of registering, via a search related to the first wireless communication (e.g., NR communication).

According to various embodiments, in operation 2021, the electronic device 101 may transmit a registration request message to the network 450 of the first wireless communication which is identified as a network with which the electronic device 101 is capable of being registered. For example, the registration request message may include information indicating support of the first wireless communication, which is represented by setting N1 mode of a UE network capability information element to "1", as shown in Table 1. According to an embodiment, based on the registration request message, the network 450 of the first wireless communication may determine that the electronic device 101 supports the first wireless communication.

According to various embodiments, in operation 2023, the network 450 of the first wireless communication may transmit a registration accept message to the electronic device 101 in response to the registration request message received from the electronic device 101.

According to various embodiments, in operation 2025, the electronic device 101 may register with the network 450 of the first wireless communication based on the registration accept message received from the network 450 of the first wireless communication.

Figure 21:
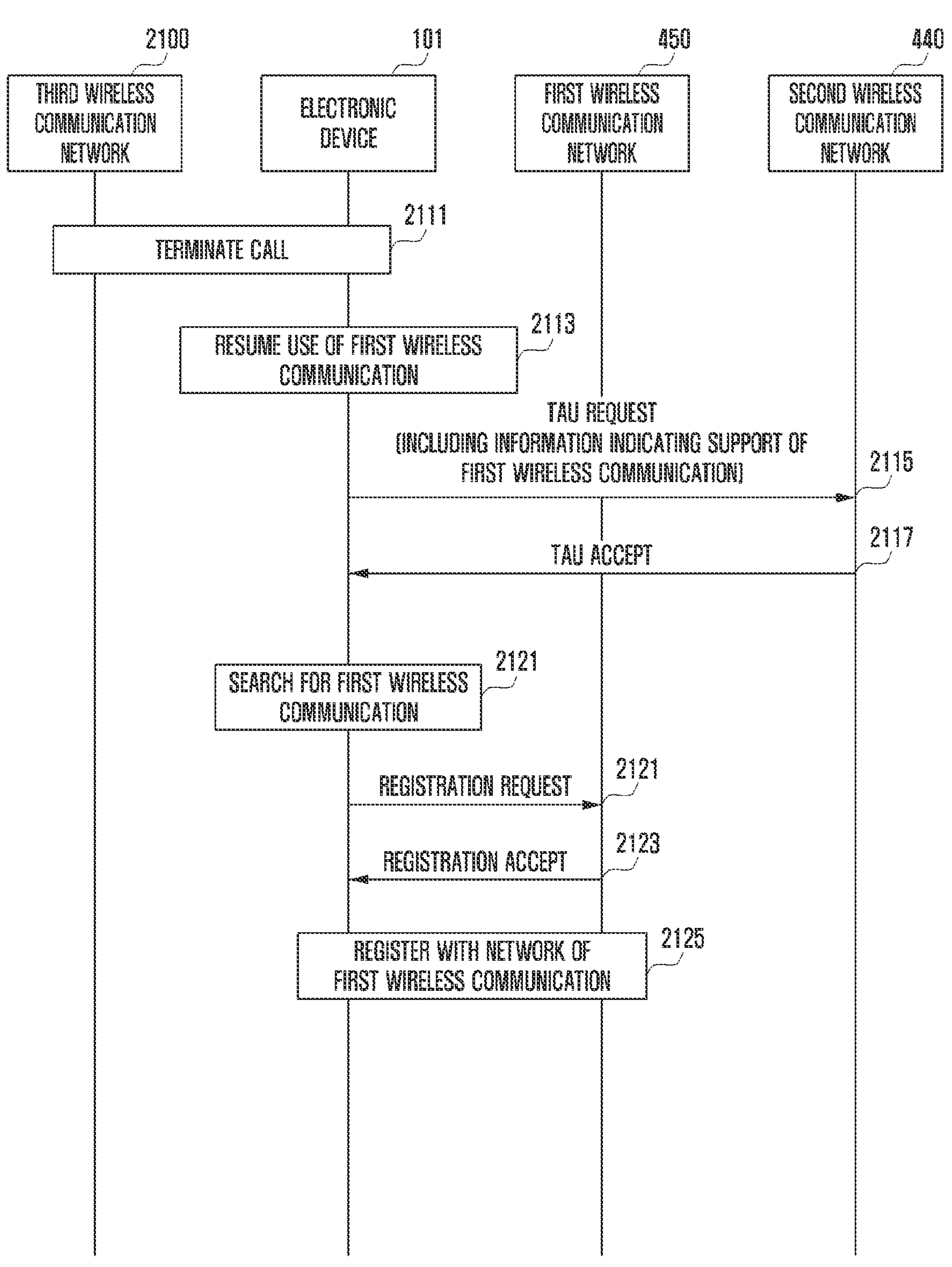
FIG. 21 is a signal flow diagram illustrating an example of resuming the use of first wireless communication by an electronic device according to various embodiments.

FIG. 21 is a signal flow diagram illustrating an example of resuming the use of first wireless communication by an electronic device according to various embodiments.

Referring to FIG. 21, according to various embodiments, the electronic device 101 may terminate a call function provided using a network 2100 of third wireless communication (e.g., wireless LAN communication) in operation 2111. According to an embodiment, based on restriction of the use of the first wireless communication, the electronic device 101 may provide a call function with an external device via the network 2100 of the third wireless communication (e.g., wireless LAN communication) in the state of being registered with the network 440 of second wireless communication. The electronic device 101 may terminate a call connection to the external device based on a call termination event. For example, the call termination event may include at least one of inputting a call termination button or disconnecting a call.

According to various embodiments, the electronic device 101 may resume the use of the first wireless communication based on the termination of the call function provided using the network 2100 of the third wireless communication in operation 2113. According to an embodiment, based on the resumption of the use of the first wireless communication, the electronic device 101 may update capability of the electronic device 101 with capability that supports the first wireless communication using a NAS protocol.

According to various embodiments, based on the resumption of the use of the first wireless communication, the electronic device 101 may transmit a TAU request message, including information indicating support of the first wireless communication, to the network 440 of the second wireless communication in operation 2115. For example, the TAU request message may include information indicating support of the first wireless communication, which is represented by setting N1 mode of a UE network capability information element to "1", as shown in Table 1. According to an embodiment, based on the TAU request message, the network 440 of the second wireless communication may determine that the electronic device 101 supports the first wireless communication.

According to various embodiments, the network 440 of the second wireless communication may transmit a TAU accept message to the electronic device 101 in response to the TAU request message received from the electronic device 101 in operation 2117.

According to various embodiments, based on the reception of the TAU accept message, the electronic device 101 may identify (e.g., search for) the network 450 of the first wireless communication with which the electronic device 101 is capable of registering, via a search related to the first wireless communication (e.g., NR communication) in operation 2119.

According to various embodiments, the electronic device 101 may transmit a registration request message to the network 450 of the first wireless communication which is identified as a network with which the electronic device 101 is capable of registering, in operation 2121.

According to various embodiments, in operation 2123, the network 450 of the first wireless communication may transmit a registration accept message to the electronic device 101 in response to the registration request message received from the electronic device 101.

According to various embodiments, in operation 2125, the electronic device 101 may register with the network 450 of the first wireless communication based on the registration accept message received from the network 450 of the first wireless communication.

Figure 22:
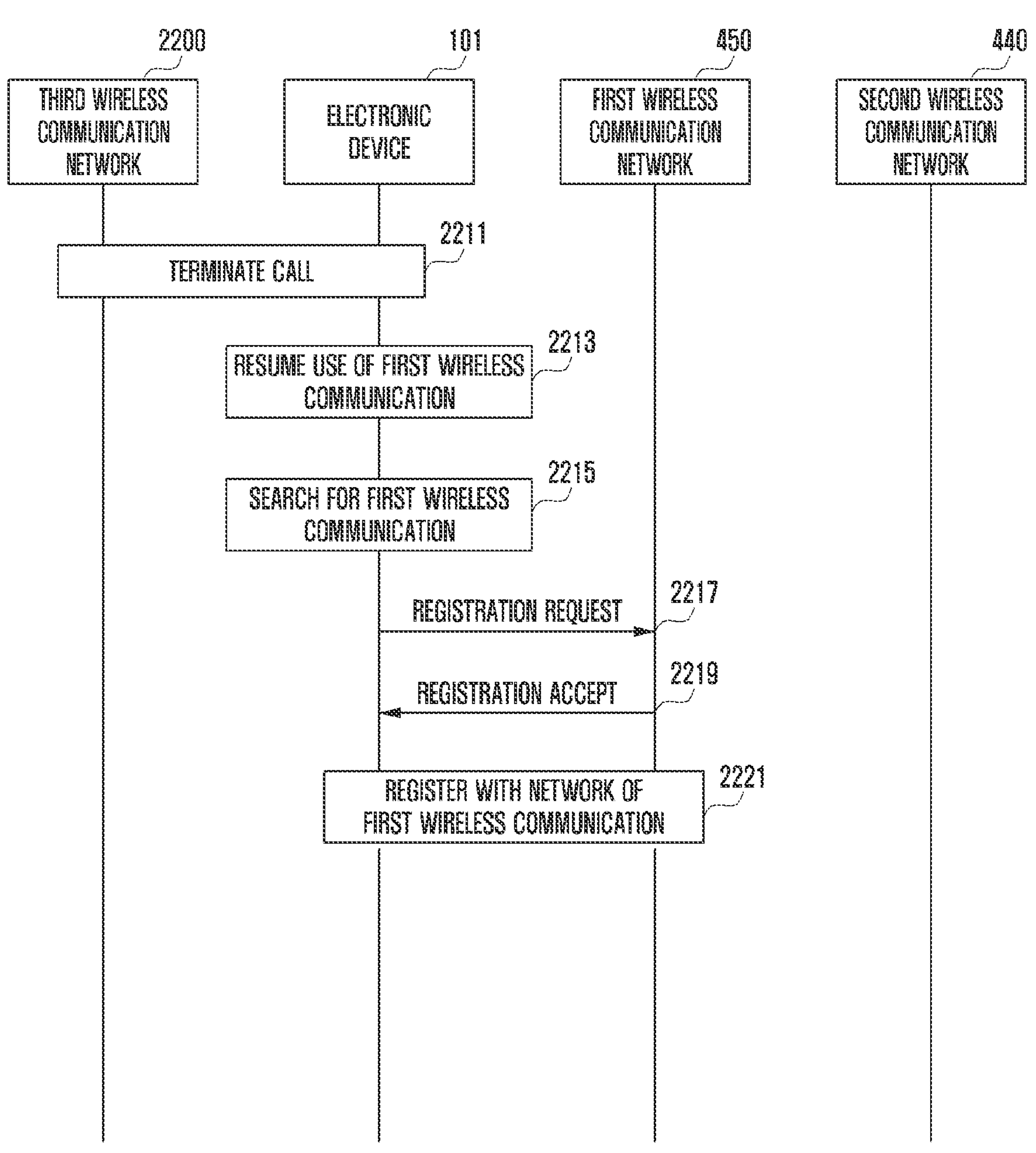
FIG. 22 is a signal flow diagram illustrating an example of resuming the use of first wireless communication by an electronic device according to various embodiments.

FIG. 22 is a signal flow diagram illustrating an example of resuming the use of first wireless communication by an electronic device according to various embodiments.

Referring to FIG. 22, according to various embodiments, the electronic device 101 may terminate a call function provided via a network 2200 of third wireless communication (e.g., wireless LAN communication) in operation 2211. According to an embodiment, based on restriction of the use of the first wireless communication, the electronic device 101 may provide a call function with an external device via the network 2200 of the third wireless communication (e.g., wireless LAN communication) in the state of being registered with the network 440 of second wireless communication. The electronic device 101 may terminate a call connection to the external device based on a call termination event. For example, the call termination event may include at least one of inputting a call termination button or disconnecting a call.

According to various embodiments, in operation 2213, the electronic device 101 may resume the use of the first wireless communication based on the termination of the call function provided using the network 2200 of the third wireless communication. According to an embodiment, based on the resumption of the use of the first wireless communication, the electronic device 101 may update capability of the electronic device 101 with capability that supports the first wireless communication using a NAS protocol.

According to various embodiments, in operation 2215, based on the resumption of the use of the first wireless communication, the electronic device 101 may identify (e.g., search for) the network 450 of the first wireless communication with which the electronic device 101 is capable of registering, via a search related to the first wireless communication (e.g., NR communication).

According to various embodiments, the electronic device 101 may transmit a registration request message to the network 450 of the first wireless communication which is identified as a network with which the electronic device 101 is capable of registering, in operation 2217. For example, the registration request message may include information indicating support of the first wireless communication, which is represented by setting N1 mode of a UE network capability information element to "1", as shown in Table 1. According to an embodiment, based on the registration request message, the network 450 of the first wireless communication may determine that the electronic device 101 supports the first wireless communication. According to various embodiments, in operation 2219, the network 450 of the first wireless communication may transmit a registration accept message to the electronic device 101 in response to the registration request message received from the electronic device 101.

According to various embodiments, in operation 2221, the electronic device 101 may register with the network 450 of the first wireless communication based on the registration accept message received from the network 450 of the first wireless communication.

According to various example embodiments, a method of operating an electronic device (e.g., the electronic device 101 of FIG. 1, FIG. 2, FIG. 5A, or FIG. 5B) may include: registering with NR communication, connecting a call to an external device using wireless LAN communication based on being in the state of being registered with the network of the NR communication, restricting the use of the NR communication based on the call connection to the external device using the wireless LAN communication, and registering with the network of the LTE communication via the first communication circuit based on the restriction of the use of the NR communication.

According to various example embodiments, the registering with the network of the LTE communication may include: transmitting a message related to a deregistration request to the network of the NR communication based on the restriction of the use of the NR communication, deregistering with the network of the NR communication based on a response message to the message related to the deregistration request, identifying a network of the LTE communication which the electronic device is capable of registering with, transmitting, to the identified network of the LTE communication, a message related to a registration request including information related to the restriction of the use of the NR communication, and registering with the identified network of the LTE communication based on a response message to the message related to the registration request.

According to various example embodiments, the registering with the network of the LTE communication may include: identifying the network of the LTE communication which the electronic device is capable of registering with based on the restriction of the use of the NR communication, transmitting, to the identified network of the LTE communication, a tracking area update request message including information related to the restriction of the use of the NR communication, and registering with the identified network of the LTE communication based on a response message to the request message.

According to various example embodiments, the method may further include: based on the restriction of the use of the NR communication, restricting a search for a network of the NR communication via the first communication circuit.

According to various example embodiments, the restricting the use of the NR communication may include: identifying a signal quality of the network of the wireless LAN communication based on being in a state in which the call with the external device is connected via the wireless LAN communication, and restricting the use of the NR communication based on the signal quality of the network of the wireless LAN communication satisfying a designated condition, wherein the signal quality may include at least one of a reference signal received power (RSRP), a reference signal received quality (RSRQ), a received strength indicator (RSSI), a signal to interference plus noise ratio (SINR), a transmission/reception error rate, a packet transmission/reception delay, or a quality of service (QoS).

According to various example embodiments, the method may further include: based on the call with the external device being terminated, resuming the use of the NR communication, identify the network of the NR communication with which the electronic device is capable of registering, and registering with the identified network of the NR communication via the first communication circuit.

According to various example embodiments, the method may further include: resuming the use of the NR communication based on the call with the external device being terminated, transmitting a message related to a deregistration request to the network of the LTE communication, based on the resumption of the use of the NR communication, deregistering with the network of the LTE communication based on a response message to the message related to the deregistration request, identifying a network of the NR communication with which the electronic device is capable of registering, transmitting the message related to a registration request to the identified network of the NR communication, and registering with the network of the NR communication based on a response message to the message related to the registration request.

According to various example embodiments, the method may further include: resuming the use of the NR communication based on the call with the external device being terminated, transmitting, based on the resumption of the use of the NR communication, a tracking area update request message including information related to the resumption of the use of the NR communication to the network of the LTE communication, identifying a network of the NR communication with which the electronic device is capable of registering based on a response message to the request message being received, transmitting a message related to a registration request to the identified network of the NR communication, and registering with the identified network of the NR communication based on a response message to the message related to the registration request.

According to various example embodiments, the restricting the use of the NR communication may include: identifying whether the network of the NR communication supports a call function based on a call connection history and/or information related to a network used for registering with an IP multimedia subsystem (IMS) server; and restricting the use of the NR communication based on the call connection with the external device using the wireless LAN communication if the network of the NR communication is identified as not supporting the call function.

According to various example embodiments of the disclosure, when an electronic device provides a call function via communication (e.g., wireless LAN) that uses an unlicensed band, the electronic device may restrict the use of 5G communication (e.g., NR) that is capable of providing a call function by evolved packet system (EPS) fallback, and may register with a network of the 4G communication (LTE), thereby continuously providing a call with an external device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:

a first communication circuitry configured to support new radio (NR) communication;

a second communication circuitry configured to support long-term evolution (LTE) communication;

a third communication circuitry configured to support Wi-Fi communication;

at least one processor including processing circuitry and operatively connected to the first communication circuitry, the second communication circuitry and the third communication circuitry; and memory storing instructions, wherein the instructions, when executed by the at least one processor, cause the electronic device to:

register, via the first communication circuitry, with a network of the NR communication;

connect, via the third communication circuitry, a call using the Wi-Fi communication with an external device while the electronic device is registered with the network of the NR communication;

when the electronic device is registered with an IP multimedia subsystem (IMS) server via a network of the LTE communication and is connected to the call with the external device using the Wi-Fi communication, identify whether the electronic device has a call connection history associated with the network of the NR communication; and based on identifying that the electronic device does not have the call connection history associated with the network of the NR communication, deregister with the network of the NR communication and register, via the second communication circuitry, with the network of the LTE communication, wherein a search for a network of the NR communication is restricted based on the deregistration with the network of the NR communication.

2. The electronic device of claim 1, wherein the instructions, when executed by the at least one processor, cause the electronic device to:

transmit a message related to a deregistration request to the network of the NR communication in response to determination that the electronic device does not have a call connection history associated with the network of the NR communication;

based on a response message to the message related to the deregistration request, deregister with the network of the NR communication;

identify, after deregistering, a network of the LTE communication with which the electronic device is capable of registering;

transmit, to the identified network of the LTE communication, a message related to a registration request including information related to a restriction of the use of the NR communication; and based on a response message to the message related to the registration request, register with the identified network of the LTE communication.

3. The electronic device of claim 1, wherein the instructions, when executed by the at least one processor, cause the electronic device to:

identify the network of the LTE communication with which the electronic device is capable of registering based on the deregistration with the network of the NR communication;

transmit, to the identified network of the LTE communication, a tracking area update request message including information related to a restriction of the use of the NR communication; and based on a response message to the request message, register with the identified network of the LTE communication.

4. The electronic device of claim 1, wherein the instructions, when executed by the at least one processor, cause the electronic device to:

identify a signal quality of the network of the Wi-Fi communication based on being in a state in which the call with the external device is connected via the Wi-Fi communication; and based on the signal quality of the network of the Wi-Fi communication satisfying a designated condition, deregister with the network of the NR communication, wherein the signal quality includes at least one of a reference signal received power (RSRP), a reference signal received quality (RSRQ), a received strength indicator (RSSI), a signal to interference plus noise ratio (SINR), a transmission/reception error rate, a packet transmission/reception delay, or a quality of service (QoS).

5. The electronic device of claim 1, wherein; the instructions, when executed by the at least one processor, cause the electronic device to:

when the call with the external device is terminated, resume use of the NR communication;

identify a network of the NR communication with which the electronic device is capable of registering; and register, via the first communication circuitry, with the identified network of the NR communication.

6. The electronic device of claim 1, wherein the instructions, when executed by the at least one processor, cause the electronic device to:

when the call with the external device is terminated, resume use of the NR communication;

based on the resumption of the use of the NR communication, transmit, via the second communication circuitry, a message related to a deregistration request to the network of the LTE communication;

based on a response message to the message related to the deregistration request, deregister with the network of the LTE communication;

identify a network of the NR communication with which the electronic device is capable of registering;

transmit, via the first communication circuitry, a message related to a registration request to the identified network of the NR communication; and based on a response message to the message related to the registration request, register with the network of the NR communication.

7. The electronic device of claim 1, wherein, based on the deregistration with the network of the NR communication, the instructions, when executed by the at least one processor, cause the electronic device to update a capability of the electronic device to a capability that does not support the NR communication.

8. The electronic device of claim 7, wherein, if the call connection to the external device is terminated, the instructions, when executed by the at least one processor, cause the electronic device to update the capability of the electronic device to a capability that supports the NR communication.

9. The electronic device of claim 1, wherein the instructions, when executed by the at least one processor, cause the electronic device to:

when a signal quality of a network of the Wi-Fi communication satisfies a designated handover condition, perform a handover of the call from the network of the Wi-Fi communication to the network of the LTE communication.

10. A method of operating an electronic device, the method comprising:

registering with a network of new radio (NR) communication;

connecting a call using Wi-Fi communication with an external device while the electronic device is registered with the network of the NR communication;

when the electronic device is registered with an IP multimedia subsystem (IMS) server via a network of the LTE communication and is connected to the call with the external device using the Wi-Fi communication, identifying whether the electronic device has a call connection history associated with the network of the NR communication; and based on identifying that the electronic device does not have the call connection history associated with the network of the NR communication, deregistering with the network of the NR communication and registering with the network of long-term evolution (LTE) communication, wherein a search for a network of the NR communication is restricted based on the deregistration with the network of the NR communication.

11. The method of claim 10, wherein the registering with the network of the LTE communication comprises:

identifying, after deregistering, a network of the LTE communication with which the electronic device is capable of registering;

transmitting, to the identified network of the LTE communication, a registration request message including information related to a restriction of the use of the NR communication; and based on a response message to the registration request message, registering with the identified network of the LTE communication.

12. The method of claim 10, wherein the registering with the network of the LTE communication comprises:

based on the deregistration with the network of the NR communication, identifying a network of the LTE communication with which the electronic device is capable of registering;

transmitting a tracking area update request message including information related to a restriction of the use of the NR communication to the identified network of the LTE communication; and based on a response message to the request message, registering with the identified network of the LTE communication.

13. The method of claim 11, wherein the restricting of the use of the NR communication comprises:

identifying a signal quality of a network of the Wi-Fi communication based on being in a state in which the call with the external device is connected using the Wi-Fi communication; and based on the signal quality of the network of the Wi-Fi communication satisfying a designated condition, deregister with the network of the NR communication, wherein the signal quality includes at least one of a reference signal received power (RSRP), a reference signal received quality (RSRQ), a received strength indicator (RSSI), a signal to interference plus noise ratio (SINR), a transmission/reception error rate, a packet transmission/reception delay, or a quality of service (QoS).

14. The method of claim 10, further comprising:

when the call with the external device is terminated, resuming use of the NR communication;

identifying a network of the NR communication with which the electronic device is capable of registering; and registering the identified network of the NR communication.

15. The method of claim 10, further comprising:

when the call with the external device is terminated, resuming use of the NR communication;

based on the resumption of the use of the NR communication, transmitting a message related to a deregistration request to the network of the LTE communication;

based on a response message to the message related to the deregistration request, deregistering with the network of the LTE communication;

identifying a network of the NR communication with which the electronic device is capable of registering;

transmitting a message related to a registration request to the identified network of the NR communication; and based on a response message to the message related to the registration request, registering with the identified network of the NR communication.

16. The method of claim 10, further comprising:

based on the deregistration with the network of the NR communication, updating a capability of the electronic device to a capability that does not support the NR communication.

17. The method of claim 16, further comprising:

if the call connection to the external device is terminated, updating the capability of the electronic device to a capability that supports the NR communication.

18. The method of claim 10, further comprising:

when a signal quality of a network of the Wi-Fi communication satisfies a designated handover condition, performing a handover of the call from the network of the Wi-Fi communication to the network of the LTE communication.

* * * * *